(12) United States Patent
Son et al.

(10) Patent No.: US 10,722,088 B2
(45) Date of Patent: Jul. 28, 2020

(54) MOVING OBJECT, CLEANING ROBOT, FLOOR CONDITION DETERMINING DEVICE, METHOD OF CONTROLLING THE MOVING OBJECT, AND METHOD OF CONTROLLING THE CLEANING ROBOT

(71) Applicant: Samsung Electronics Co., Ltd, Suwon-si (KR)

(72) Inventors: Hyung Min Son, Suwon-si (KR); Jung Won Choi, Goyang-si (KR); Yong Jong Park, Seongnam-si (KR); Jun Hoe Choi, Hwaseong-si (KR); Jeong Su Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 15/777,648

(22) PCT Filed: Oct. 27, 2016

(86) PCT No.: PCT/KR2016/012178
§ 371 (c)(1),
(2) Date: May 18, 2018

(87) PCT Pub. No.: WO2017/086623
PCT Pub. Date: May 26, 2017

(65) Prior Publication Data
US 2018/0368642 A1     Dec. 27, 2018

(30) Foreign Application Priority Data

Nov. 18, 2015   (KR) .................. 10-2015-0162065
Oct. 14, 2016   (KR) .................. 10-2016-0133506

(51) Int. Cl.
*G01B 11/22*     (2006.01)
*G05D 1/02*      (2020.01)
(Continued)

(52) U.S. Cl.
CPC ............... *A47L 9/2826* (2013.01); *A47L 9/28* (2013.01); *A47L 9/30* (2013.01); *G01B 11/22* (2013.01);
(Continued)

(58) Field of Classification Search
None
See application file for complete search history.

(56) References Cited

U.S. PATENT DOCUMENTS 4,158,507 A * 6/1979 Himmel ............... G01B 11/254
                                              250/237 G
4,653,316 A * 3/1987 Fukuhara ................ G01C 7/04
                                                33/551
(Continued)

FOREIGN PATENT DOCUMENTS

CN      104027040 A     9/2014
EP       2455776 A1     5/2012
(Continued)

OTHER PUBLICATIONS

International Search Report dated Feb. 3, 2017 in connection with International Patent Application No. PCT/KR2016/012178.
(Continued)

*Primary Examiner* — Kara E. Geisel
*Assistant Examiner* — Jarreas C Underwood

(57) ABSTRACT

Provided are a moving object, a cleaning robot, a floor condition determining device, a method of controlling the moving object, and a method of controlling the cleaning robot. The moving object includes a light source configured to irradiate a first light to a floor surface, a plurality of sensors for receiving light reflected from the floor surface at different positions from each other, and a controller configured to determine a condition of the floor surface on the basis of a result sensed by the plurality of sensors.

13 Claims, 63 Drawing Sheets

(51) Int. Cl.
*A47L 9/28* (2006.01)
*A47L 9/30* (2006.01)

(52) U.S. Cl.
CPC ........ *G05D 1/0214* (2013.01); *A47L 2201/04* (2013.01); *A47L 2201/06* (2013.01); *G05B 2219/45098* (2013.01); *G05D 2201/0203* (2013.01)

(56) References Cited

U.S. PATENT DOCUMENTS

| | | | | |
|---|---|---|---|---|
| 5,078,496 | A | * | 1/1992 | Parker .................. G01B 11/303 356/446 |
| 5,139,339 | A | * | 8/1992 | Courtney ............... B41J 11/009 356/446 |
| 5,689,757 | A | * | 11/1997 | Ferrante ................. G01N 21/86 356/446 |
| 6,207,946 | B1 | * | 3/2001 | Jusoh ................. G01N 21/8806 250/208.1 |
| 6,215,552 | B1 | * | 4/2001 | Acquaviva ......... G01B 11/0608 356/601 |
| 6,594,844 | B2 | * | 7/2003 | Jones .................. G05D 1/0238 15/319 |
| 7,433,056 | B1 | * | 10/2008 | Janik ................. G01B 11/0616 356/301 |
| 8,045,179 | B1 | * | 10/2011 | Zhuang ................ G01B 11/303 356/600 |
| 8,735,824 | B2 | * | 5/2014 | Hong .................... G01S 7/4802 250/341.7 |
| 9,271,621 | B2 | | 3/2016 | Park et al. |
| 9,320,398 | B2 | | 4/2016 | Hussey et al. |
| 2005/0251292 | A1 | | 11/2005 | Casey et al. |
| 2008/0015738 | A1 | * | 1/2008 | Casey .................. G05D 1/0238 700/258 |
| 2009/0009753 | A1 | * | 1/2009 | Horai .................... G01N 21/65 356/237.3 |
| 2013/0002444 | A1 | | 1/2013 | Bitzel, Jr. et al. |
| 2014/0043613 | A1 | | 2/2014 | Adler et al. |

FOREIGN PATENT DOCUMENTS

| | | | |
|---|---|---|---|
| JP | 2014-176762 | A | 9/2014 |
| KR | 10-2008-0071241 | A | 8/2008 |
| KR | 10-2011-0109705 | A | 10/2011 |
| KR | 10-2012-0053276 | A | 5/2012 |
| KR | 10-1156282 | B1 | 6/2012 |
| KR | 10-2012-0105282 | A | 9/2012 |
| KR | 101229106 | * | 9/2012 |
| KR | 10-1229106 | B1 | 2/2013 |
| KR | 10-2013-0053286 | A | 5/2013 |

OTHER PUBLICATIONS

Written Opinion of the International Searching Authority dated Feb. 3, 2017 in connection with International Patent Application No. PCT/KR2016/012178.
European Patent Office, "Supplementary European Search Report," Application No. EP 16866575.0, dated Jun. 28, 2018, 7 pages.

* cited by examiner

[Fig. 1]
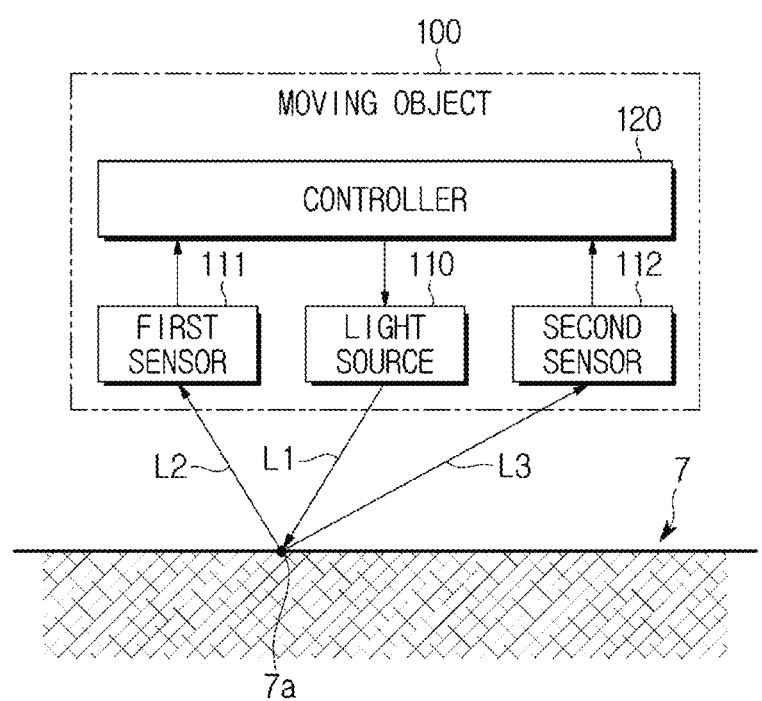

[Fig. 2]
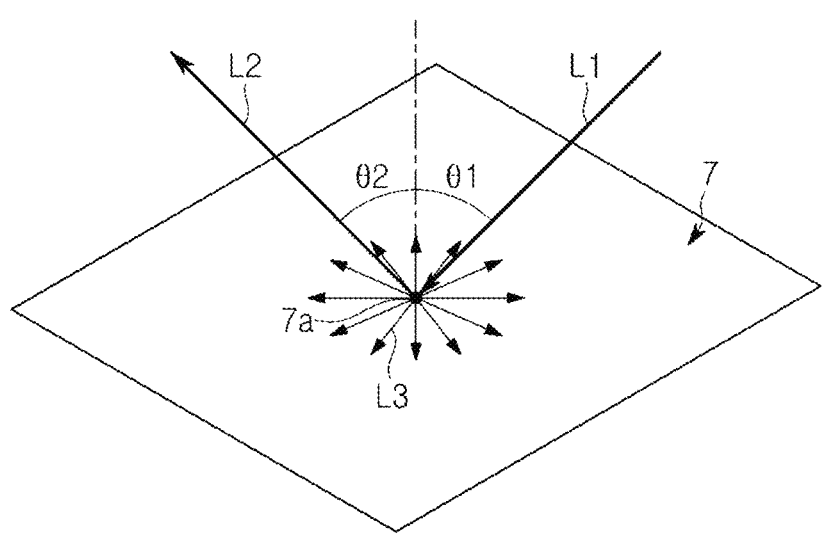

[Fig. 3]
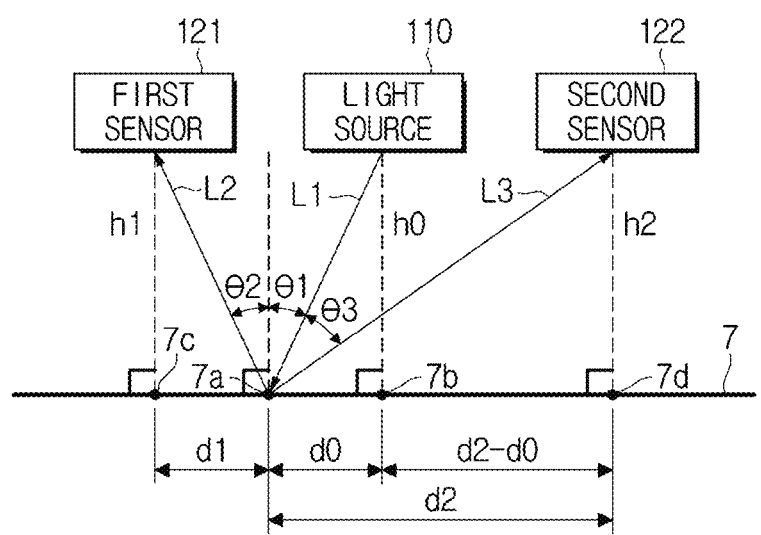

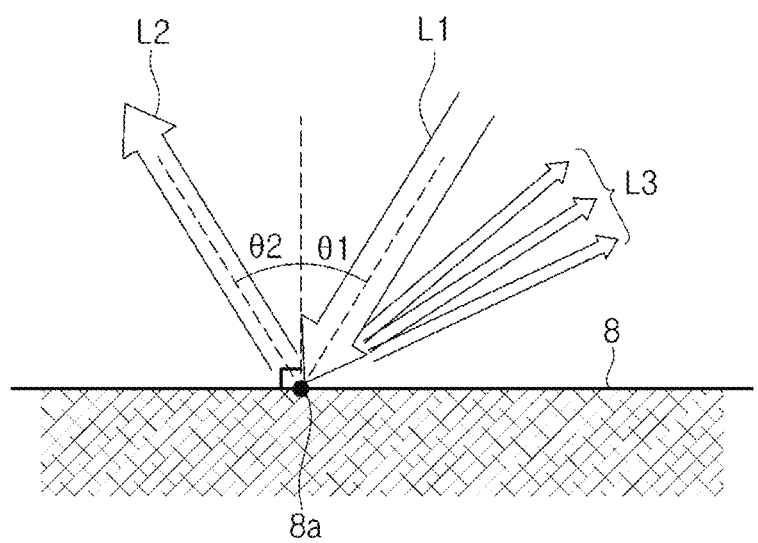
[Fig. 4a]

[Fig. 4b]
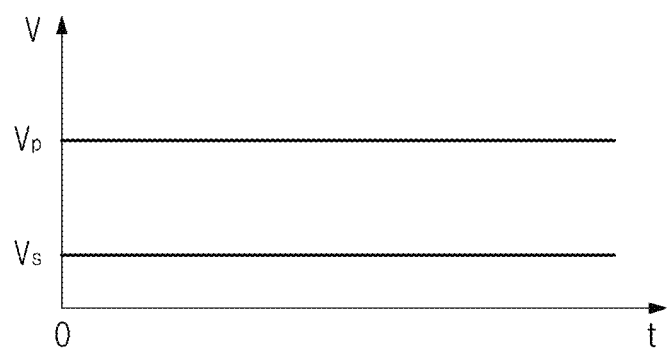

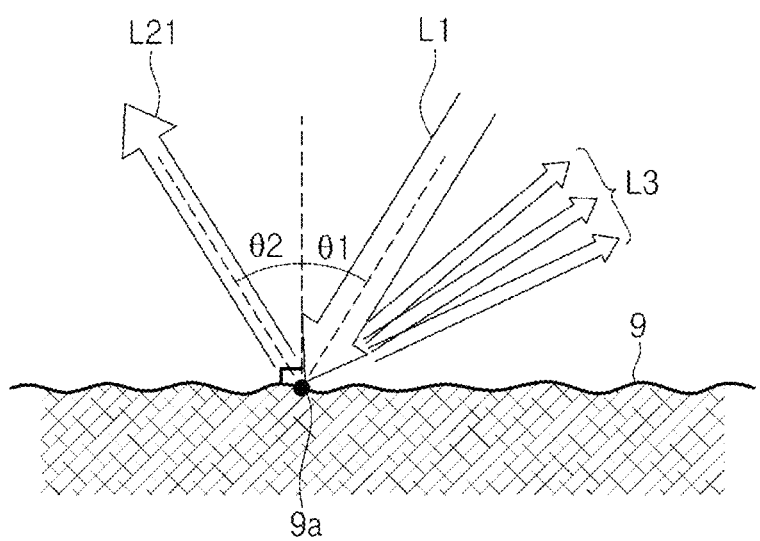
[Fig. 5a]

[Fig. 5b]
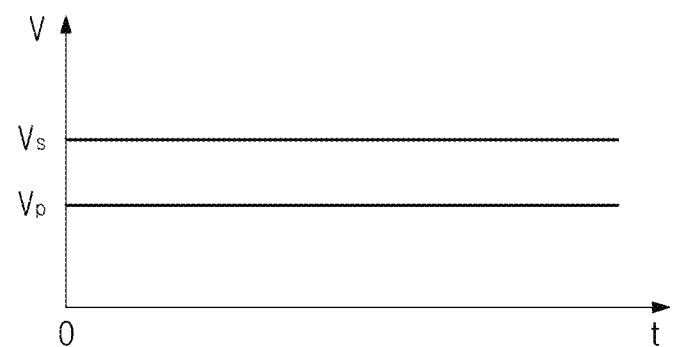

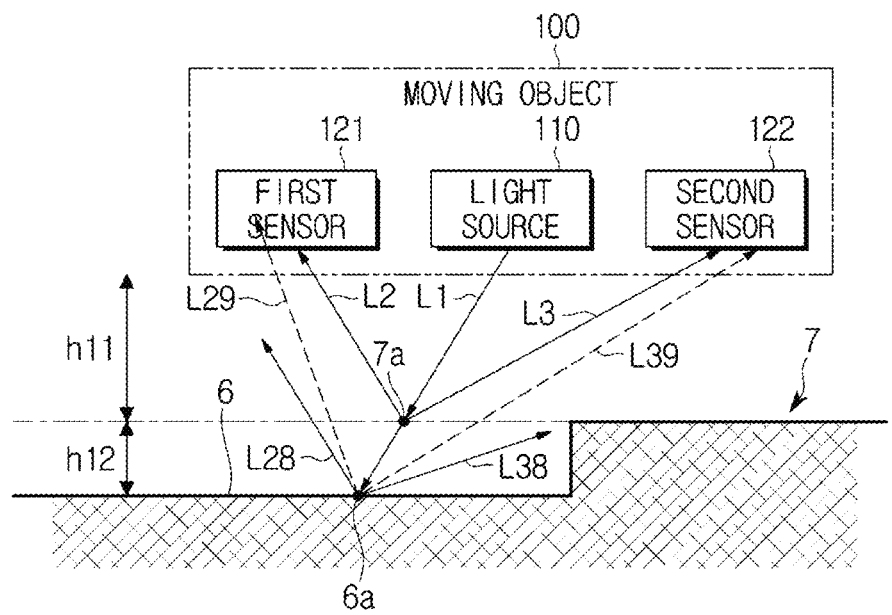
[Fig. 6a]

[Fig. 6b]
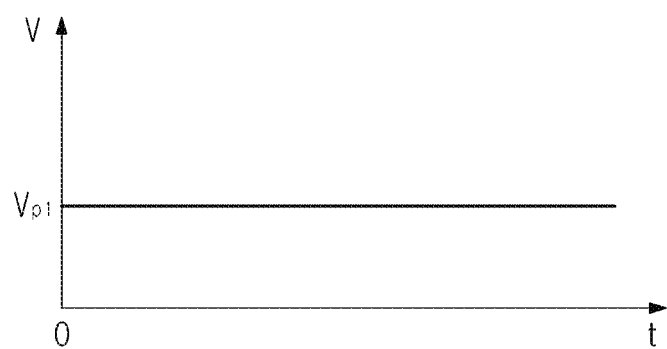

[Fig. 7]
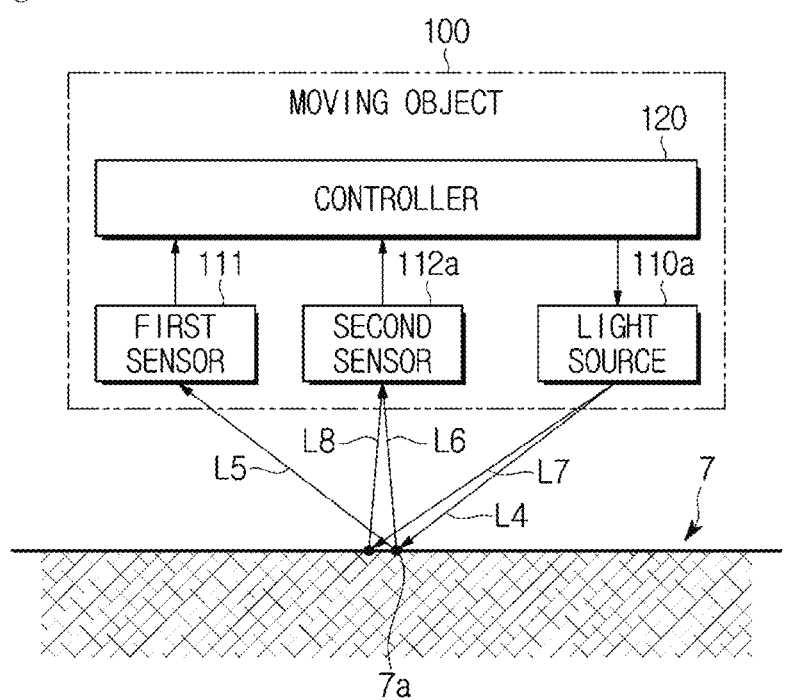

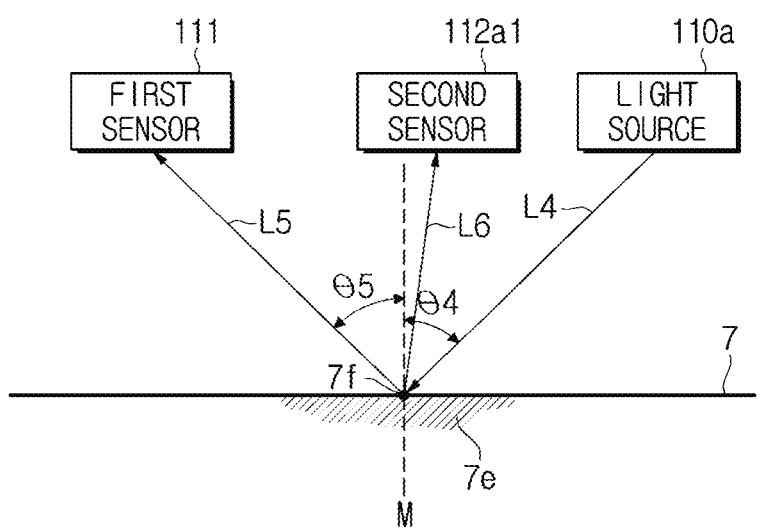
[Fig. 8]

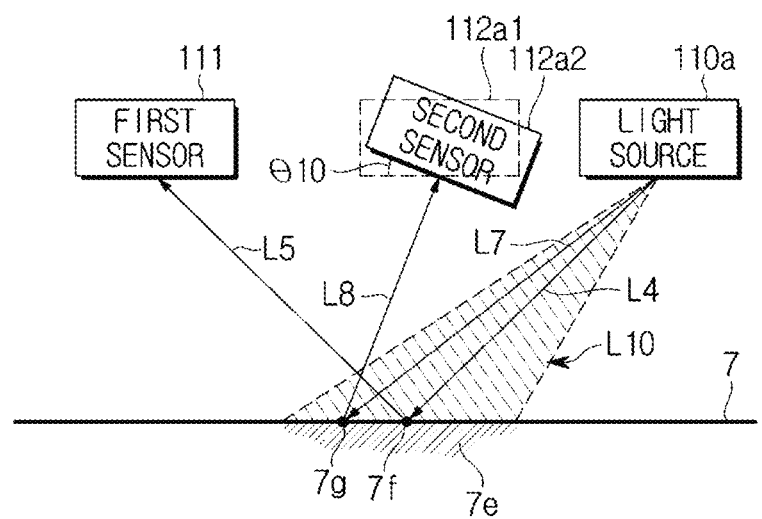
[Fig. 9]

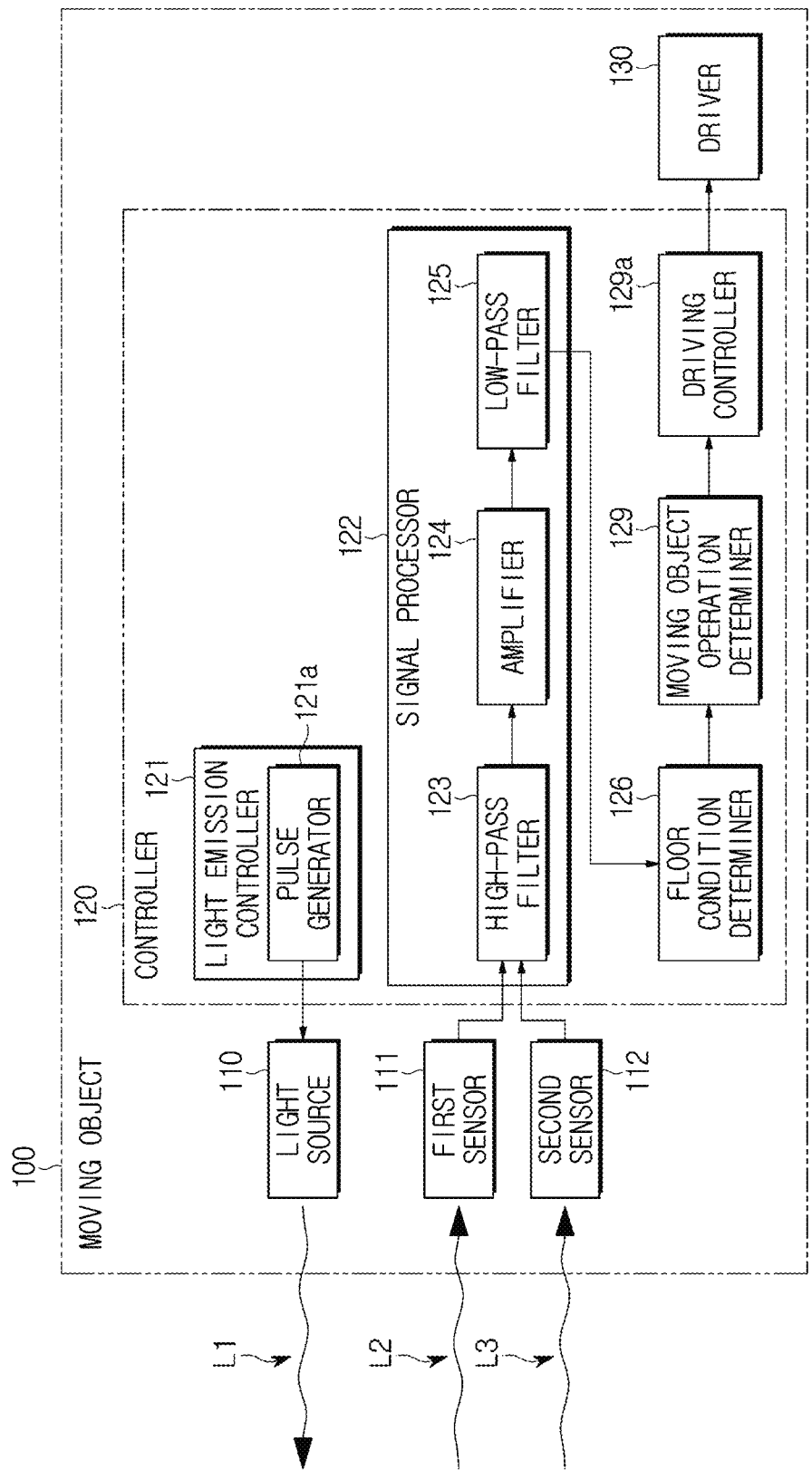
[Fig. 10]

[Fig. 11]
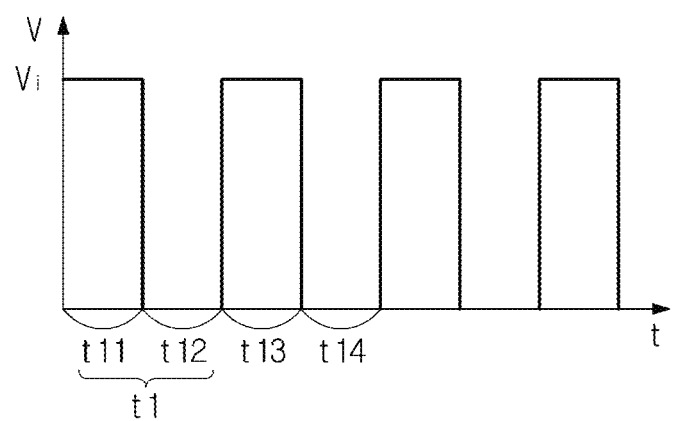

[Fig. 12]
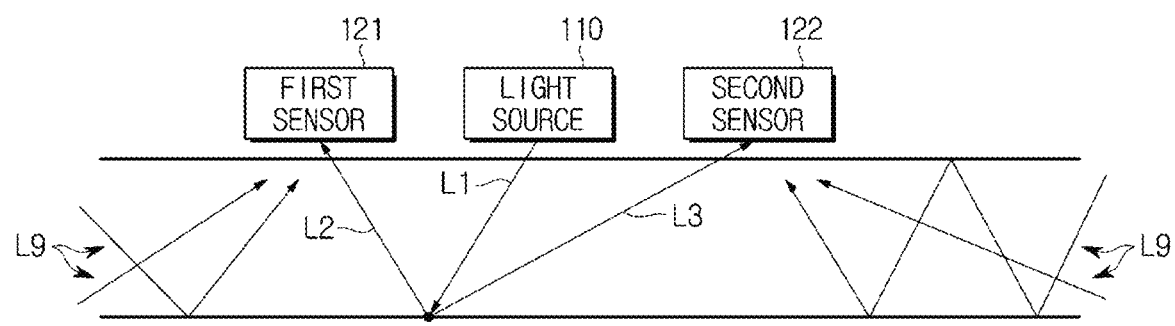

[Fig. 13]
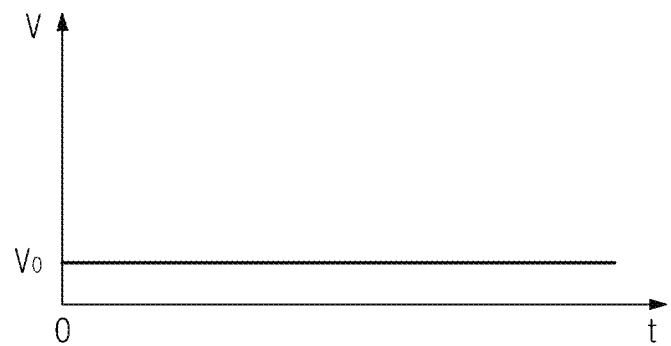

[Fig. 14]
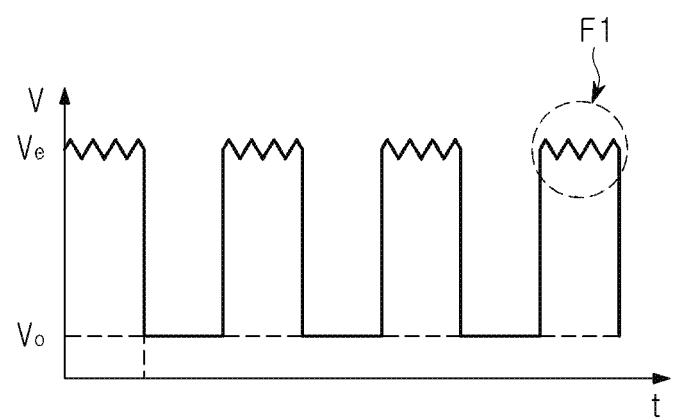

[Fig. 15]
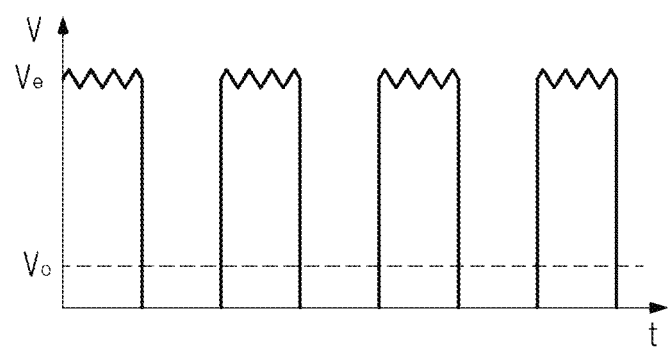

[Fig. 16]
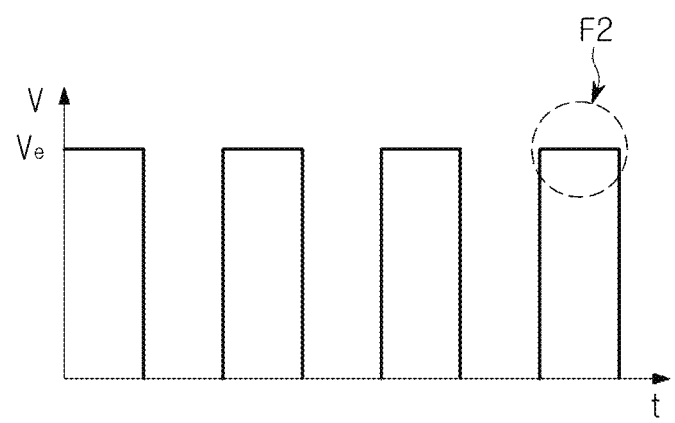

[Fig. 17]
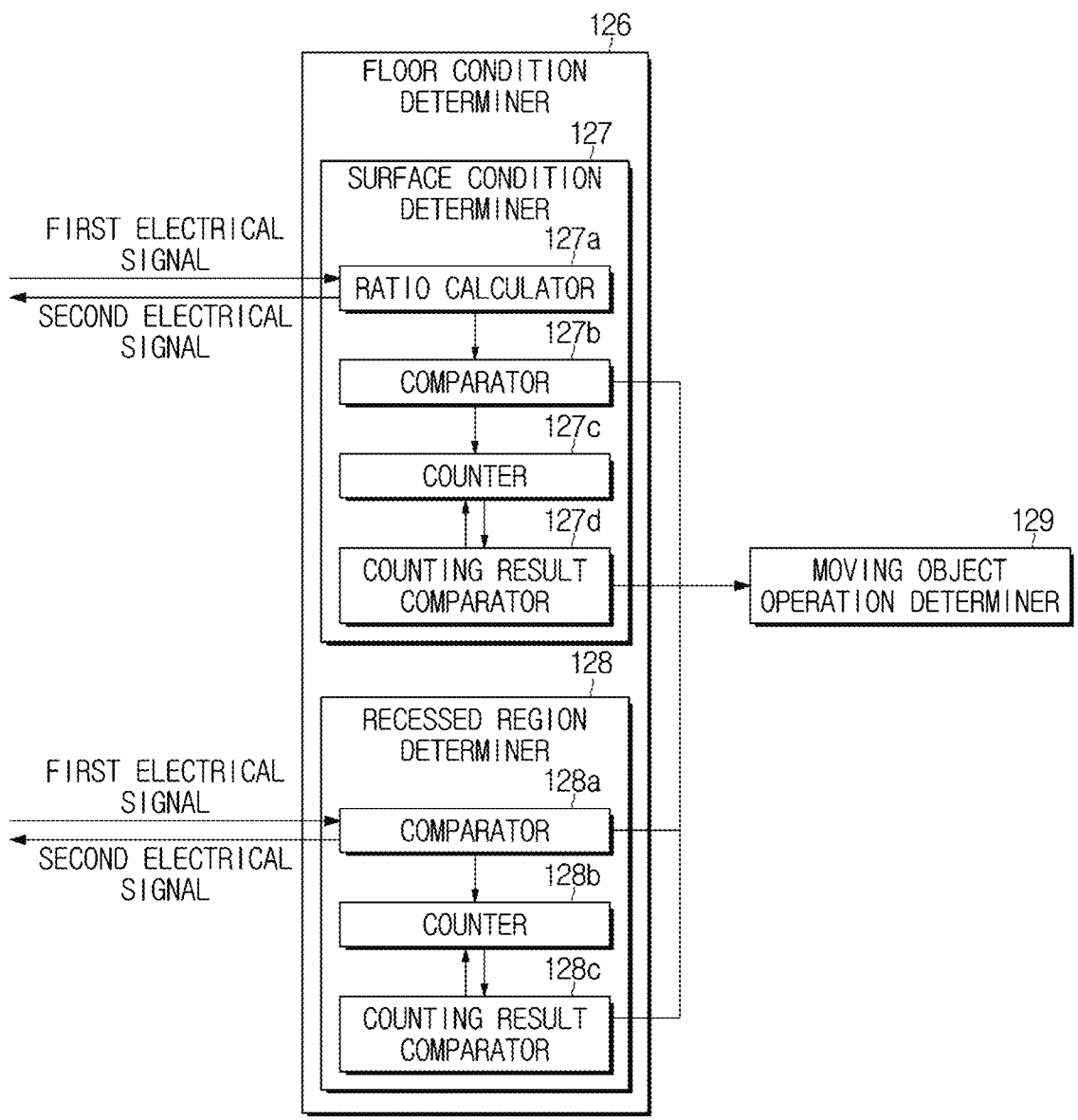

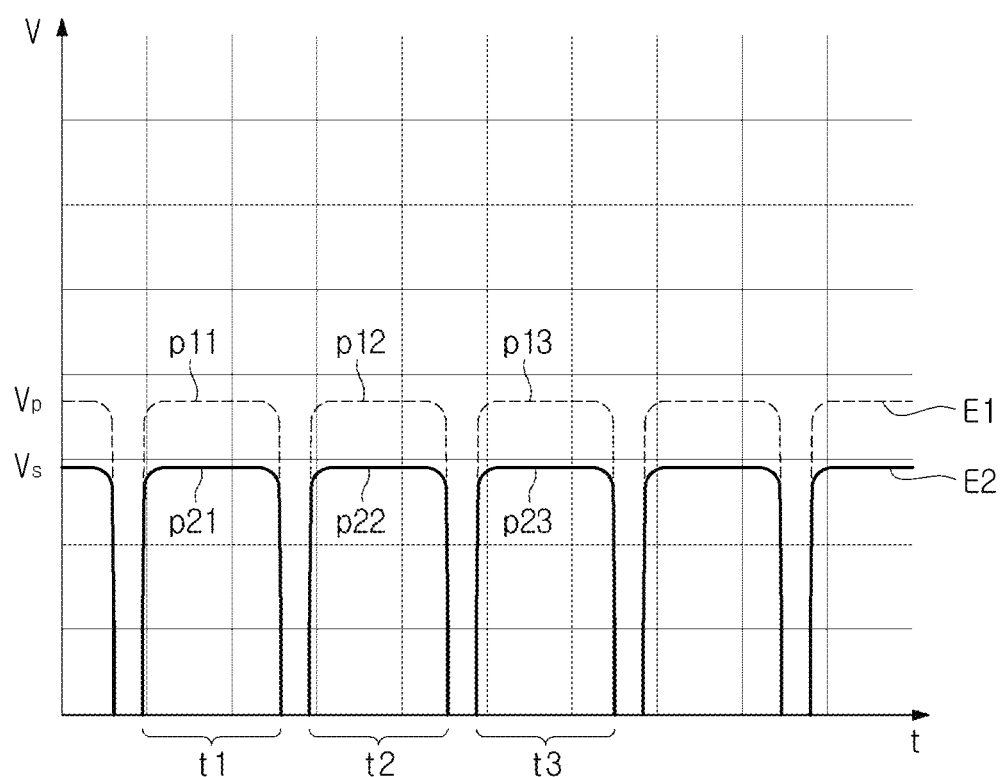
[Fig. 18a]

[Fig. 18b]
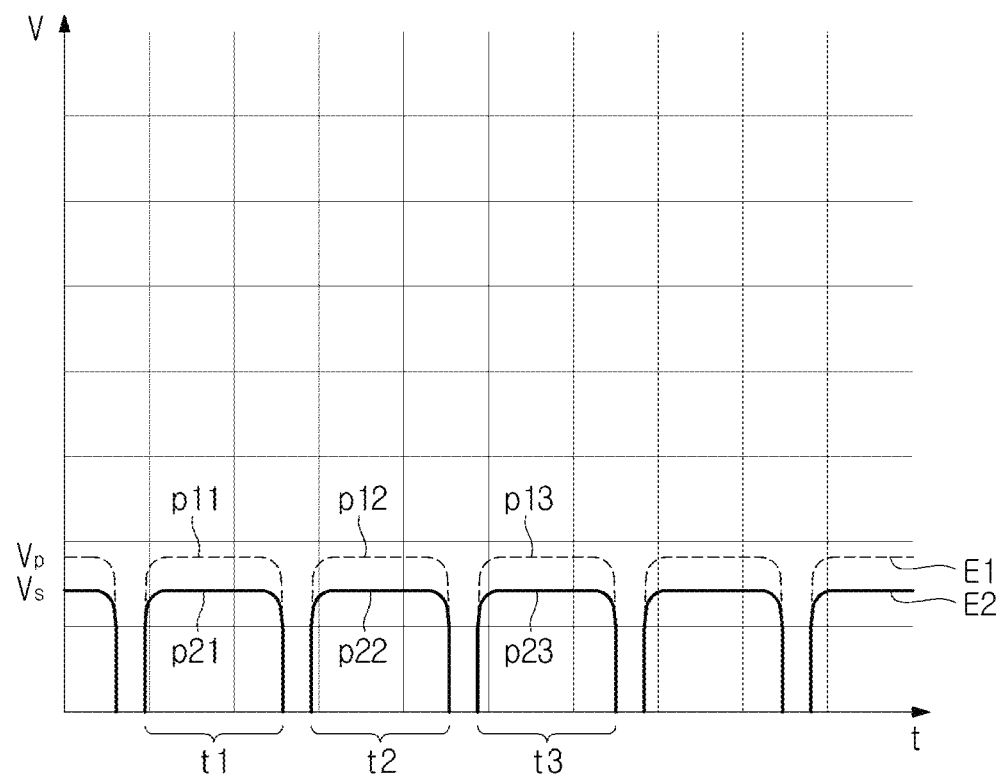

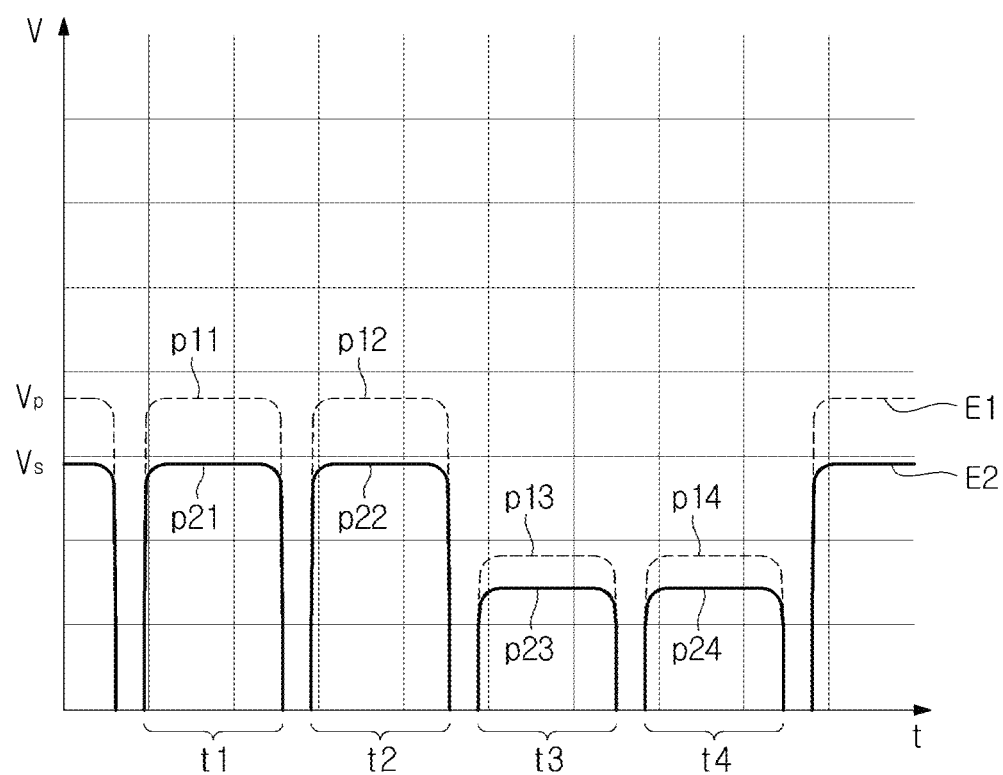
[Fig. 18c]

[Fig. 19]
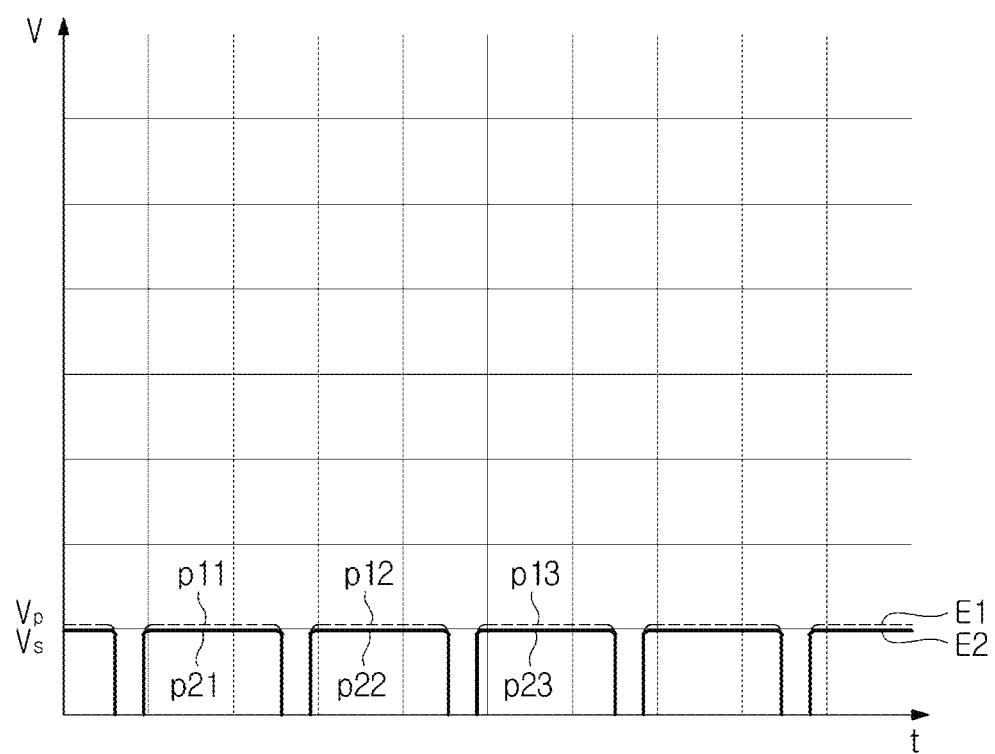

[Fig. 20]
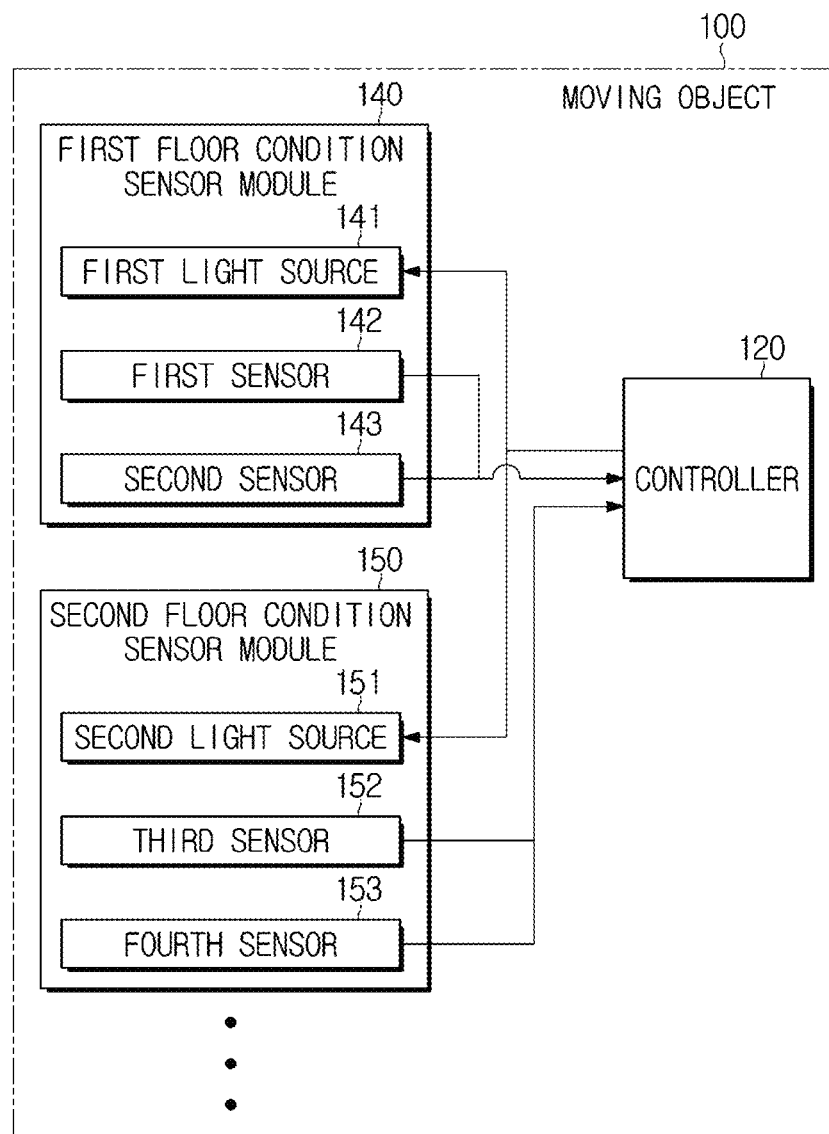

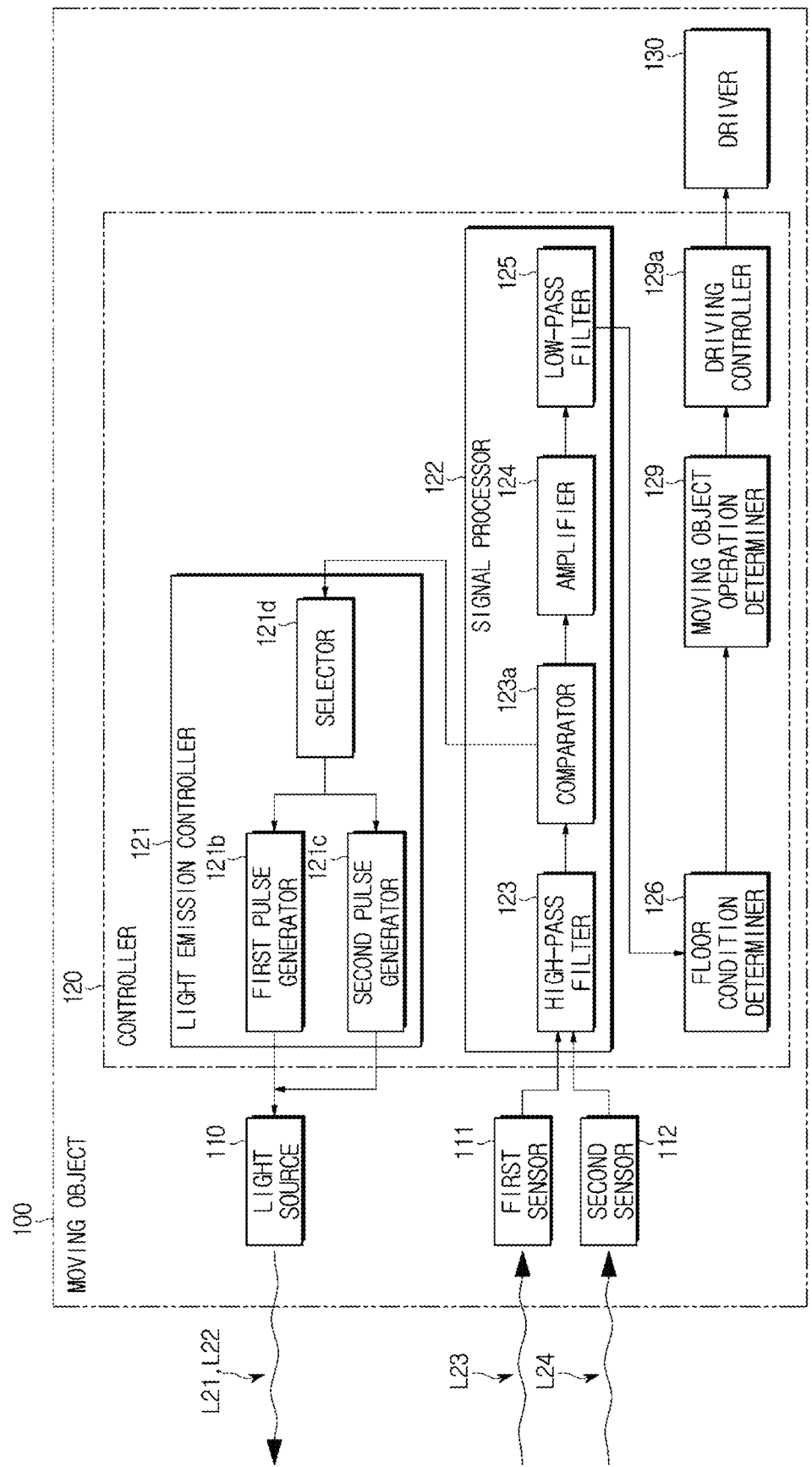
[Fig. 21]

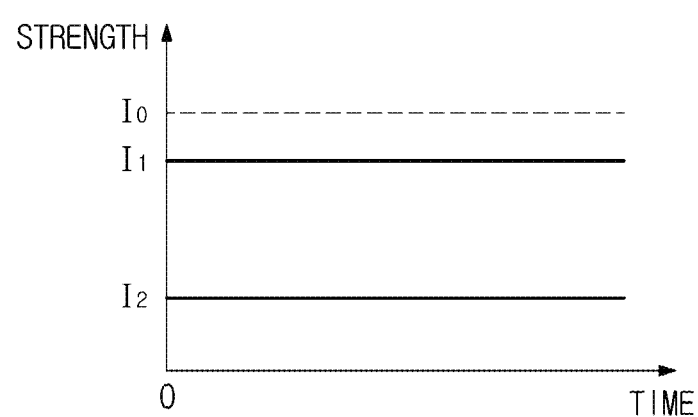
[Fig. 22a]

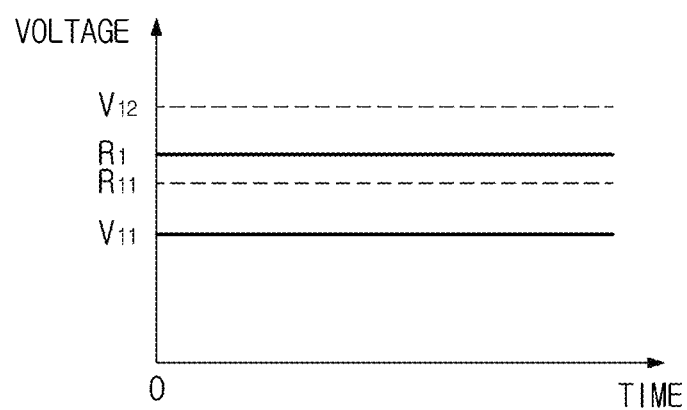
[Fig. 22b]

[Fig. 22c]
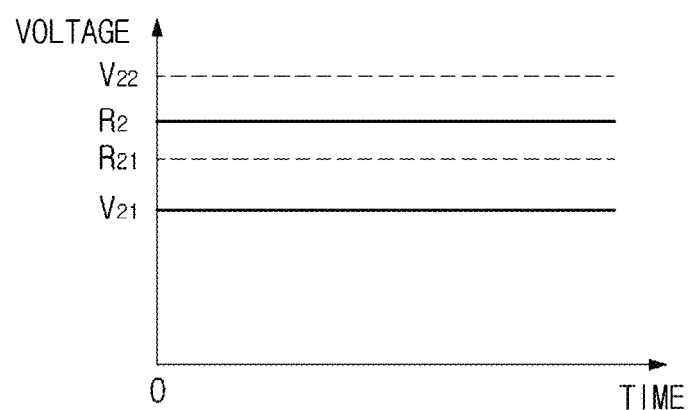

[Fig. 22d]
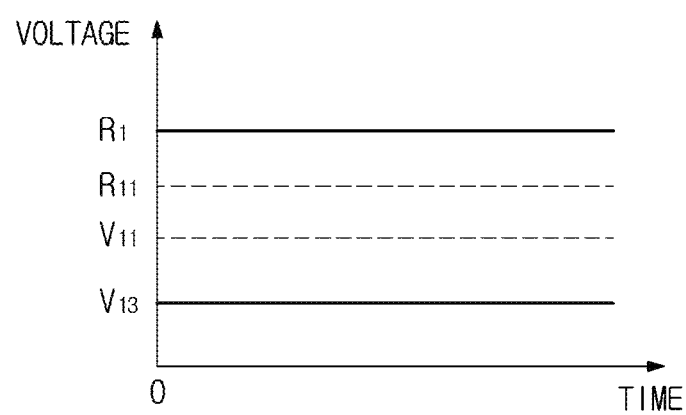

[Fig. 22e]
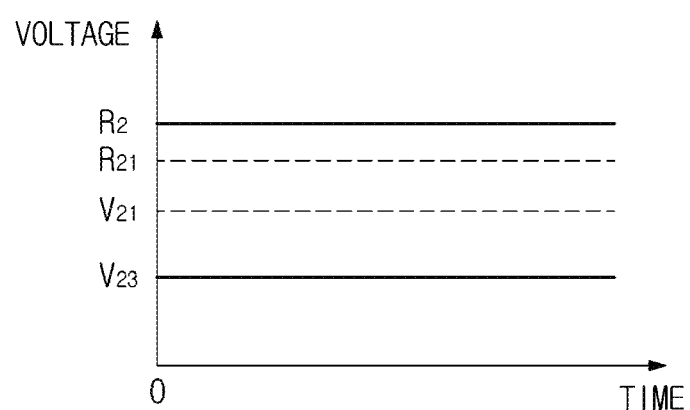

[Fig. 23]
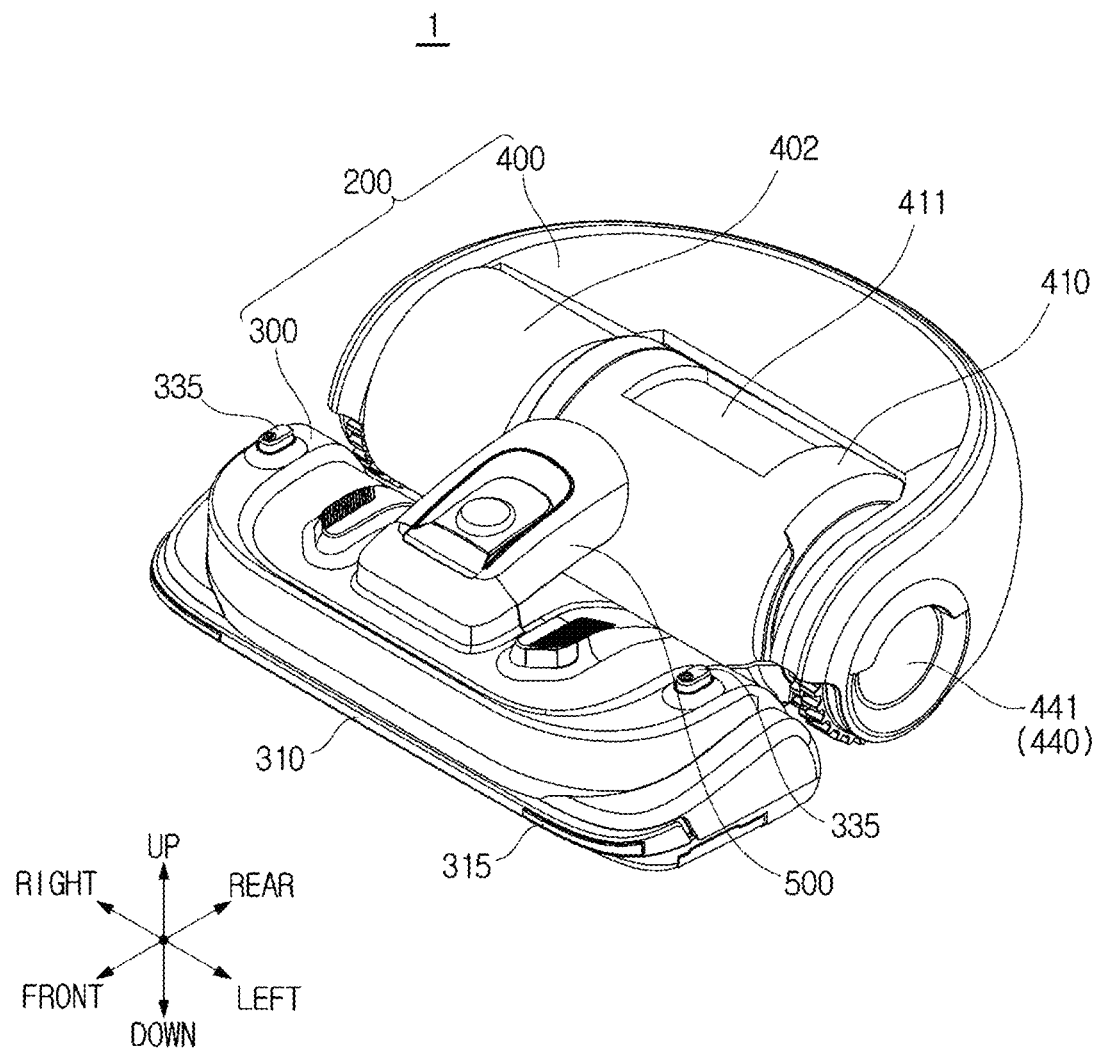

[Fig. 24]
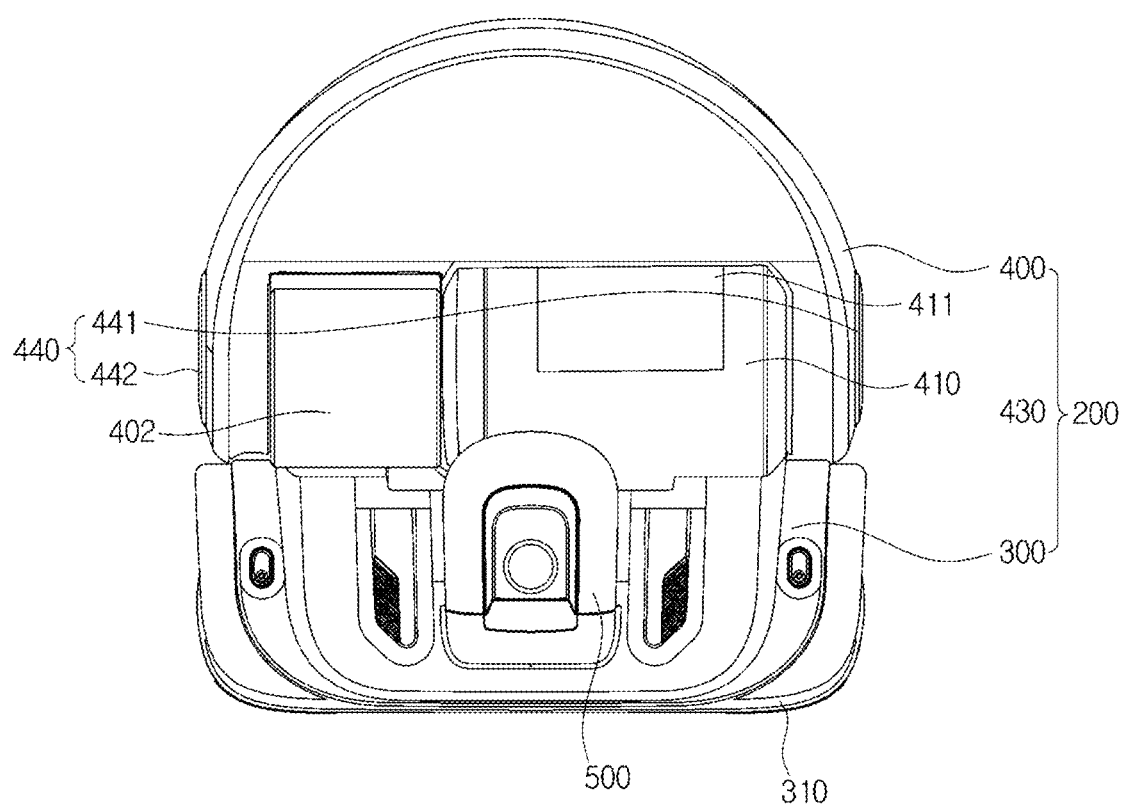

[Fig. 25]
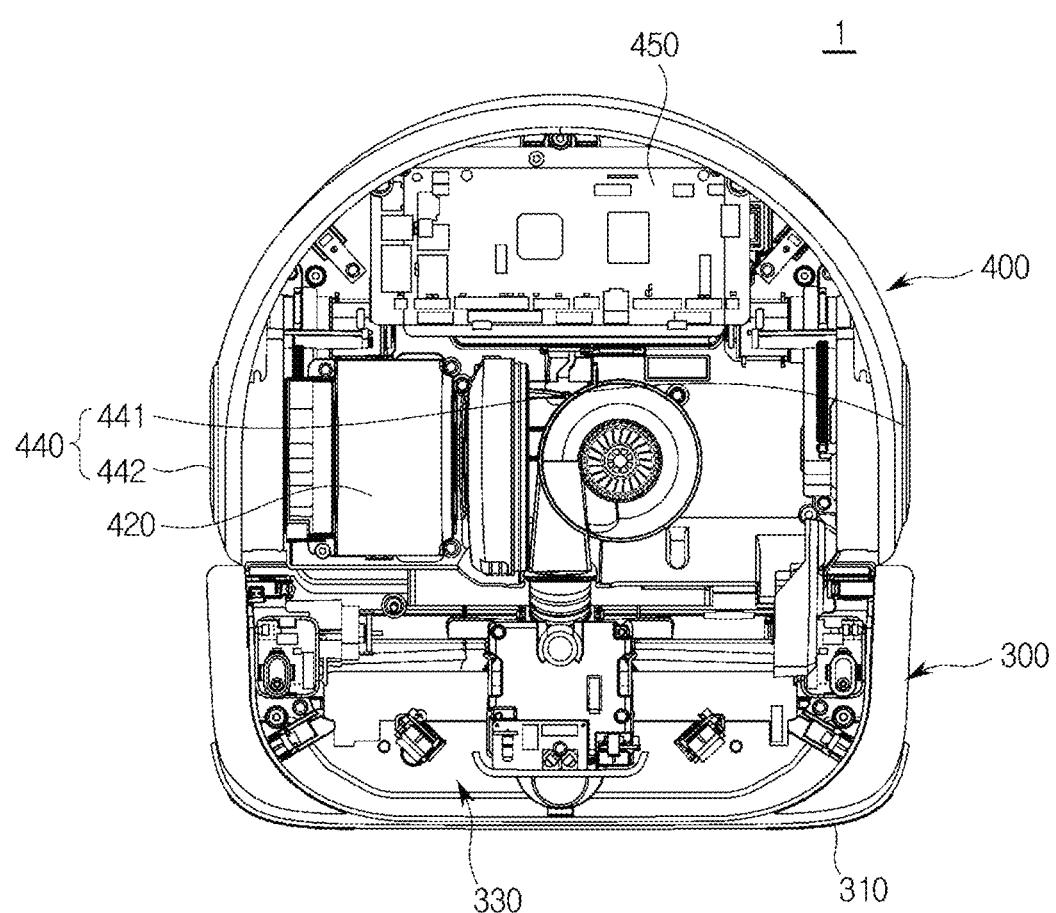

[Fig. 26]
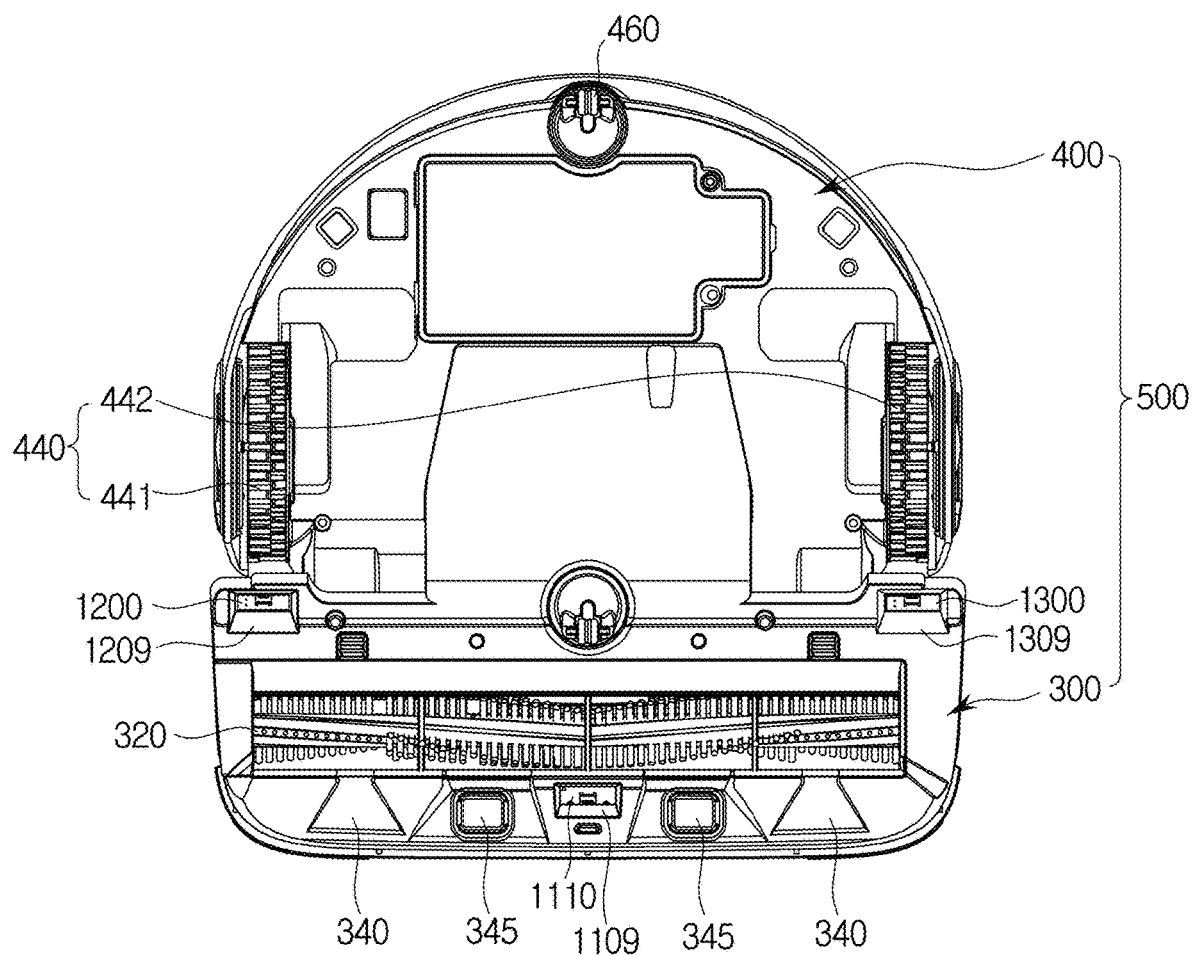

[Fig. 27]
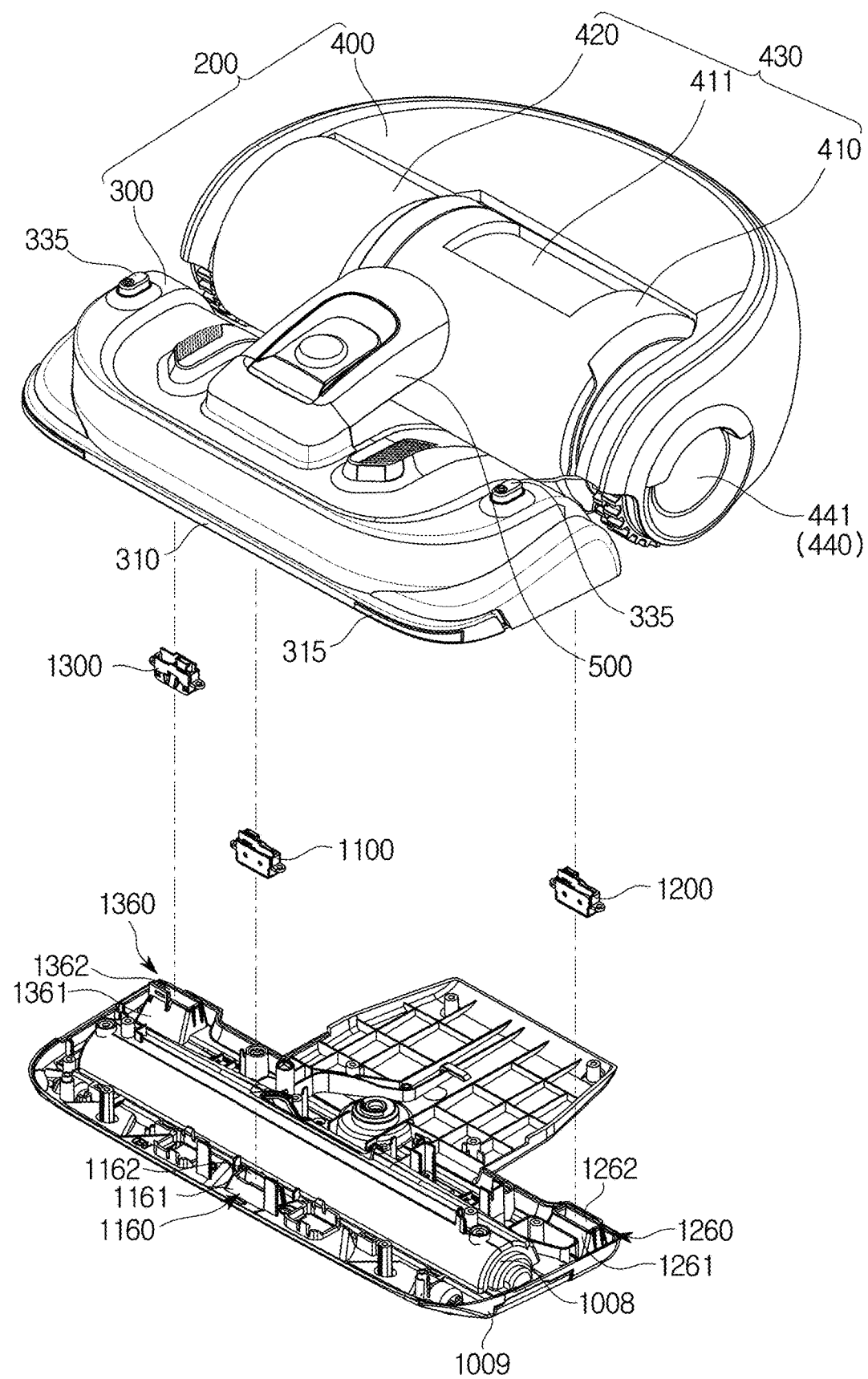

[Fig. 28]
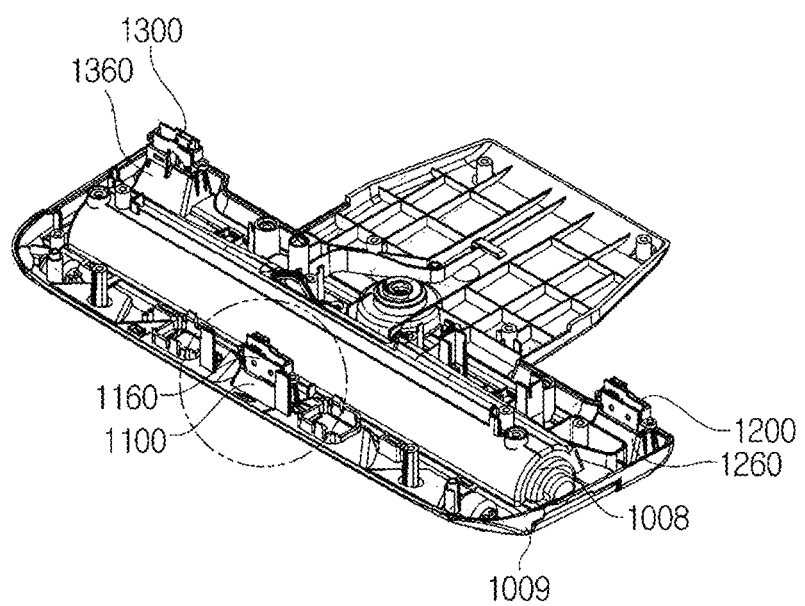

[Fig. 29]
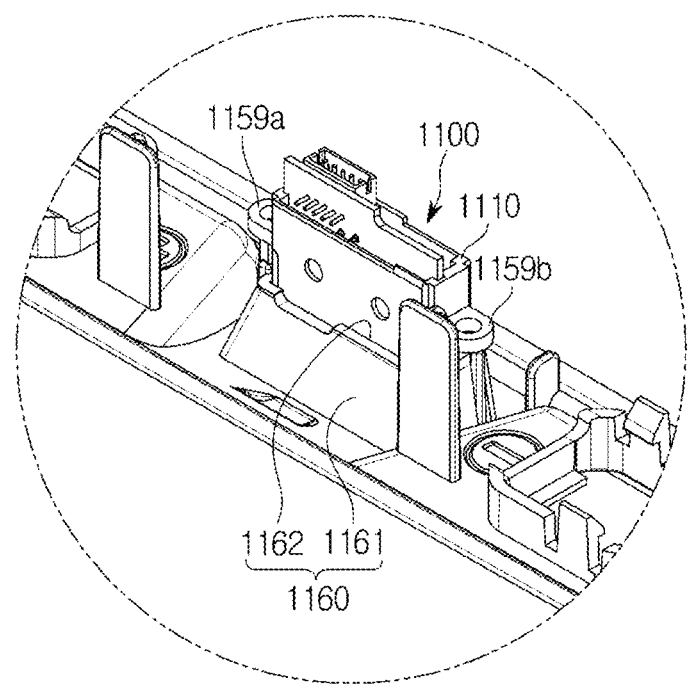

[Fig. 30a]
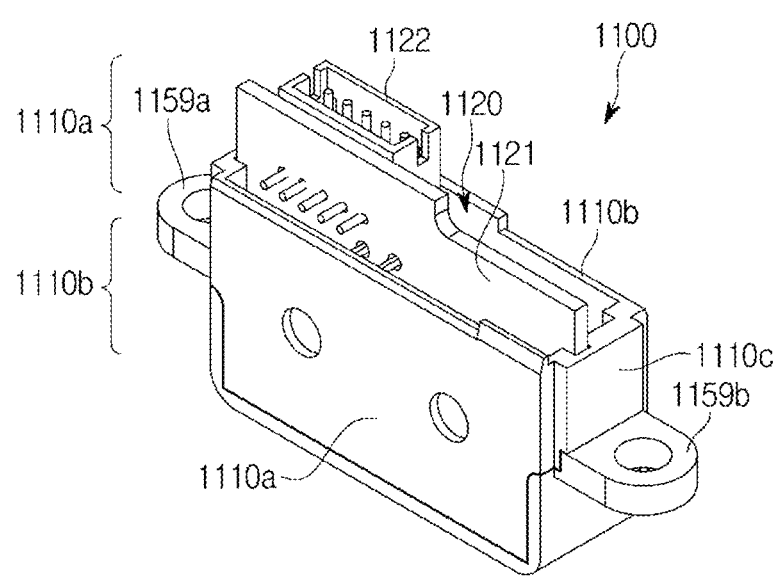

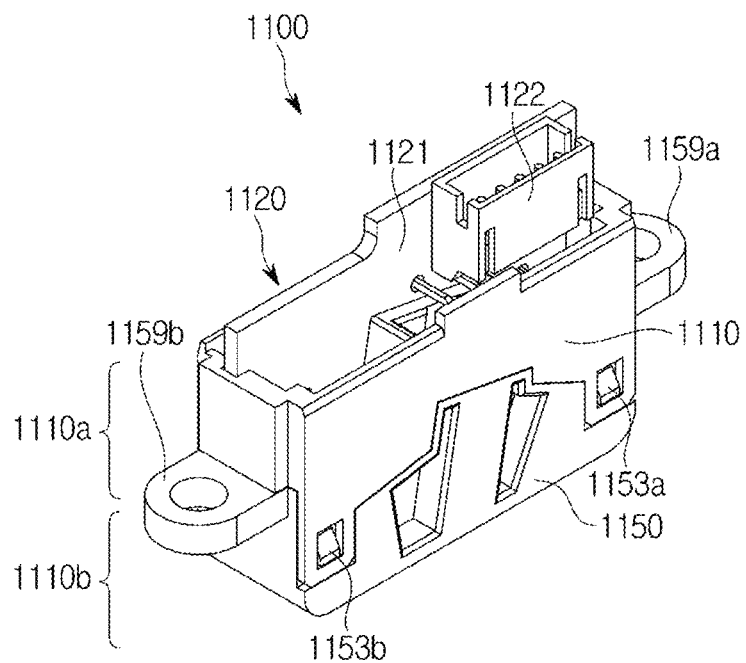
[Fig. 30b]

[Fig. 31a]
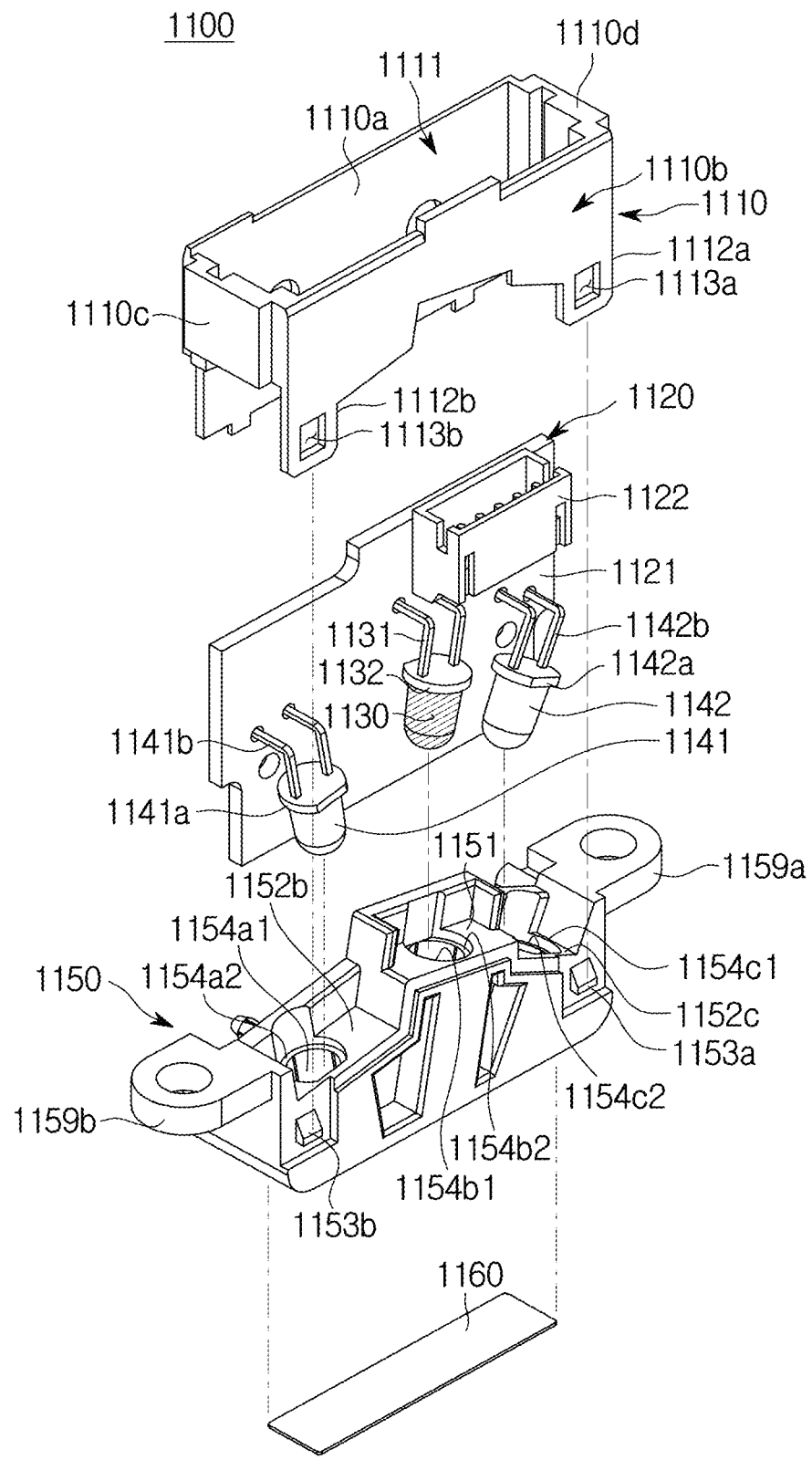

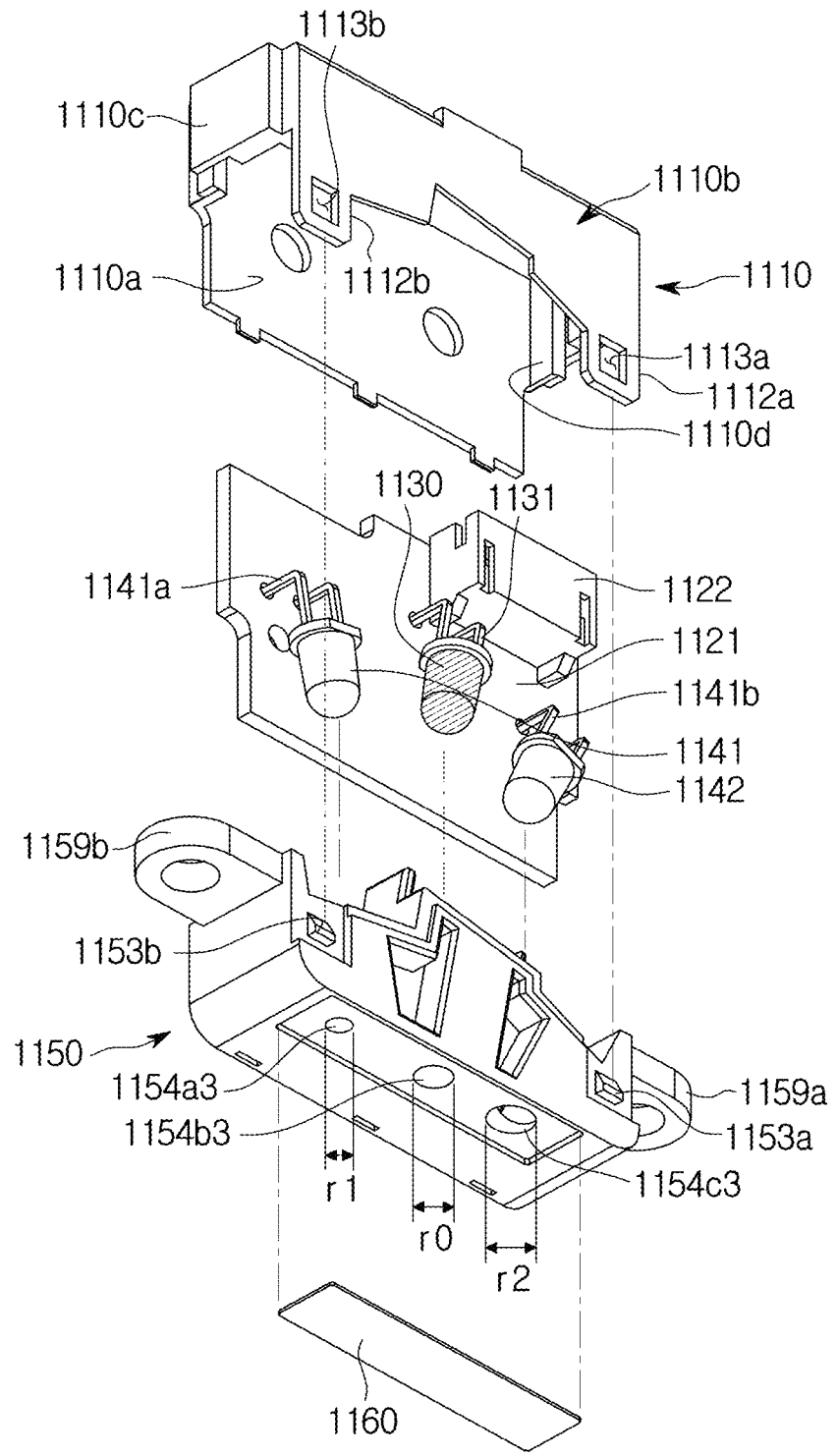
[Fig. 31b]

[Fig. 32]
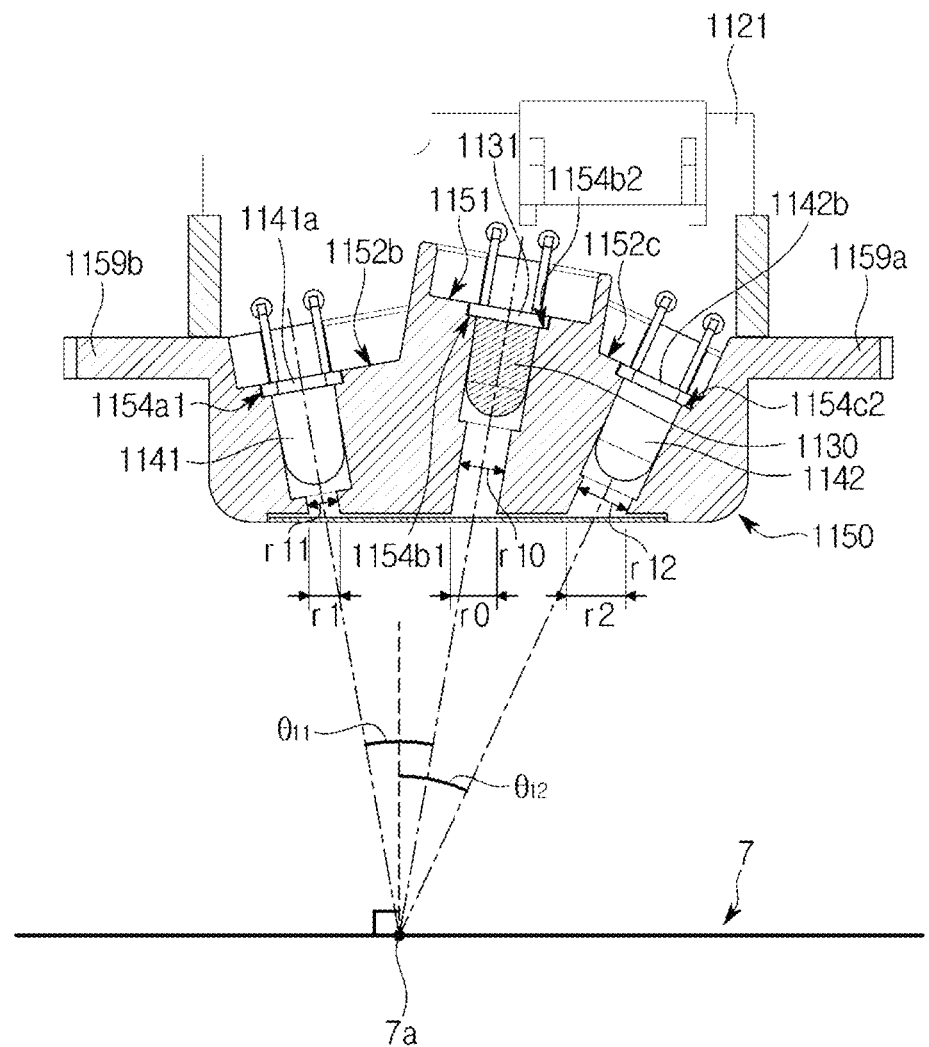

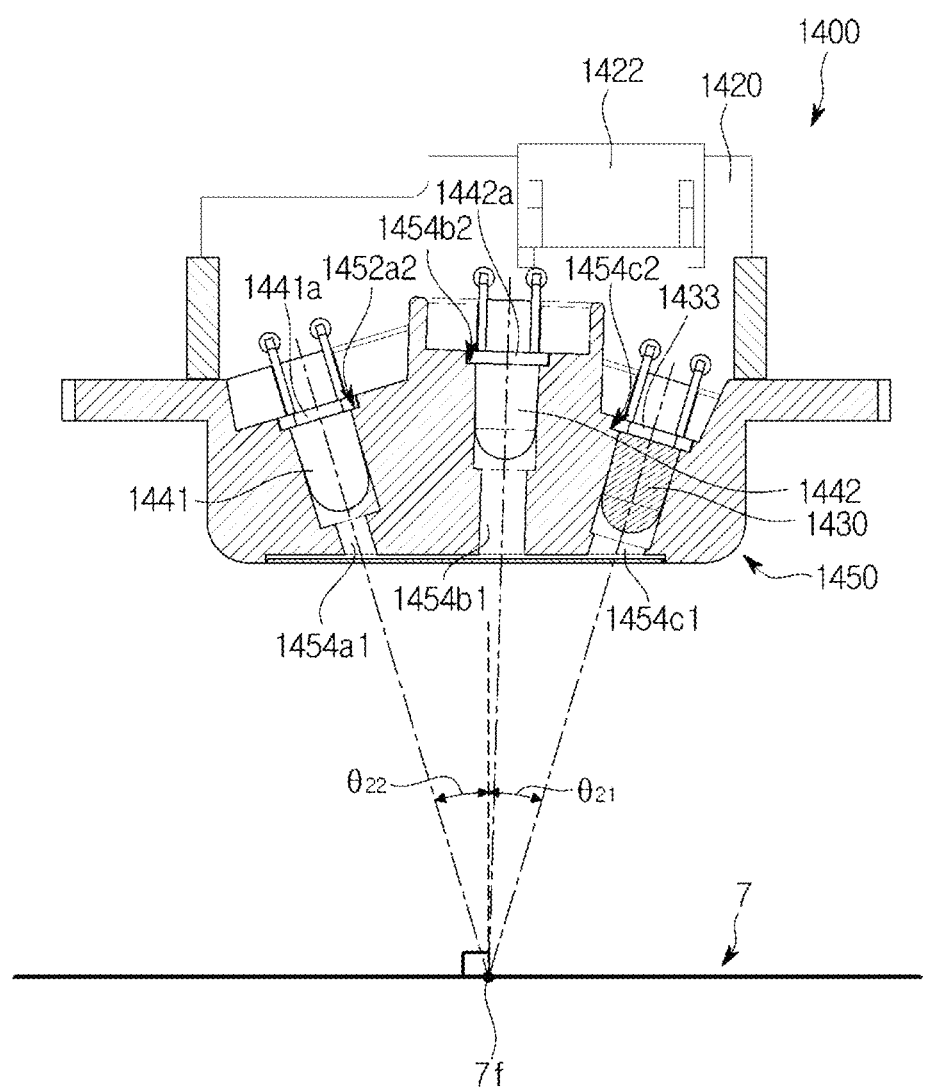
[Fig. 33a]

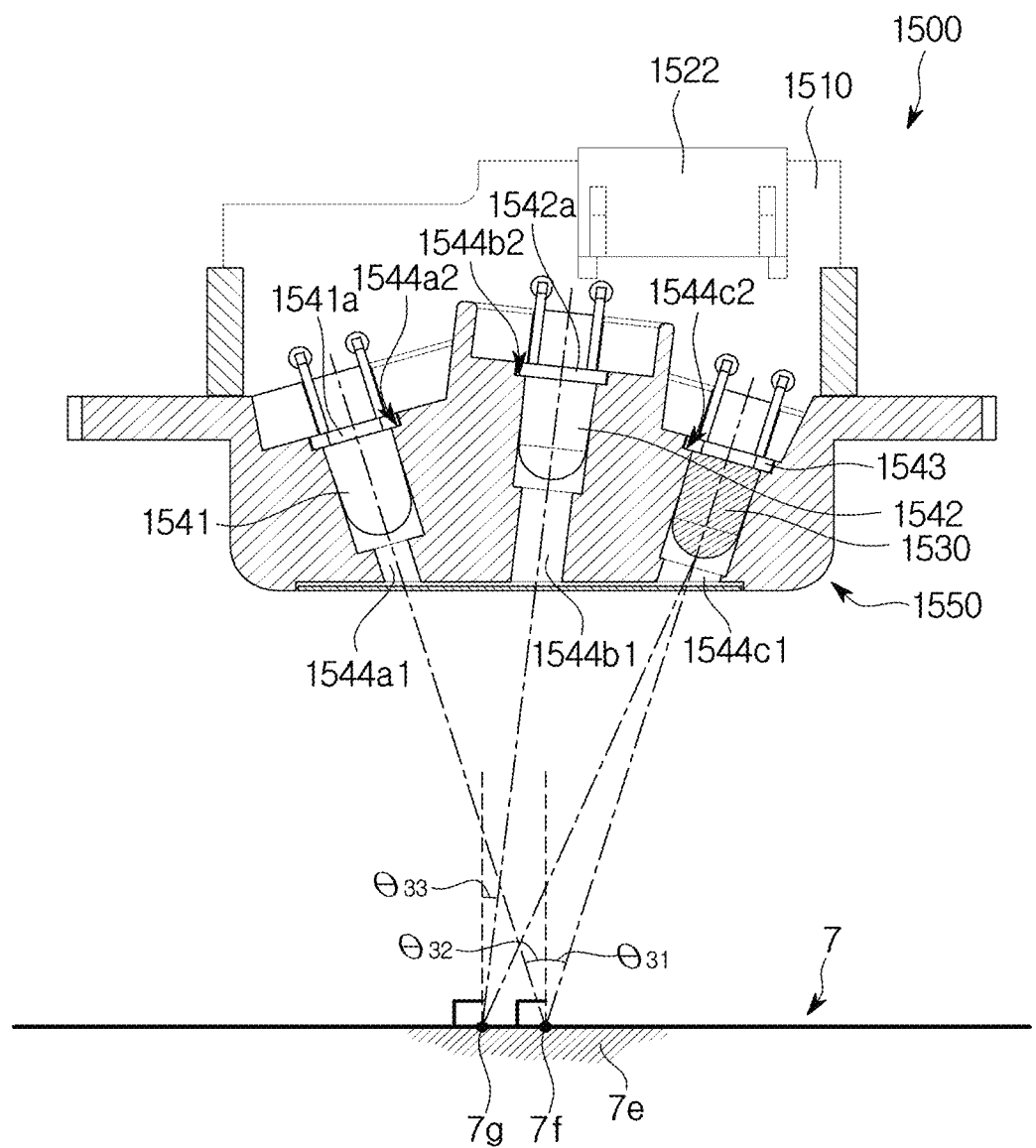
[Fig. 33b]

[Fig. 34a]
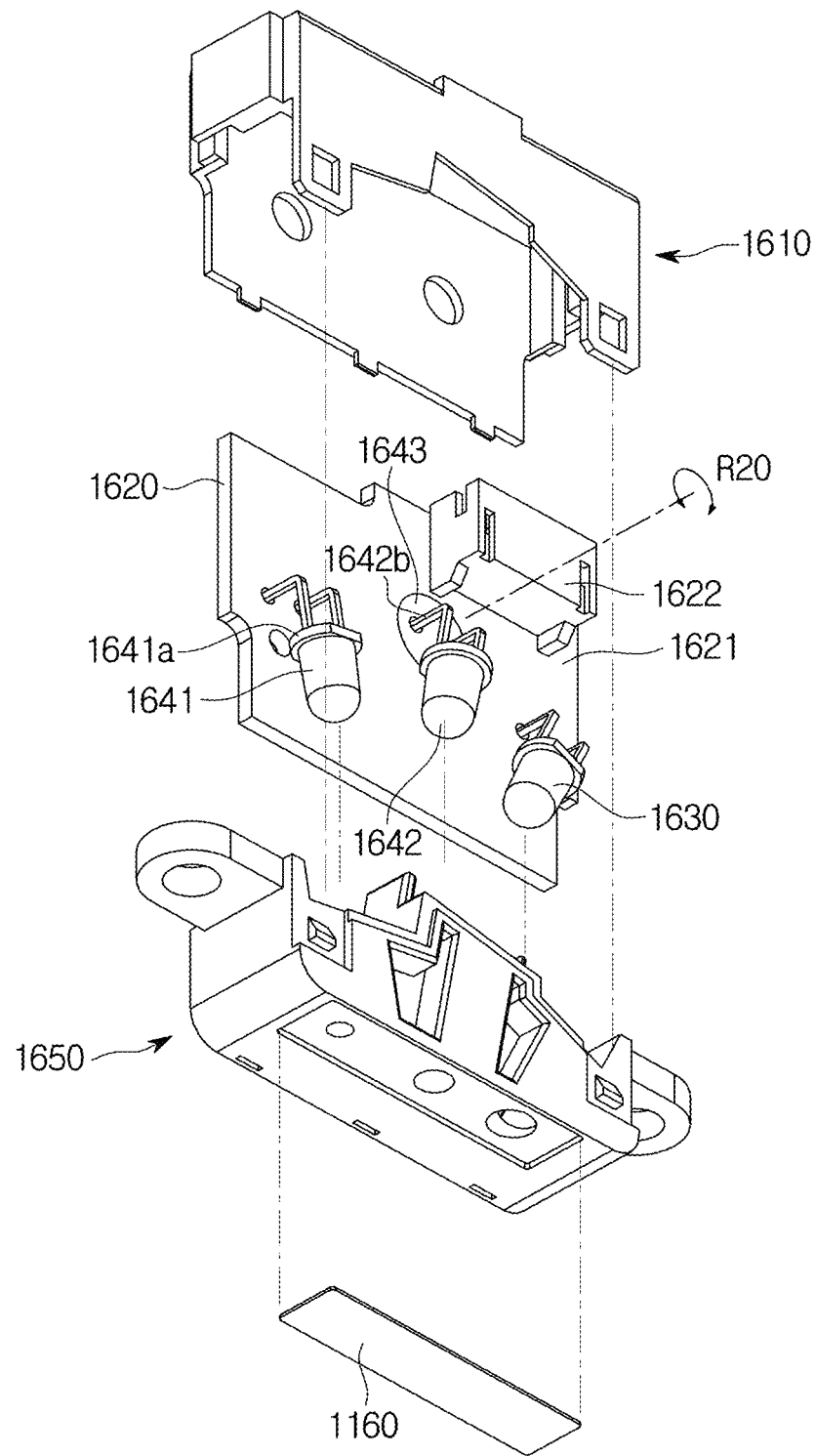

[Fig. 34b]
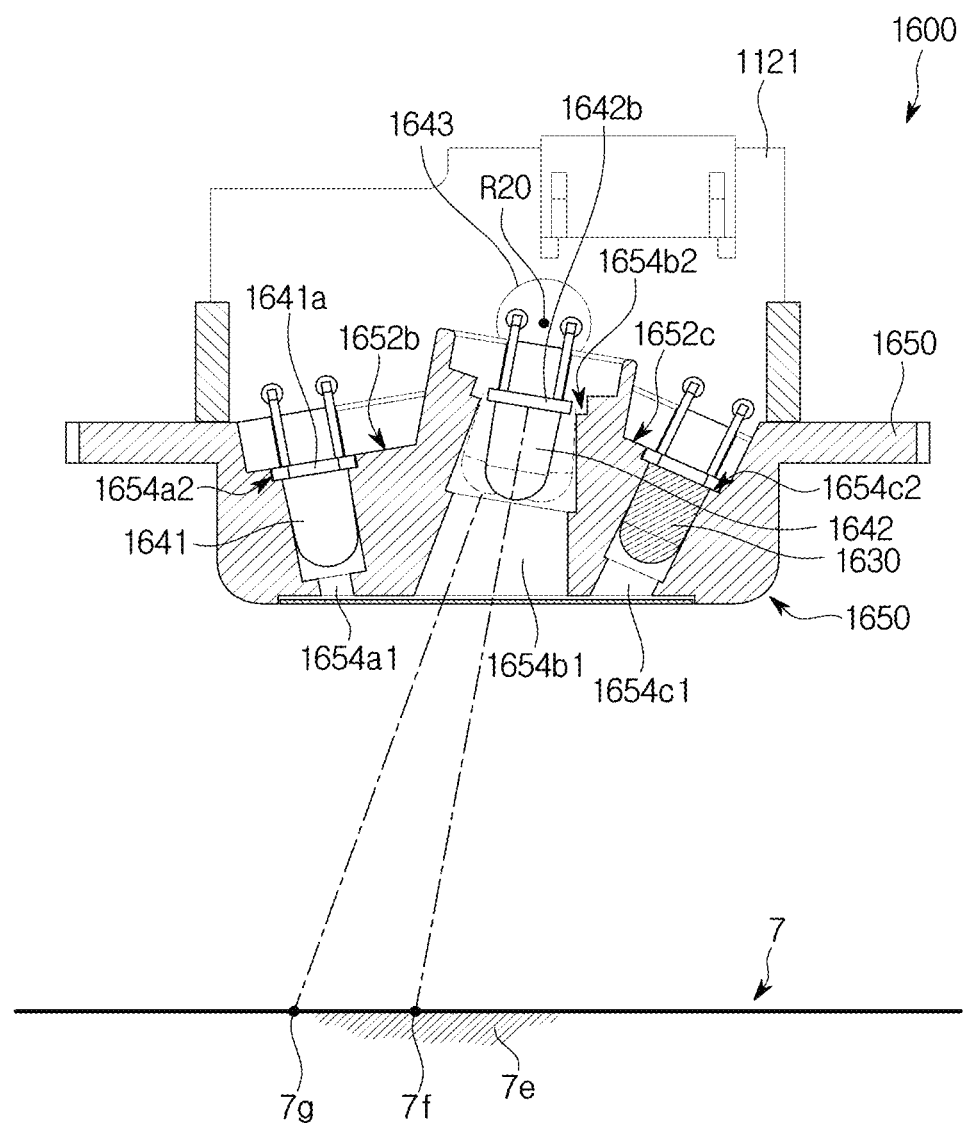

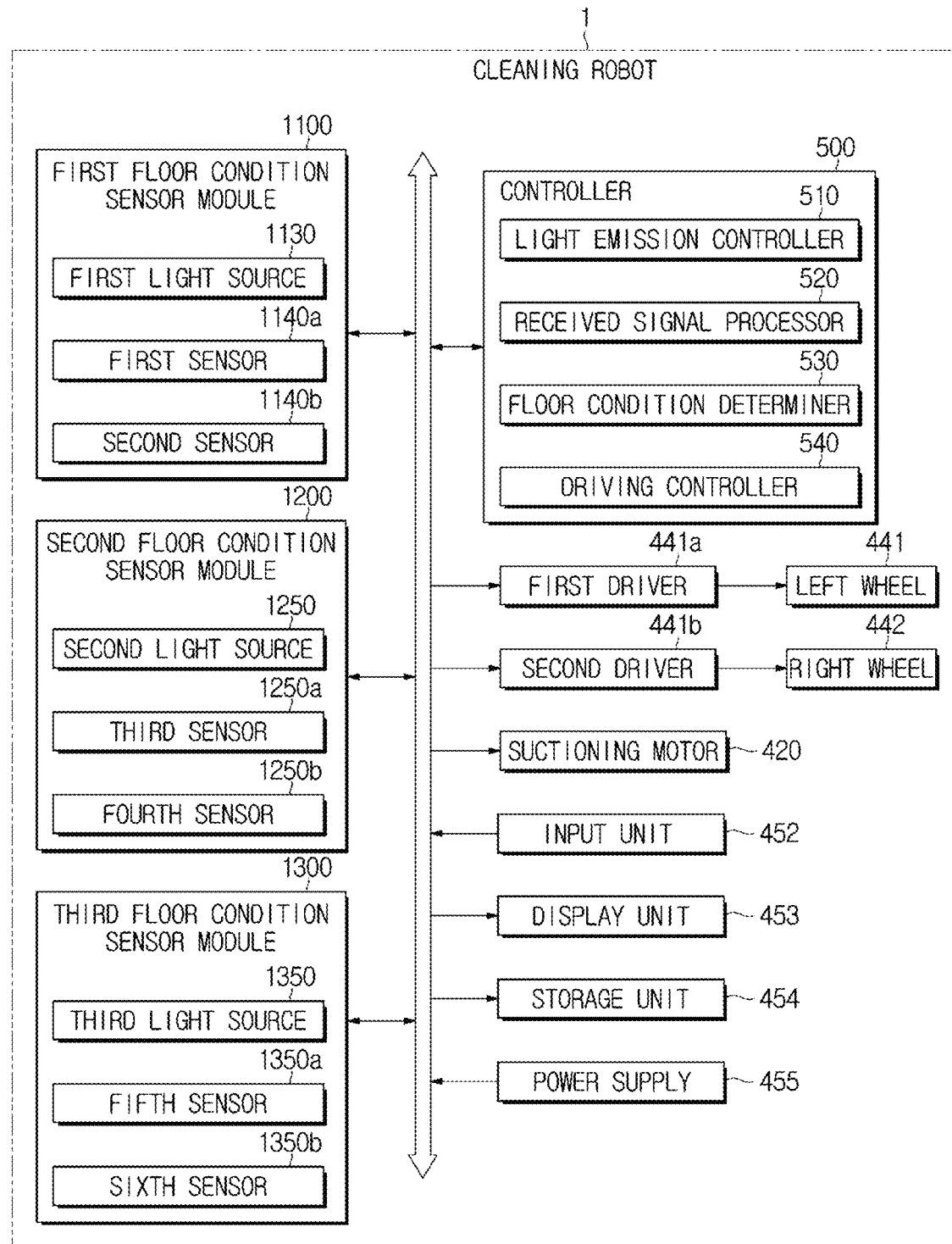
[Fig. 35]

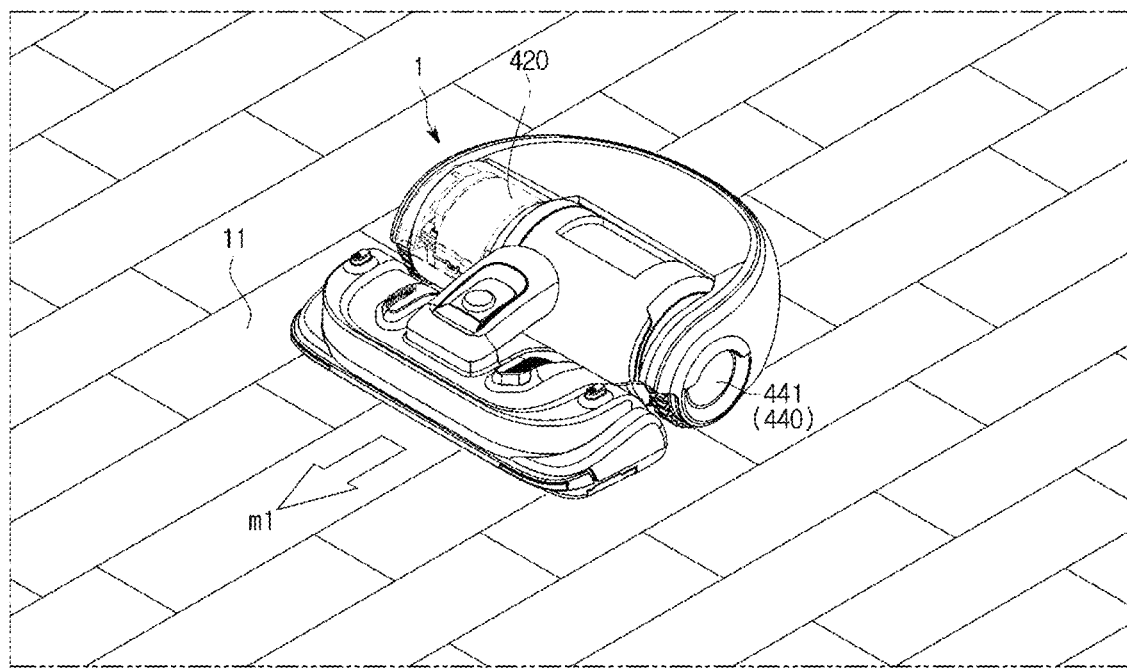
[Fig. 36a]

[Fig. 36b]
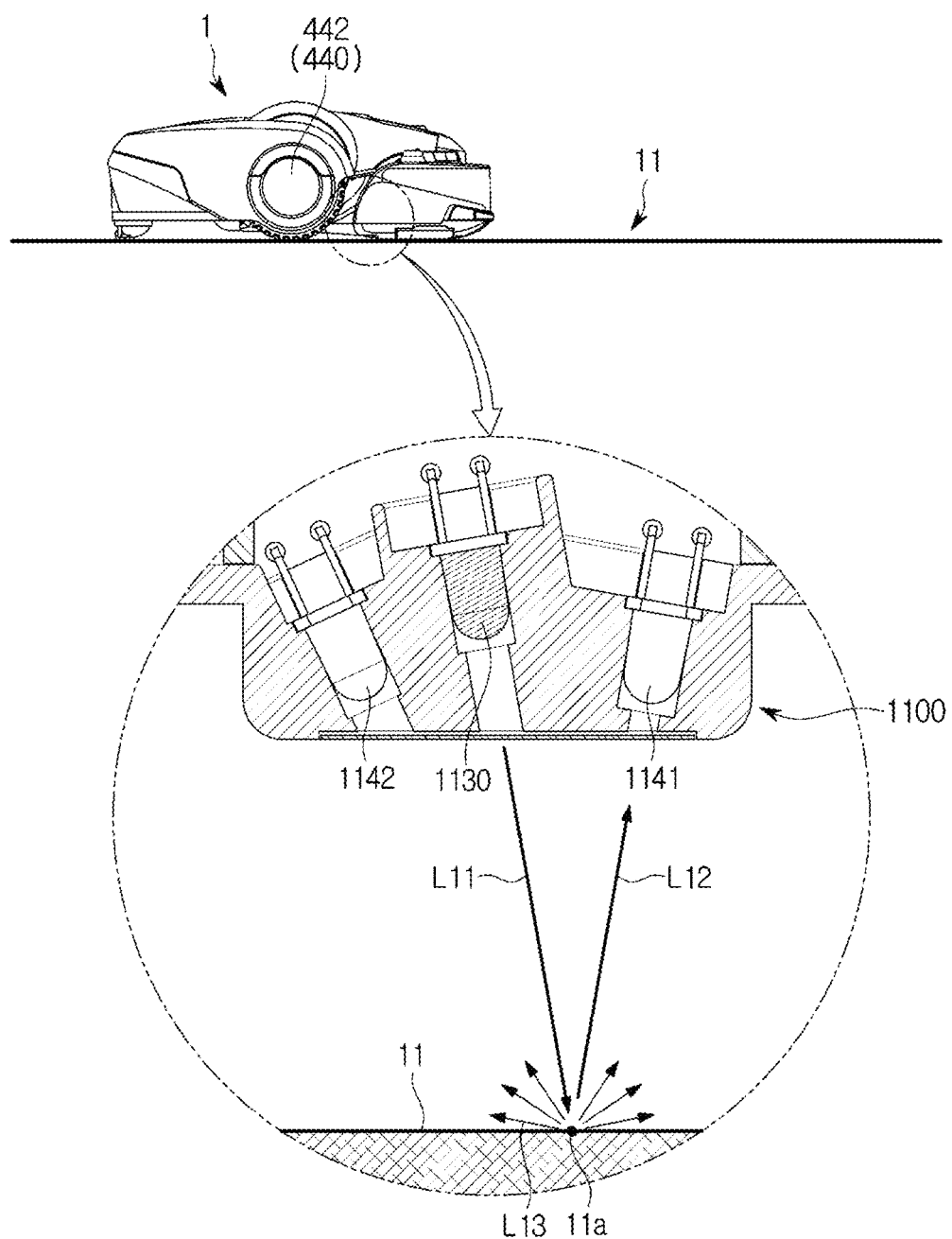

[Fig. 36c]
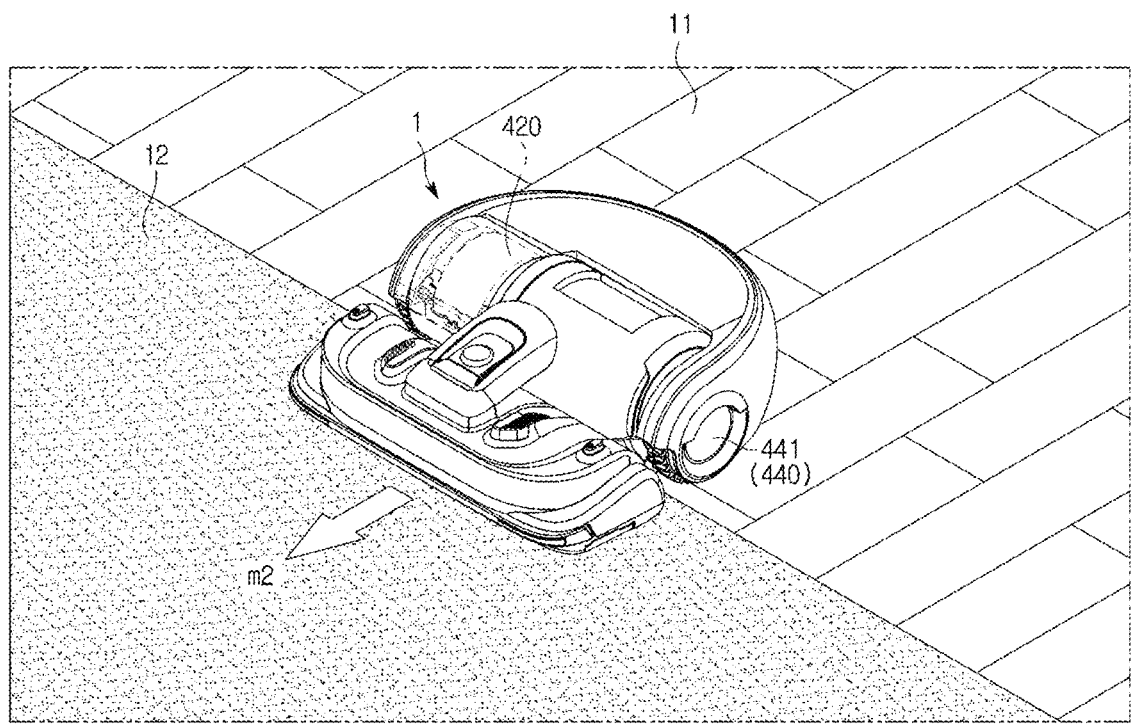

[Fig. 36d]
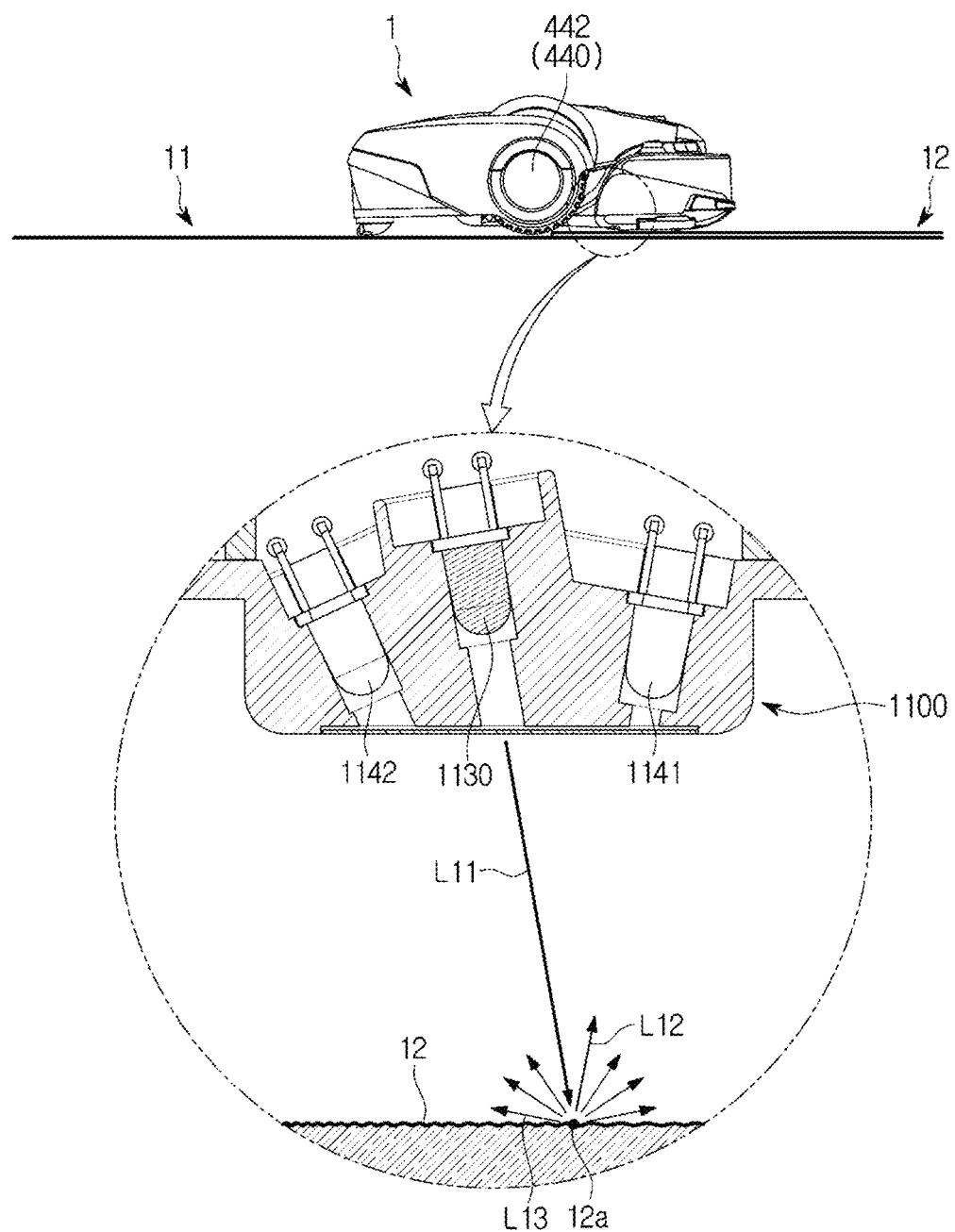

[Fig. 36e]
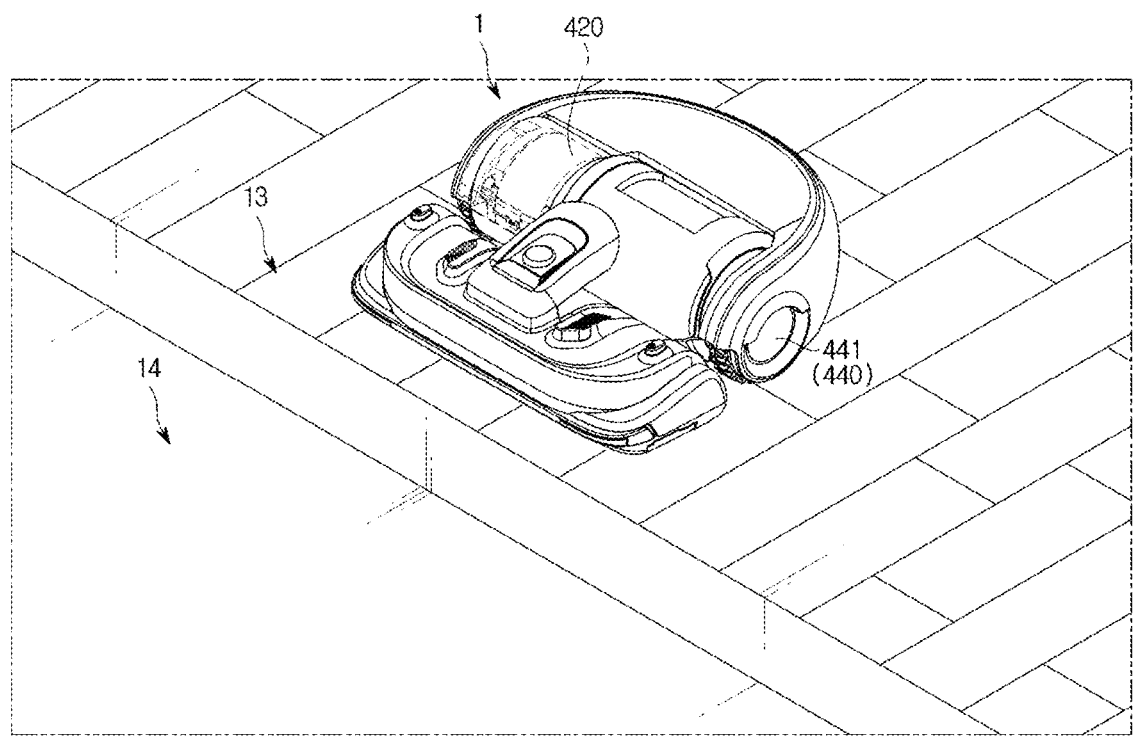

[Fig. 36f]
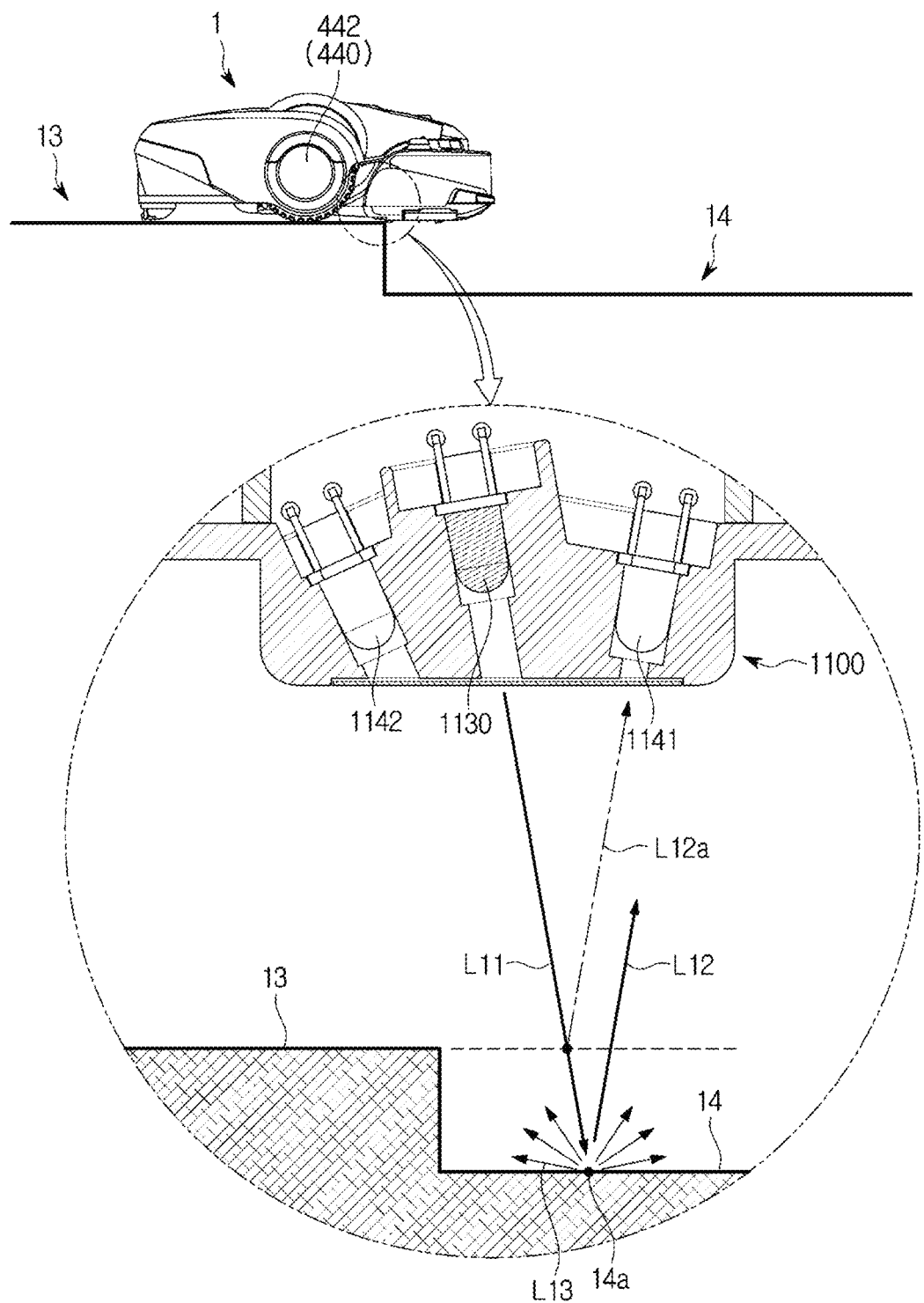

[Fig. 36g]
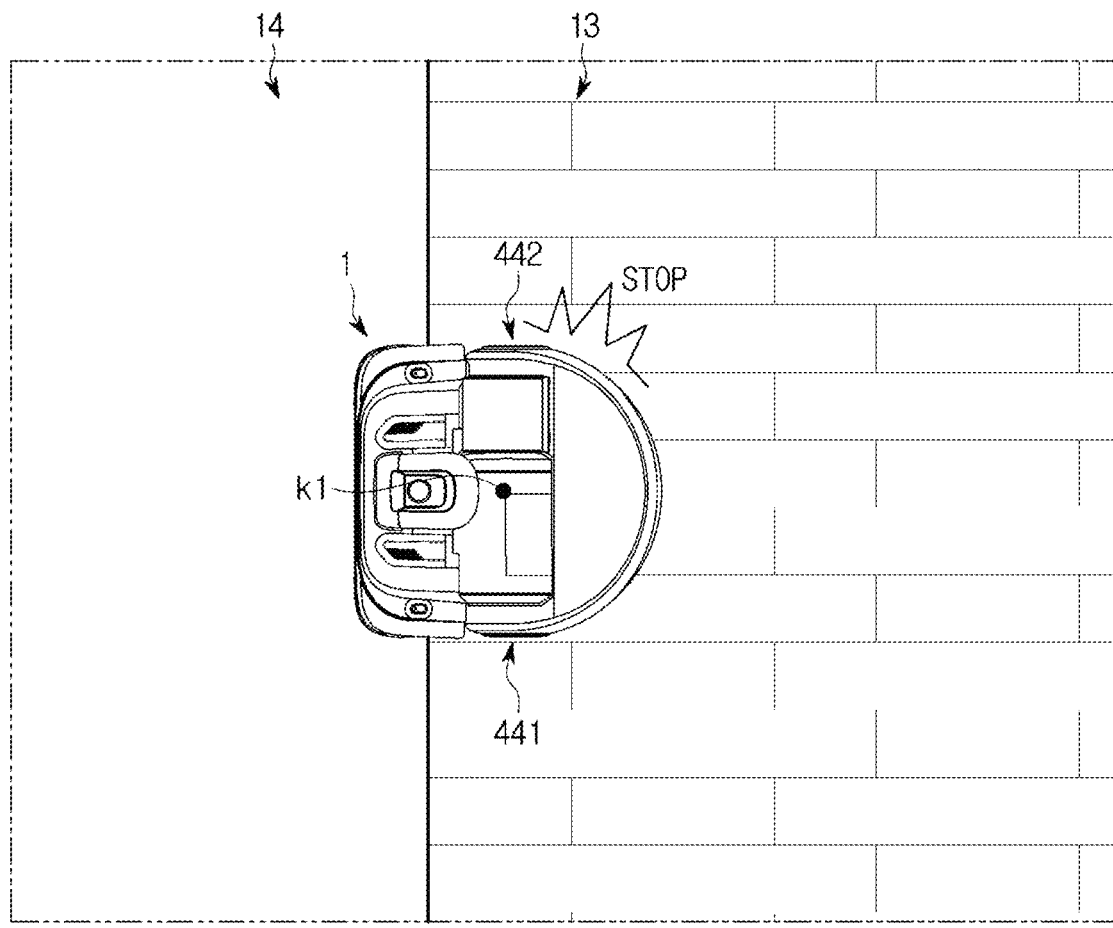

[Fig. 36h]
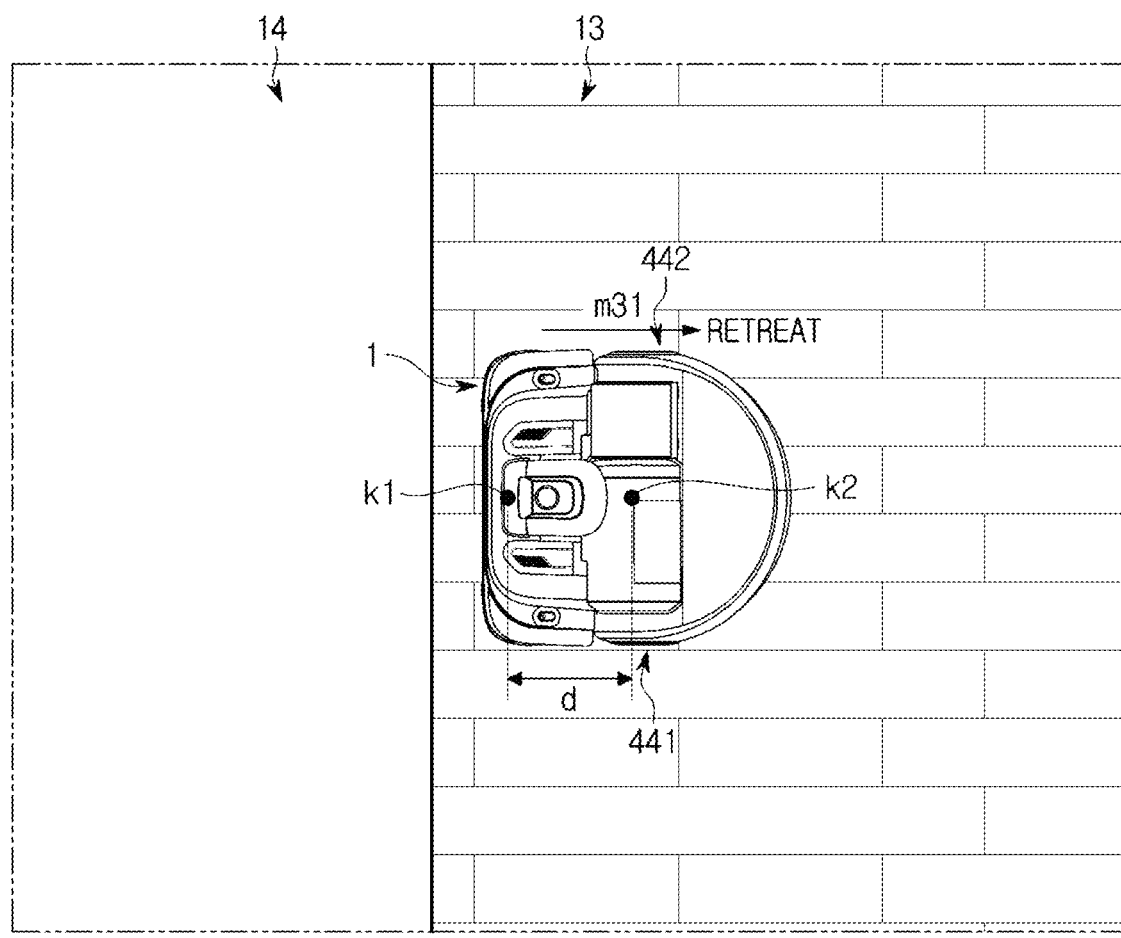

[Fig. 36i]
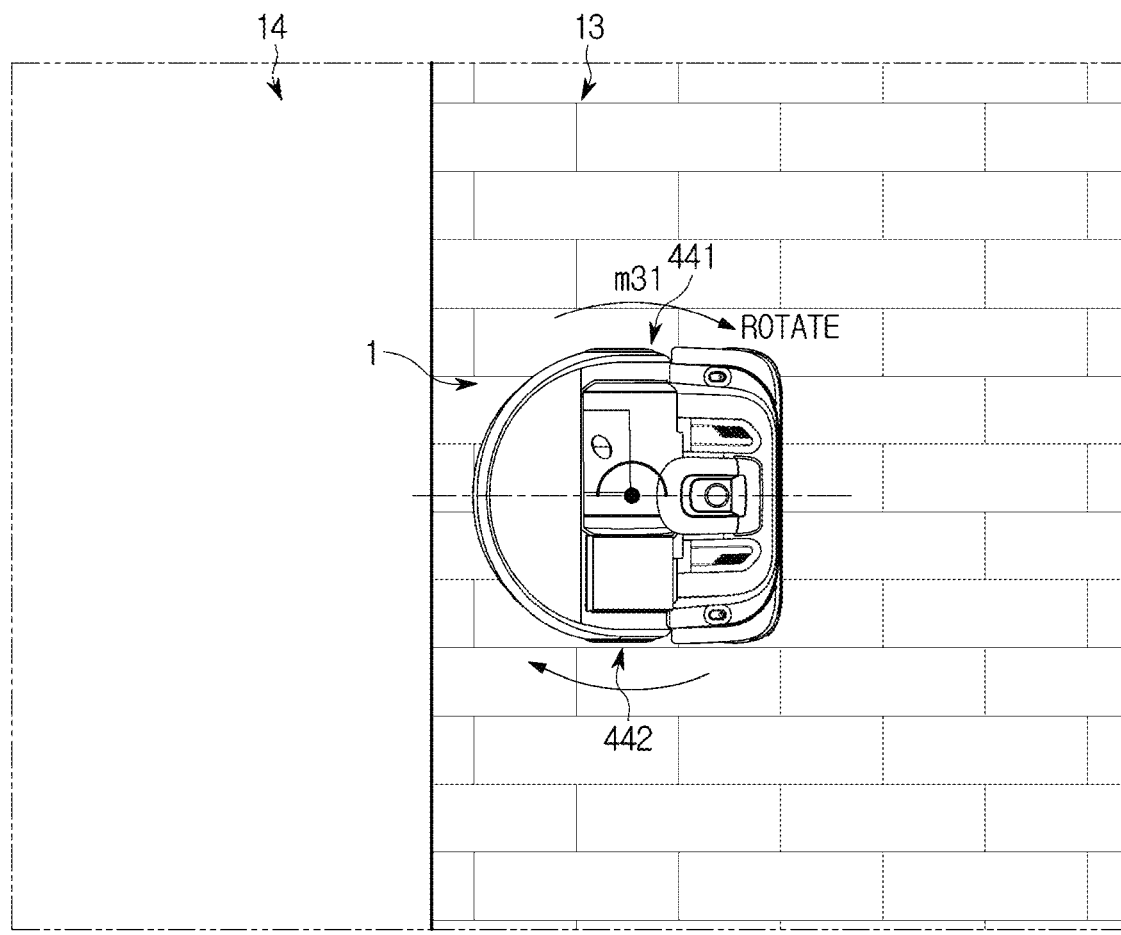

[Fig. 36j]
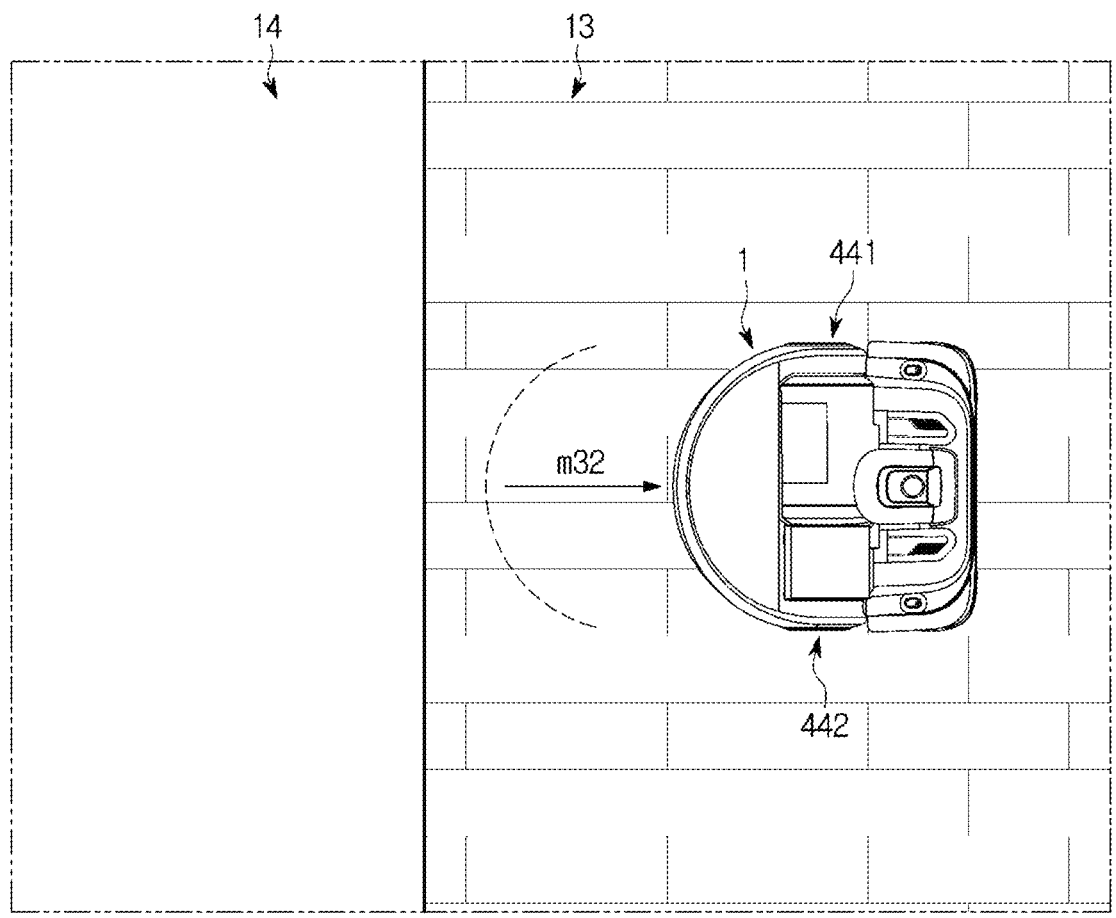

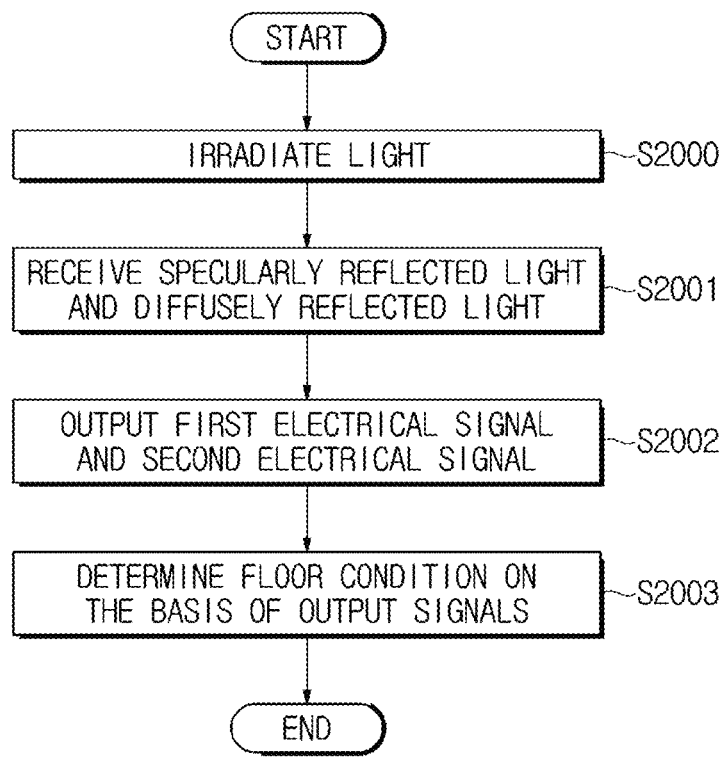
[Fig. 37a]

[Fig. 37b]
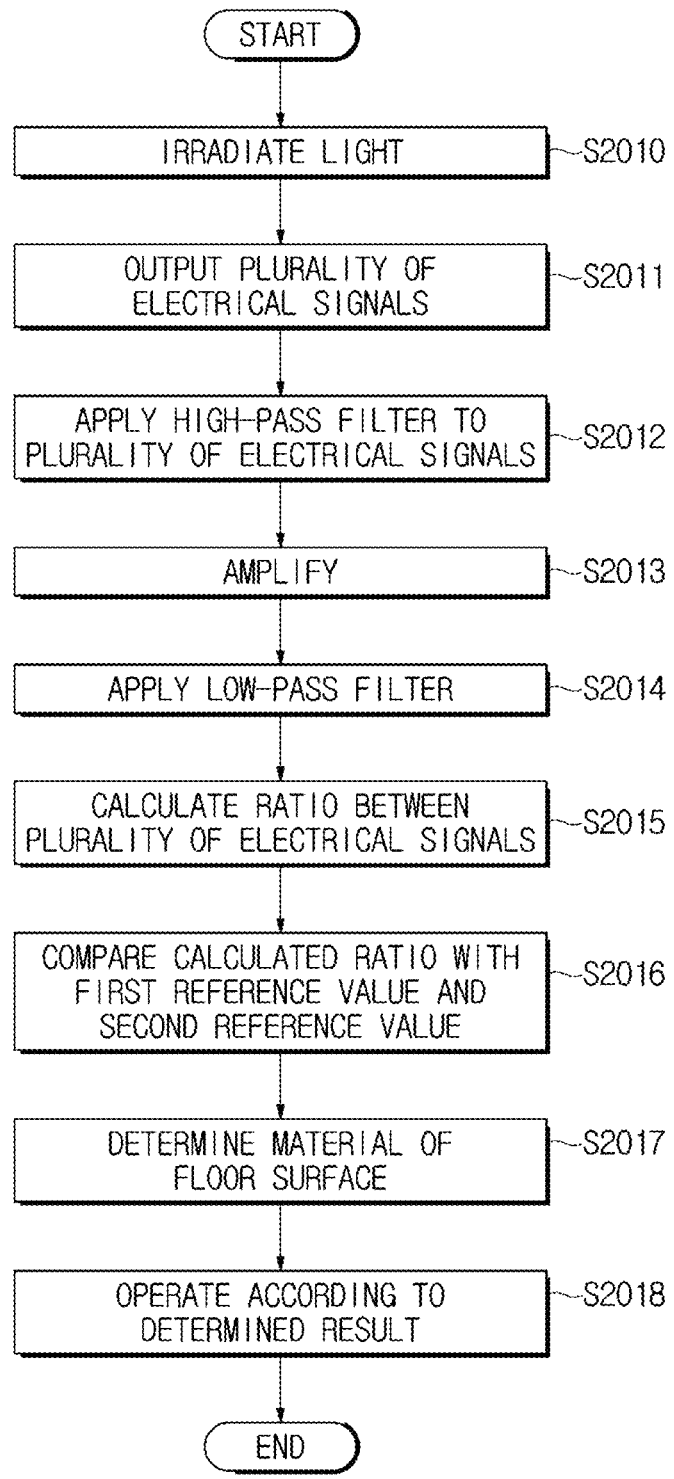

[Fig. 38]
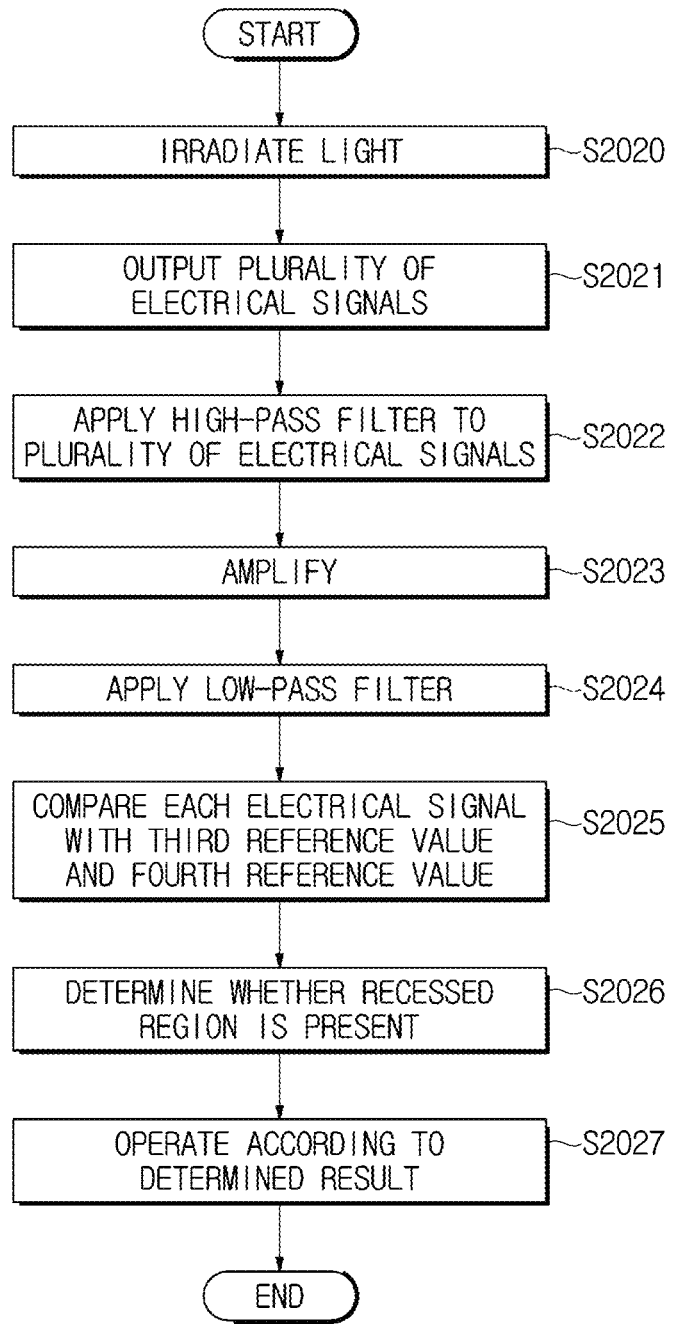

[Fig. 39]
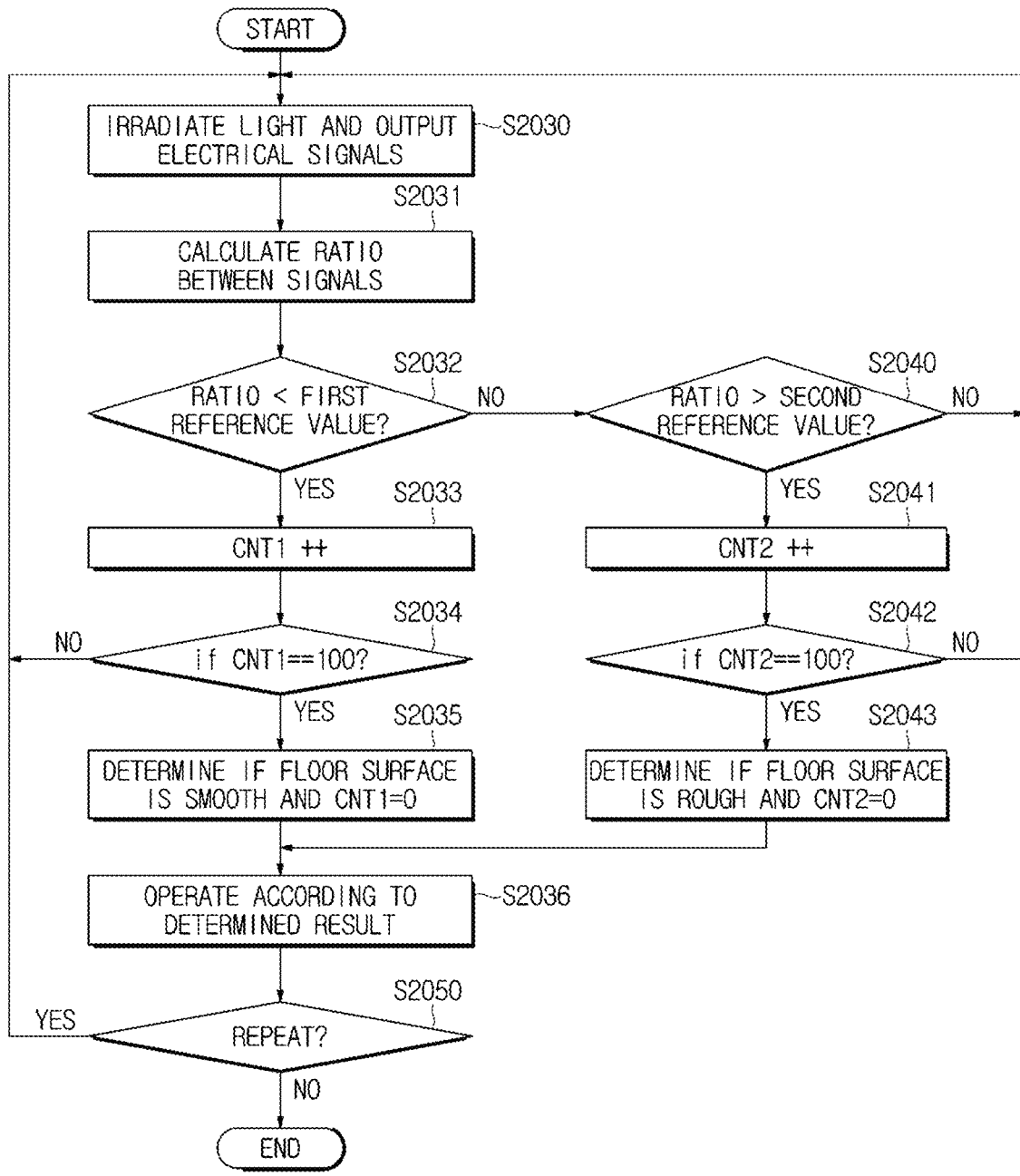

[Fig. 40]
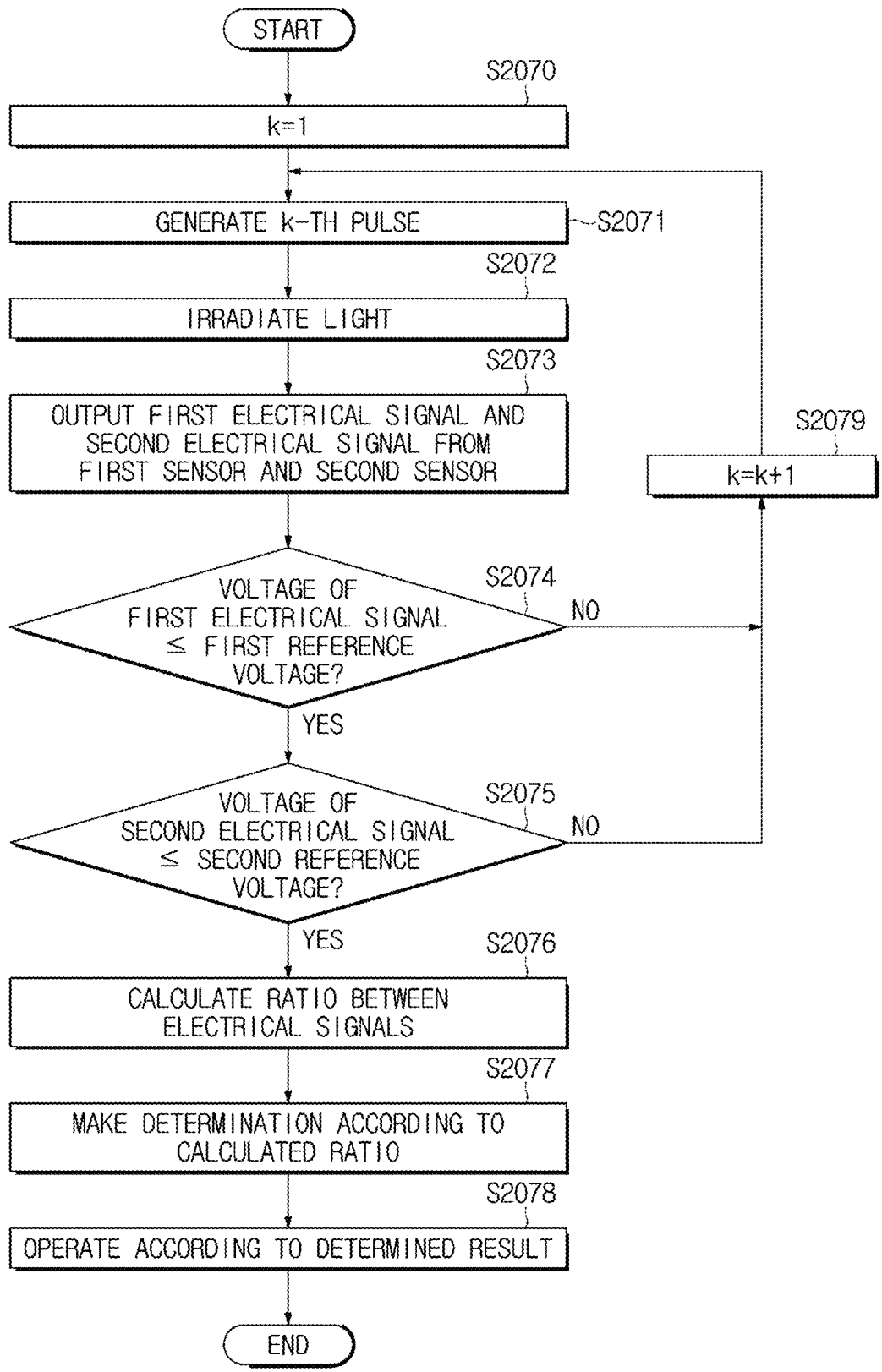

MOVING OBJECT, CLEANING ROBOT, FLOOR CONDITION DETERMINING DEVICE, METHOD OF CONTROLLING THE MOVING OBJECT, AND METHOD OF CONTROLLING THE CLEANING ROBOT

CROSS-REFERENCE TO RELATED APPLICATIONS AND CLAIM OF PRIORITY

This application is a 371 of International Application No. PCT/KR2016/012178 filed Oct. 27, 2016, which claims priority to Korean Patent Application No. KR 10-2015-0162065 filed on Nov. 18, 2015 and Korean Patent Application No. 10-2016-0133506 filed on Oct. 14, 2016, the disclosures of which are herein incorporated by reference in their entireties.

TECHNICAL FIELD

The present disclosure relates to a moving object, a cleaning robot, a floor condition determining device, a method of controlling the moving object, and a method of controlling the cleaning robot.

BACKGROUND

A moving object refers to a device which is capable of moving from a predetermined position to another position, and moves from a particular position to another position using a traveling means such as a wheel, a rail, a walking leg, or the like. A moving object may collect external information using a sensor and the like and then move according to the collected information or may also be moved by a user using a separate manipulation means.

Such a moving object may include various movable devices. For example, a moving object may include a vehicle, a cart, various pieces of construction equipment, a cleaning robot, a toy car, a medical device that is movable using a wheel or the like, a moving robot used for industrial or military purposes, and the like.

Among the above-mentioned, the cleaning robot is a device capable of autonomously traveling on a floor surface and automatically cleaning an area to be cleaned. Such a cleaning robot detects distances to obstacles such as pieces of furniture, office supplies, and walls within an area to be cleaned by using various sensors and the like, and uses the detected information to clean the area to be cleaned while traveling so as not to collide with the obstacles.

The cleaning robot may clean a floor surface using at least one of a dry cleaning method in which cleaning is performed by suctioning foreign substances such as dust from the floor surface and a wet cleaning method in which cleaning is performed by rubbing a floor surface with a damp cloth.

SUMMARY

It is an aspect of the present disclosure to provide a moving object capable of accurately and easily determining a condition of a floor surface on which a cleaning robot is traveling, a cleaning robot, a method of controlling the moving object, and a method of controlling the cleaning robot.

It is another aspect of the present disclosure to provide a moving object capable of determining material of a floor surface on which a cleaning robot is traveling or determining whether a recessed region is present on the floor surface to determine risk of the cleaning robot falling, a cleaning robot, a method of controlling the moving object, and a method of controlling the cleaning robot.

It is still another aspect of the present disclosure to provide a moving object capable of more accurately determining the condition of a floor surface by removing interference due to a disturbance light when the condition of the floor surface is determined by irradiating light toward the floor surface, a cleaning robot, a method of controlling the moving object, and a method of controlling the cleaning robot.

In order to solve the above problems, a moving object, a cleaning robot, a method of controlling the moving object, and a method of controlling the cleaning robot are provided.

A cleaning robot comprises a light source configured to irradiate a first light to a floor surface, a first sensor configured to sense a light specularly reflected from the floor surface, a second sensor configured to sense light diffusely reflected from the floor surface, at a position different from that of the first sensor, and a controller configured to determine a condition of the floor surface on the basis of a result sensed by the first sensor and the second sensor.

The controller compares a voltage of a first electrical signal output from the first sensor with a first reference voltage and compares a voltage of a second electrical signal output from the second sensor with a second reference voltage.

When the voltage of the first electrical signal is lower than the first reference voltage and the voltage of the second electrical signal is lower than the second reference voltage, the controller determines a condition of the floor surface using a ratio of a voltage of an electrical signal output from the second sensor with respect to a voltage of an electrical signal output from the first sensor, or determines that a recessed region is present on the floor surface using at least one of the electrical signal output from the first sensor and the electrical signal output from the second sensor.

When the voltage of the first electrical signal is higher than the first reference voltage or the voltage of the second electrical signal is higher than the second reference signal, the controller controls the light source to irradiate a second light with an intensity relatively lower than that of the first light.

The controller determines a surface condition of the floor surface using a ratio of a voltage of an electrical signal output from the second sensor with respect to a voltage of an electrical signal output from the first sensor, or determines that a recessed region is present on the floor surface using at least one of the electrical signal output from the first sensor and the electrical signal output from the second sensor.

The light source irradiates a light toward the floor surface in at least one incident angle, and the first sensor is disposed on a traveling path of a light reflected in an angle of reflection, which is the same as the incident angle.

The second sensor is disposed between the first sensor and the light source or disposed opposite the first sensor with respect to the light source.

The light source irradiates the first light through a plurality of times, the first sensor and the second sensor respectively output a first electrical signal and a second electrical signal through a plurality of times, and the controller calculates a ratio between a voltage of the first electrical signal and a voltage of the second electrical signal every time the electrical signals are output.

The controller compares a result of calculating the ratio between the voltage of the first electrical signal and the voltage of the second electrical signal with a reference value, increases a count variable according to a result of comparison, and determines a condition of the floor surface on the basis of whether the count variable is equal to a preset count reference value.

The controller applies a high-pass filter to an electrical signal output from at least one of the first sensor and the second sensor to remove noise due to a disturbance light from the electrical signal.

The controller applies a low-pass filter to the electrical signal to which the high-pass filter is applied.

The cleaning robot comprises a plurality of floor condition sensor modules and the controller for determining a condition of a floor according to an electrical signal output from at least one of the plurality of floor condition sensor modules. The plurality of floor condition sensor modules include a plurality of sensors that receive light from a light source that irradiates light to the floor surface and light that is reflected from the floor surface after being irradiated by the light source. One of the plurality of sensors may receive the light specularly reflected from the floor surface, and the other may receive the light diffusely reflected from the floor surface.

A method of controlling a cleaning robot comprises, irradiating a first light toward a floor surface, sensing a light reflected from the floor surface by each of a first sensor and a second sensor disposed at different positions, wherein the first sensor receives a light specularly reflected from the floor surface, and the second sensor receives light diffusely reflected from the floor surface, and determining a condition of the floor surface on the basis of results of sensing by the first sensor and the second sensor.

The method of controlling a cleaning robot further comprises, comparing a voltage of a first electrical signal output from the first sensor with a first reference voltage, and comparing a voltage of a second electrical signal output from the second sensor with a second reference voltage.

The determining of the condition of the floor surface on the basis of the results of sensing by the first sensor and the second sensor includes at least one of determining a condition of the floor surface using a ratio between a first electrical signal output from the first sensor and a second electrical signal output from the second sensor when the voltage of the first electrical signal is lower than the first reference voltage and the voltage of the second electrical signal is lower than the second reference voltage, and determining that a recessed region is present on the floor surface using at least one of a first electrical signal output from the first sensor and a second electrical signal output from the second sensor when the voltage of the first electrical signal is lower than the first reference voltage and the voltage of the second electrical signal is lower than the second reference voltage.

The method of controlling a cleaning robot comprises, irradiating a second light with an intensity relatively lower than that of the first light when the voltage of the first electrical signal is higher than the first reference voltage or the voltage of the second electrical signal is higher than the second reference signal.

The determining of the condition of the floor surface on the basis of the results of sensing by the first sensor and the second sensor includes determining a surface condition of the floor surface using a ratio of a voltage of an electrical signal output from the second sensor with respect to a voltage of an electrical signal output from the first sensor.

The determining of the condition of the floor surface on the basis of the results of sensing by the first sensor and the second sensor includes at least one of determining that the floor surface is a smooth surface using a ratio between a first electrical signal and a second electrical signal, and determining that the floor surface is a rough surface using a ratio between a first electrical signal and a second electrical signal.

The determining of the condition of the floor surface on the basis of the results of sensing by the first sensor and the second sensor includes determining that a recessed region is present on the floor surface using at least one of the first electrical signal output from the first sensor and the second electrical signal output from the second sensor.

The determining of the condition of the floor surface on the basis of the results of sensing by the first sensor and the second sensor includes comparing a result of calculating a ratio between a voltage of a first electrical signal and a voltage of a second electrical signal with a reference value, increasing a count variable according to a result of comparison, and determining a condition of the floor surface on the basis of whether the count variable is equal to a preset count reference value.

According to the above-described moving object, cleaning robot, method of controlling the moving object, and method of controlling the cleaning robot, a condition of a floor surface on which the cleaning robot is traveling can be accurately and easily determined.

According to the above-described moving object, cleaning robot, method of controlling the moving object, and method of controlling the cleaning robot, by determining material of the floor surface on which a cleaning robot is traveling or determining whether a recessed region is present on the floor surface, risk of the cleaning robot falling can be determined.

According to the above-described moving object, cleaning robot, method of controlling the moving object, and method of controlling the cleaning robot, when a condition of a floor surface is determined by irradiating light toward the floor surface, the condition of the floor surface can be more accurately determined by removing interference due to a disturbance light.

BRIEF DESCRIPTION OF THE DRAWINGS

FIG. 1 is a view of a moving object according to an embodiment.

FIG. 2 is a view of light reflected from a floor surface.

FIG. 3 is a view of a positional relationship between a light source, a first sensor, and a second sensor.

FIG. 4A is a view of a form in which light is reflected from a smooth floor surface.

FIG. 4B is a view of an example of electrical signals output from the first sensor and the second sensor when the light reflected from the smooth floor surface is received.

FIG. 5A is a view of a form in which light is reflected from a rough floor surface.

FIG. 5B is a view of an example of electrical signals output from the first sensor and the second sensor when the light reflected from the rough floor surface is received.

FIG. 6A is a view of an example in which the moving object determines whether a recessed region is present on a floor surface.

FIG. 6B is a view of an example of an electrical signal output from the first sensor and the second sensor when the recessed region is present on the floor surface.

FIG. 7 is a view of a moving object according to another embodiment.

FIG. 8 is a view of an example in which each of the sensors of the moving object receives light.

FIG. 9 is a view of another example in which each of the sensors of the moving objects receives light.

FIG. 10 is a detailed control block diagram of the controller according to one embodiment.

FIG. 11 is a view of an example of a pulse signal applied to the light source.

FIG. 12 is a view of a disturbance light.

FIG. 13 is a view of electrical signals output from the first sensor and the second sensor due to the disturbance light.

FIG. 14 is a view of an example of electrical signals including noise components output from the first sensor.

FIG. 15 is a view of an example of electrical signals filtered by a high-pass filter.

FIG. 16 is a view of an example of electrical signals filtered by a low-pass filter.

FIG. 17 is a block diagram of a floor condition determiner according to one embodiment.

FIG. 18A is a view of an example of electrical signals output when a floor surface is sensed as a smooth wooden floor.

FIG. 18B is a view of an example of electrical signals output when a floor surface is a carpet surface.

FIG. 18C is a view of operation of the counter.

FIG. 19 is a view of an example of electrical signals output when a recessed region is present on the floor surface.

FIG. 20 is a view of the moving object according to another embodiment.

FIG. 21 is a control block diagram of the controller according to another embodiment.

FIG. 22A is a view of an example of an intensity of light emitted from the light source according to control of the first pulse generator and the second pulse generator.

FIG. 22B is a view of an example of a signal output from the first sensor in response to light emitted by control of the first pulse generator.

FIG. 22C is a view of an example of a signal output from the second sensor in response to light emitted by control of the first pulse generator.

FIG. 22D is a view of an example of signals output from the first sensor in response to light emitted by control of the second pulse generator.

FIG. 22E is a view of an example of signals output from the second sensor in response to light emitted by control of the second pulse generator.

FIG. 23 is a perspective view of an exterior of a cleaning robot according to one embodiment.

FIG. 24 is a plan view of the cleaning robot according to one embodiment.

FIG. 25 is a plan view of an internal structure of the cleaning robot according to one embodiment.

FIG. 26 is a bottom plan view of the cleaning robot according to one embodiment.

FIG. 27 is a view of an example in which floor condition sensor modules are installed in the cleaning robot.

FIG. 28 is a view of the example in which the floor condition sensor modules are installed in the cleaning robot.

FIG. 29 is a view of the example in which the floor condition sensor modules are installed in the cleaning robot in more detail.

FIG. 30A is a first perspective view of the floor condition sensor module according to one embodiment.

FIG. 30B is a second perspective view of the floor condition sensor module according to one embodiment.

FIG. 31A is a first exploded perspective view of the floor condition sensor module according to one embodiment.

FIG. 31B is a second exploded perspective view of the floor condition sensor module according to one embodiment.

FIG. 32 is a front cross-sectional view of the floor condition sensor module according to one embodiment.

FIG. 33A is a front cross-sectional view of a floor condition sensor module according to a second embodiment.

FIG. 33B is a front cross-sectional view of a floor condition sensor module according to a third embodiment.

FIG. 34A is an exploded perspective view of a floor condition sensor module according to a fourth embodiment.

FIG. 34B is a front cross-sectional view of the floor condition sensor module according to the fourth embodiment.

FIG. 35 is a control block diagram of the cleaning robot according to one embodiment.

FIG. 36A is a first view of an example of the cleaning robot traveling on a wooden floor with a smooth floor surface.

FIG. 36B is a second view of the example of the cleaning robot traveling on a wooden floor with a smooth floor surface.

FIG. 36C is a first view of an example of the cleaning robot traveling on a carpet.

FIG. 36D is a second view of the example of the cleaning robot traveling on the carpet.

FIG. 36E is a first view of an example of the cleaning robot that reached a recessed region.

FIG. 36F is a first view of the example of the cleaning robot that reached the recessed region.

FIG. 36G is a view of an example of a first operation of the cleaning robot when the cleaning robot reached the recessed region.

FIG. 36H is a view of an example of a second operation of the cleaning robot when the cleaning robot reached the recessed region.

FIG. 36I is a view of an example of a third operation of the cleaning robot when the cleaning robot reached the recessed region.

FIG. 36J is a view of an example of a fourth operation of the cleaning robot when the cleaning robot reached the recessed region.

FIG. 37A is a first flowchart illustrating a method of controlling a moving object according to one embodiment.

FIG. 37B is a second flowchart of a method of controlling a moving object according to one embodiment.

FIG. 38 is a third flowchart of a method of controlling the moving object according to one embodiment.

FIG. 39 is a fourth flowchart of a method of controlling the moving object according to one embodiment.

FIG. 40 is a flowchart of a method of controlling the moving object according to another embodiment.

DETAILED DESCRIPTION

Like reference numerals refer to like elements throughout. Not all elements of embodiments are described herein, and general content in an art to which the disclosure pertains or overlapping content between embodiments will be omitted.

When a certain part is described as "including" a certain element, this signifies that the certain part may also include another element rather than excluding the other element unless particularly described otherwise.

Terms such as "part," "module," and "member," when used herein, may be implemented by software or hardware. According to embodiments, a plurality of "parts," "modules," or "members" may be implemented using a single component, or a single "part," "module," or "member" may be implemented with a plurality of components.

Throughout the specification, when a certain part is described as being "connected" to another part, both a case in which the certain part is indirectly connected to the other part as well as a case in which the certain part is directly connected to the other part are included therein, and the indirect connection includes a connection via a wireless network.

Terms such as "first" and "second" are used to distinguish one element from another element, and elements should not be interpreted as having a particular sequential order by such terms unless particularly described otherwise.

A singular expression includes a plural expression unless context clearly indicates otherwise.

Hereinafter, a moving object according to an embodiment will be described with reference to FIGS. 1 to 22.

FIG. 1 is a view of a moving object according to an embodiment, and FIG. 2 is a view of light reflected from a floor surface. FIG. 3 is a view of a positional relationship between a light source, a first sensor, and a second sensor.

A moving object 100 refers to a device that is movable from a particular position to another position according to user manipulation or predefined settings. The moving object 100 may move in a predetermined pattern according to pre-programmed settings.

According to FIG. 1, the moving object 100 may include a light source 110, a plurality of sensors 111, 112, and a controller 120.

The light source 110 may emit a light L1 and irradiate the light L1 toward a floor surface 7 according to control of the controller 120. Specifically, the light source 110 may emit the light L1 with a predetermined intensity and irradiate the light L1 toward the floor surface 7 according to a control signal transmitted from the controller 120. In this case, the light source 110 may irradiate the light L1 continuously toward the floor surface 7 or irradiate the light L1 toward the floor surface 7 by flickering the irradiated light L1 according to a predefined frequency.

The light L1 emitted from the light source 110 may be visible light of a predetermined color, e.g., visible light of white or blue color, ultraviolet light, or infrared light. When the light source 110 emits visible light, the visible light may be vulnerable to a disturbance light, and therefore the light source 110 may be defined to emit a high level of visible light.

The light L1 emitted by the light source 110 is incident on one region 7a of the floor surface 7. The floor surface 7 refers to a surface on which the moving object 100 may travel, and, for example, may include a ground, a wooden floor, an upper portion of a carpet, an upper surface of a piece of furniture or a home appliance, or the like. The floor surface 7 may be formed of various materials. For example, the floor surface 7 may be formed of at least one of various types of materials such as glass, wood, metal, soil, concrete, fabric, carpet, tiles, and the like. A flat portion or a portion that is recessed and lower than the floor surface 7, e.g., a recess, or a cliff may be present on the floor surface 7.

For example, the light source 110 may be implemented by employing various types of lighting devices such as an incandescent light bulb, a halogen lamp, a fluorescent lamp, a sodium lamp, a mercury lamp, a fluorescent mercury lamp, a xenon lamp, an arc-light lamp, a neon tube lamp, an electroluminescent (EL) lamp, a light emitting diode (LED) lamp, a cold cathode fluorescent lamp (CCFL), and an external electrode fluorescent lamp (EEFL).

According to FIG. 2, by irradiating the light L1 toward the floor surface 7 such that the light L1 is inclined with respect to the floor surface 7, the light source 110 may allow the light L1 to be incident at a predetermined incident angle θ1 on one point or region 7a of the floor surface 7. The light L1 incident on the floor surface 7 is reflected from the point 7a of the floor surface 7 and travels in a predetermined direction. In this case, light L2, which is a portion of the light L1 that reached the floor surface 7, is specularly reflected. An angle of reflection θ2 of the specularly-reflected light L2 is equal to the incident angle θ1. Light L3, which is the other portion of the light L1 that reached the floor surface 7, is diffusely reflected. The diffusely-reflected light L3 is reflected in various directions as illustrated in FIG. 2, according to material of the floor surface 7.

According to an embodiment, as illustrated in FIGS. 1 and 3, the light source 110 may be disposed between a first sensor 111 and a second sensor 112.

The plurality of sensors may include the first sensor 111 and the second sensor 112. The first sensor 111 and the second sensor 112 may respectively sense the rays of lights L2 and L3 irradiated from the light source 110 and then reflected from the floor surface 7, output electrical signals, i.e., a first electrical signal and a second electrical signal, according to a sensed result, and transmit the electrical signals to the controller 120. In this case, the first sensor 111 and the second sensor 112 may respectively output electrical signals in response to quantities of light of the sensed rays of lights L2 and L3. For example, the first sensor 111 and the second sensor 112 may be configured to output electrical signals with a high voltage or current if the level of light is larger and output electrical signals with a low voltage or current if the level of light is smaller.

According to one embodiment, the first sensor 111 is configured to receive the light L2, which is specularly reflected from the floor surface 7, between the rays of lights L2 and L3 reflected from the floor surface 7, and the second sensor 112 is configured to receive the light L3, which is diffusely reflected from the floor surface 7, between the rays of lights L2 and L3 reflected from the floor surface 7. In this case, the first sensor 111 is configured to receive all or a portion of the specularly reflected light L2, and the second sensor 112 is configured to receive all or a portion of the diffusely reflected light L3. To suitably receive the specularly reflected light L2 and the diffusely reflected light L3 as mentioned above, the first sensor 111 and the second sensor 112 may be respectively installed at suitable positions in the moving object 100.

Specifically, to suitably receive the light L2 specularly reflected from the floor surface 7, the first sensor 111 may be disposed on a traveling path of the specularly-reflected light L2. In this case, the first sensor 111 may be suitably disposed according to a position of the light source 110.

For example, the position of the first sensor 111 may be determined in consideration of a distance h0 between the light source 110 and the floor surface 7. Specifically, the position of the first sensor 111 may be determined according to the position 7a at which reflection of the light L1, which is irradiated from the light source 110, is predicted to occur.

Since the angle of reflection θ2 of the light L2 specularly reflected from the specific point 7a is equal to the incident angle θ1 of the light L1 incident on the specific point 7a, a spatial position of the first sensor 111 may also be determined using this. For example, the first sensor 111 may be disposed at a predetermined position so that a ratio between a distance h1 between the first sensor 111 and the floor surface 7 and a distance d1 between the point 7a at which the reflection occurs and a point 7c at which a normal line of the floor surface 7 passing through the first sensor 111 meets the floor surface 7, is equal to a ratio between the distance h0 between the light source 110 and the floor surface 7 and a distance d0 between the point 7a at which the reflection occurs and a point 7b at which a normal line of the floor surface 7 passing through the light source 110 meets the floor surface 7.

The distance h0 between the light source 110 and the floor surface 7 and the distance h1 between the first sensor 111 and the floor surface 7 may be equal to or different from each other. For example, the first sensor 111 may be further spaced apart from the floor surface 7 than the light source 110 (h1>h0). The opposite case is also possible.

The second sensor 112 may be disposed at the opposite side of the first sensor 111 with respect to the light source 110. In other words, the second sensor 112 may be disposed opposite the first sensor 111 with respect to the light source 110. The position of the second sensor 112 is not limited thereto, and according to embodiments, for example, the second sensor 112 may also be disposed in a direction in which the first sensor 111 is disposed with respect to the light source 110.

The second sensor 112 may be disposed at a position at which the second sensor 112 may suitably receive the diffusely-reflected light L3. Because the diffusely-reflected light L3 may be emitted in various directions at an angle of reflection (θ1+θ3) different from that of the specularly-reflected light L2, the second sensor 112 may be disposed at any position according to a designer's choice. For example, the designer may experimentally acquire the angle of reflection (θ1+θ3) of the light L3 diffusely reflected from the specific floor surface 7 and dispose the second sensor 112 at the most suitable position according to an acquired result.

In this case, a distance (d2−d0) between the second sensor 112 and the light source 110 may be equal to a distance (d0+d1) between the first sensor 111 and the light source 110 or different therefrom. When the distance (d2−d0) between the second sensor 112 and the light source 110 is different from the distance (d0+d1) between the first sensor 111 and the light source 110, the distance (d2−d0) between the second sensor 112 and the light source 110 may be longer or shorter than the distance (d0+d1) between the first sensor 111 and the light source 110. A distance h2 between the second sensor 112 and the floor surface 7, i.e., a distance between the second sensor 112 and a point 7d at which a normal line of the floor surface 7 passing through the second sensor 112 meets the floor surface 7, may be equal to the distance h0 between the light source 110 and the floor surface or different therefrom.

For example, the first sensor 111 and the second sensor 112 may be implemented using various types of photosensitive sensors such as a photoconductive cell, a photodiode, a phototransistor, a photo-thyristor, a charge-coupled device (CCD), a complementary metal-oxide semiconductor (CMOS), an intensifier, a photo-coupler, and a photo-interrupter. In addition, the first sensor 111 and the second sensor 112 may be implemented using various other types of sensors. In this case, the first sensor 111 and the second sensor 112 may be implemented using the same or different type of photosensitive sensors.

The controller 120 may be configured to control the overall operation of the moving object 100. For example, the controller 120 may transmit an electrical signal to the light source 110 and control the light source 110 to emit the light L1.

The controller 120 may include a processor capable of receiving an electrical signal, processing the received electrical signal, and then outputting a control signal according to a processed result to the outside, and the processor may be implemented using at least one semiconductor chip and related components. The semiconductor chip and the related components for implementing the controller 120 may be installed on a predetermined substrate disposed in the moving object 100 and built in the moving object 100. When the moving object 100 is a cleaning robot, the controller 120 may be implemented using a central processing unit (CPU) or a micro controller unit (MCU) provided in the cleaning robot. In addition, the controller 120 may be implemented using various other means.

According to one embodiment, the controller 120 may use electrical signals transmitted from the first sensor 111 and the second sensor 112 to determine a condition of a floor surface. Here, the condition of a floor surface may include material of the floor surface and whether a recessed region is present on the floor surface. For example, the material of the floor surface may include roughness of the surface, hardness of the floor surface, or the like. According to one embodiment, the controller 120 may calculate a ratio between electrical signals output from the first sensor 111 and the second sensor 112 and determine the material of the floor surface on the basis of the calculated ratio. The controller 120 may also compare the electrical signals respectively output from the first sensor 111 and the second sensor 112 with a predetermined reference value and determine whether a recessed region is present on the floor surface.

FIG. 4A is a view of a form in which light is reflected from a smooth floor surface, and FIG. 4B is a view of an example of electrical signals output from the first sensor and the second sensor when the light reflected from the smooth floor surface is received.

Referring to FIG. 4A, when the light L1 is incident on a smooth floor surface 8, e.g., a surface of a wooden floor, most of the incident light L1 is specularly reflected and travels at the angle of reflection θ2, which is equal to the incident angle θ1. Even when the floor surface 8 is smooth, the light L3, which is a portion of the light L1, is diffusely reflected at a point 8a on which the light L1 is incident. In this case, the level (level of light) of the diffusely-reflected light L3 is relatively extremely smaller than the level of specularly-reflected light L2. In other words, in the reflected light, a portion of the specularly-reflected light L2 may be larger than a portion of the diffusely-reflected light L3.

As described above, because the first sensor 111 senses the specularly-reflected light L2, the second sensor 112 senses the diffusely-reflected light L3, and the sensors 111 and 112 may output electrical signals with voltages corresponding to the level of incident light, when the level of the specularly-reflected light L2 is larger than the level of the diffusely-reflected light L3, the first sensor 111 outputs an electrical signal with a higher voltage than that of the second sensor 112. Specifically, as illustrated in FIG. 4B, a voltage Vp of an electrical signal output by the first sensor 111 may be relatively higher than a voltage Vs of an electrical signal output by the second sensor 112.

FIG. 5A is a view of a form in which light is reflected from a rough floor surface, and FIG. 5B is a view of an example of electrical signals output from the first sensor and the second sensor when the light reflected from the rough floor surface is received.

Referring to FIG. 5A, when the light L1 is incident on a rough floor surface 9, e.g., a region 9a on a carpet surface, although a portion of the incident light L1 is specularly reflected and travels at the angle of reflection θ2, which is equal to the incident angle θ1, a considerably high portion of the incident light L1 is diffusely reflected. In this case, the level of the diffusely-reflected light L3 may be larger than or equal to the level of the specularly-reflected light L2. Although the level of the diffusely-reflected light L3 may be smaller than the level of the specularly-reflected light L2, a difference between the level of the diffusely-reflected light L3 and level of the specularly-reflected light L2 may be smaller in comparison to the case in which the light L1 is incident on the smooth floor surface 8. In other words, in the reflected light, a portion of the specularly-reflected light L2 may be smaller than a portion of the diffusely-reflected light L3.

In this case, the level of the specularly-reflected light L2 incident on the first sensor 111 may be smaller than or equal to the level of the diffusely-reflected light L3 incident on the second sensor 112. According to circumstances, the level of the specularly-reflected light L2 incident on the first sensor 111 may be larger than the level of the diffusely-reflected light L3 incident on the second sensor 112. However, in this case, a difference between the level of the specularly-reflected light L2 incident on the first sensor 111 and the level of the diffusely-reflected light L3 incident on the second sensor 112 may be relatively smaller than a difference between the level of the specularly-reflected light L2 incident on the first sensor 111 and the level of the diffusely-reflected light L3 incident on the second sensor 112 when the light L1 is incident on the smooth floor surface 8.

Due to such reasons, the first sensor 111 and the second sensor 112 output different electrical signals in comparison to those output when the light L1 is incident on the smooth floor surface 8. Specifically, for example, when the level of the specularly-reflected light L2 incident on the first sensor 111 is smaller than that of the diffusely-reflected light L3 incident on the second sensor 112, the voltage Vp of the first electrical signal output from the first sensor 111 may be relatively lower than the voltage Vs of the second electrical signal output by the second sensor 112, as illustrated in FIG. 5B. In other words, opposite to the case shown in FIG. 4B, the voltage Vs of the second electrical signal output from the second sensor 112 is higher than the voltage Vp of the first electrical signal output from the first sensor 111.

From the fact that the first electrical signal output from the first sensor 111 receiving the specularly-reflected light L2 and the second electrical signal output from the second sensor 112 receiving the diffusely-reflected light L3 are different from each other according to conditions of the floor surfaces 7 to 9, the controller 120 may determine the conditions of the floor surfaces 7 to 9, specifically, whether the floor surfaces 7 to 9 are smooth or rough. For example, the controller 120 may calculate a ratio between the first electrical signal of the first sensor 111 and the second electrical signal of the second sensor 112, e.g., a ratio Vs/Vp or Vp/Vs of the voltage of the second electrical signal of the second sensor 112 with respect to the voltage of the first electrical signal of the first sensor 111, compare the calculated ratio with a predetermined threshold value, and calculate the conditions of the floor surfaces 7 to 9. This will be described in detail below.

FIG. 6A is a view of an example in which the moving object determines whether a recessed region is present on a floor surface, and FIG. 6B is a view of an example of an electrical signal output from the first sensor and the second sensor when the recessed region is present on the floor surface.

As illustrated in FIG. 6A, a recessed region 6 recessed from the existing floor surface 7 may be present on the floor surface 7. In this case, a distance (h11+h12) between a surface of the recessed region 6 and the moving object 100 is longer than a distance h11 between the floor surface 7 and the moving object 100. When the distance (h11+h12) between the light source 110 and a point 6a at which light irradiated from the light source 110 is reflected is longer than the distance h11 taken into consideration during design, specularly-reflected light L28 travels along a path different from the previously-predicted path of the specularly-reflected light L2. Since the first sensor 111 is disposed in consideration of the fact that light irradiated from the light source 110 is reflected from the point 7a of the floor surface 7 spaced apart from the light source 110 by the certain distance h11, most of the specularly-reflected light L28 is not incident on the first sensor 111, and a portion of diffusely-reflected light L29 may be incident on the first sensor 111. Accordingly, as illustrated in FIG. 6B, the first sensor 111 outputs a first electrical signal with a relatively low voltage Vp.

Likewise, when the distance (h11+h12) between the light source 110 and the point 6a at which light irradiated from the light source 110 is reflected is longer than the distance h11 taken into consideration during design, diffusely-reflected light L38 also travels along a path different from the previously-predicted path of the diffusely-reflected path L3. Accordingly, diffusely-reflected light L39 traveling along a path different that of the light L3 diffusely reflected from the floor surface 7 is incident on the second sensor 112. Therefore, the second sensor 112 outputs a second electrical signal with a different voltage in comparison to when the light L3 diffusely reflected from the floor surface 7 is received. In this case, the voltage of the second electrical signal output from the second sensor 112 may be relatively lower than the voltage Vs of the second electrical signal output when the light L3 diffusely reflected from the floor surface 7 is received. Since a portion of the diffusely-reflected light L29 is also incident on the first sensor 111, the size of the voltage Vp of the first electrical signal output from the first sensor 111 may be equal or very close to the size of the voltage of the second electrical signal output from the second sensor 112.

When the recessed region 6 is present on the floor surface 7, and the moving object 100 is placed at an upper end of the recessed region 6 as above, because the electrical signals respectively output from the sensors 111 and 112 are different in comparison to when the moving object 100 is placed on the floor surface 7, the controller 120 may use the electrical signals to determine whether the recessed region is present on the floor surface 7, and on the basis of a determined result, determine risk of the moving object 100 falling. This will be described in detail below.

According to another embodiment, the light source 110 may be provided in the moving object 100 such that the second sensor 112 is disposed between the first sensor 111 and the light source 110. According to still another embodiment, the light source 110 may be disposed in the moving object 100 such that the first sensor 111 is disposed between the second sensor 112 and the light source 110. Hereinafter, an embodiment in which the light source 110 is disposed between the first sensor 111 and the second sensor 112 will be described as an example.

FIG. 7 is a view of a moving object according to another embodiment. FIG. 8 is a view of an example in which each of the sensors of the moving object receives light, and FIG.

9 is a view of another example in which each of the sensors of the moving objects receives light.

Referring to FIG. 7, the moving object 100 may include a light source 110a, a plurality of sensors 111, 112a, and the controller 120. In this case, the light source 110a and the plurality of sensors 111 and 112a may physically be sequentially arranged. In other words, any one sensor of the plurality of sensors 111 and 112a, e.g., a second sensor 112a, may be disposed between the other sensor, e.g., the first sensor 111, and the light source 110a.

The light source 110a may emit rays of lights L4 and L7 and irradiate the floor surface 7 with the rays of lights L4 and L7 according to control of the controller 120. In this case, as described above, the light source 110a may irradiate the floor surface 7 continuously with the rays of lights L4 and L7 or irradiate the floor surface 7 with the rays of lights L4 and L7 by flickering the rays of lights L4 and L7 in a predetermined pattern according to predefined settings.

For example, the light source 110a may emit light in various wavelength bands such as visible light, ultraviolet light, or infrared light.

Since the operation and function of the light source 110a have been described above with reference to FIGS. 1 to 6B, detailed descriptions thereof will be omitted.

The plurality of sensors may include the first sensor 111 and the second sensor 112a. The first sensor 111 and the second sensor 112a may respectively sense light L5 and rays of lights L6 and L8 irradiated from the light source 110a and then reflected from the floor surface 7, output electrical signals, i.e., a first electrical signal and a second electrical signal, according to a sensed result, and transmit the electrical signals to the controller 120. As described above, in this case, sizes, e.g., voltages, of electrical signals output from the first sensor 111 and the second sensor 112a may correspond to quantities of light of the sensed rays of lights L5, L6, and L8.

To suitably receive the light L5 irradiated from the light source 110a and then specularly reflected from the floor surface 7, the first sensor 111 may be disposed in the moving object 100 toward the floor surface 7 on a traveling path of the specularly-reflected light L5. In this case, the first sensor 111 may be suitably disposed according to a position of the light source 110a. For example, because an angle of reflection θ5 of the specularly-reflected light L5 is equal to an angle of reflection θ4 of the incident light L4, the position of the first sensor 111 in the moving object 100 may be determined on the basis of the position of the light source 110a and a direction in which the light L4 is irradiated from the light source 110a.

The second sensor 112a may be disposed in the moving object 100 to receive the rays of lights L6 and L8 irradiated from the light source 110a and then diffusely reflected from the floor surface 7.

According to one embodiment, as illustrated in FIGS. 8 and 9, a second sensor 112a1 may be fixed to the moving object 100 so as not be rotatable.

According to one embodiment, as illustrated in FIG. 8, the second sensor 112a1 may be disposed to receive the light L6 diffusely reflected from a point 7f at which the light L5 received by the first sensor 111 is specularly reflected. In other words, the second sensor 112a1 may be disposed to receive the light L6 diffusely reflected from the same point as the point 7f at which the light L5 received by the first sensor 111 is specularly reflected.

For example, as illustrated in FIG. 8, the light source 110a may emit the light L4. In this case, specular reflection and/or diffused reflection of the incident light L4 may occur at the point 7f of the floor surface 7 according to the condition, e.g., a concavo-convex condition, of the point 7f.

The light L5 specularly reflected from the point 7f is sensed by the first sensor 111, and the light L6 diffusely reflected from the point 7f is sensed by the second sensor 112a1. In this case, the diffusely-reflected light L6 may travel in a direction opposite from that of the specularly-reflected light L5, i.e., rightward from a reference line M of FIG. 8, or travel in the direction same as that of the specularly-reflected light L5, i.e., leftward from the reference line M of FIG. 8. According to a designer's choice, the second sensor 112a1 may be disposed to receive light traveling in at least one direction, of the light L6 diffusely reflected from the point 7f of the floor surface 7.

According to another embodiment, as illustrated in FIG. 9, a second sensor 112a2 may be disposed to receive the light L8 diffusely reflected from a point 7g, which is different from the point 7f at which the light L5 received by the first sensor 111 is specularly reflected.

For example, the light source 110a may continuously or periodically emit light L10, and the light L10 emitted from the light source 110a may be incident on a region 7e of the floor surface 7. Specular reflection and/or diffused reflection of the incident rays of lights L4 and L7 may occur at each of the points 7f and 7g in the region 7e on which the light L10 is incident.

The first sensor 111 senses the light L5 specularly reflected from the point 7f disposed within the region 7e. The second sensor 112a2 disposed between the light source 110a and the first sensor 111 is disposed to sense the light L8 diffusely reflected from the point 7g, which is different from the point 7f. In other words, the first sensor 111 and the second sensor 112a2 may respectively receive rays of lights L5 and L8 respectively reflected from different points 7f and 7g.

In this case, the direction in which the light L8 diffusely reflected from the different point 7g is incident and the direction in which the light L6 diffusely reflected from the point 7f, which is the same as the point at which the specularly-reflected light L5 is reflected, may be different from each other. Therefore, the second sensor 112a2 configured to receive the light L8 diffusely reflected from the different point 7g may be tilted more than the second sensor 112a1, which is configured to receive the light L6 diffusely reflected from the same point 7f, by a predetermined angle θ10 to suitably receive the diffusely reflected light L8.

According to another embodiment, the second sensor 112a may also be installed in the moving object 100 to be rotatable.

The second sensor 112a may be disposed to rotate within a predetermined angle range about a predetermined axis to selectively receive the light L6 diffusely reflected from the point 7f, which is the same as the point at which the light L5 is specularly reflected, or receive the light L8 diffusely reflected from the point 7g, which is different from the point at which the light L5 is specularly reflected, as necessary. The rotation of the second sensor 112a may be performed according to at least one of a designer's choice, user manipulation, and control of the controller 120. According to the rotation, the second sensor 112a may more suitably receive any one of the light L6 diffusely reflected from the point 7f, which is the same as the point at which the light L5 is specularly reflected, and the light L8 diffusely reflected from the point 7g, which is different from the point at which the light L5 is specularly reflected.

Since detailed operations and functions of the first sensor 111 and the second sensor 112a have been described above with reference to FIGS. 1 to 6B, detailed descriptions thereof will be omitted.

Hereinafter, the controller 120 according to one embodiment will be described in more detail.

FIG. 10 is a detailed control block diagram of the controller according to one embodiment.

Referring to FIG. 10, in one embodiment, the controller 120 may include a light emission controller 121, a signal processor 122, a floor condition determiner 126, a moving object operation determiner 129, and a driving controller 129a.

The light emission controller 121, the signal processor 122, the floor condition determiner 126, the moving object operation determiner 129, and the driving controller 129a may be physically or logically separated in the controller 120. When the light emission controller 121, the signal processor 122, the floor condition determiner 126, the moving object operation determiner 129, and the driving controller 129a are physically separated, the light emission controller 121, the signal processor 122, the floor condition determiner 126, the moving object operation determiner 129, and the driving controller 129a may be implemented by different semiconductor chips and related components. When the light emission controller 121, the signal processor 122, the floor condition determiner 126, the moving object operation determiner 129, and the driving controller 129a are logically separated, the light emission controller 121, the signal processor 122, the floor condition determiner 126, the moving object operation determiner 129, and the driving controller 129a may be implemented by one or more semiconductor chips.

FIG. 11 is a view of an example of a pulse signal applied to the light source.

The light emission controller 121 may generate a control signal and transmit the generated control signal to the light source 110 to control the operation of the light source 110. According to one embodiment, the light emission controller 121 may include a pulse generator 121a. As illustrated in FIG. 11, the pulse generator 121a may generate a predetermined pulse signal and then transmit the generated pulse signal to the light source 110. The light source 110 emits the light L1 by flickering in a pattern corresponding to the pulse signal.

Pulse widths t11 of pulse signals or intervals t12 between the pulses may be equal to or different from each other. For example, the pulse width t11 of any of the pulse signals may be equal to or different from another pulse width t13. The interval t12 between two pulses may be equal to or different from an interval t14 between two other pulses.

According to one embodiment, the pulse generator 121a may include a pulse width modulation (PWM) generator configured to generate a pulse using a PWM method. The PW modulator may output a pulse signal while modulating a PW and transmit the pulse signal to the light source 110.

When the light source 110 emits the light L1 in a predetermined pattern according to the pulse signal, reflected rays of lights L2 and L3 are respectively incident on the first sensor 111 and the second sensor 112 according to an irradiation pattern of the light source 110. Accordingly, the first sensor 111 and the second sensor 112 output the first electrical signal and the second electrical signal in a pattern corresponding to incidence patterns of the reflected rays of lights L2 and L3.

FIG. 12 is a view of a disturbance light, and FIG. 13 is a view of electrical signals output from the first sensor and the second sensor due to the disturbance light. FIG. 14 is a view of an example of electrical signals including noise components output from the first sensor. FIG. 15 is a view of an example of electrical signals filtered by a high-pass filter, and FIG. 16 is a view of an example of electrical signals filtered by a low-pass filter.

As described above, the first sensor 111 and the second sensor 112 may respectively receive the rays of lights L2 and L3 irradiated from the light source 110 and then reflected from any one of the floor surfaces 7 to 9 or the surface of the recessed region 6. In this case, the first electrical signal and the second electrical signal respectively output from the first sensor 111 and the second sensor 112 may be output in a pulse form according to a pattern in which the light L1 is irradiated by the light source 110.

As illustrated in FIG. 12, in addition to the reflected rays of lights L2 and L3, disturbance light L9, which is light transmitted from the outside, may also be transmitted to the first sensor 111 and the second sensor 112. The disturbance light L9 adds noise components to the electrical signals output from the first sensor 111 and the second sensor 112. Specifically, when only the disturbance light L9 is transmitted to the first sensor 111, as illustrated in FIG. 13, the first sensor 111 may output electrical signals with a predetermined voltage V0 corresponding to the disturbance light L9, and such electrical signals with the voltage V0 corresponding to the disturbance light L9 may be, for example, combined with electrical signals in the pulse form output from the first sensor 111 due to the reflected light L2. Therefore, when the specularly-reflected light L2 and the disturbance light L9 are incident on the first sensor 111 together, as illustrated in FIG. 14, the first sensor 111 outputs a first electrical signal, in which a component output in a pattern corresponding to a pulse signal in response to the reflected light L2 and a noise component output by the disturbance light L9 are combined. In this case, a voltage Ve of the first electrical signal including the noise component generated by the disturbance light L9 is higher than the voltage Vp of the first electrical signal that does not include noise. Likewise, the second electrical signal output from the second sensor 112 also includes a component output in response to the pattern of the reflected light L3 and the noise component due to the disturbance light L9.

The signal processor 122 may remove the noise components due to the disturbance light L9 output from each of the first sensor 111 and the second sensor 112. The signal processor 122 may amplify the first electrical signal and the second electrical signal respectively output from the first sensor 111 and the second sensor 112 or convert the first electrical signal and the second electrical signal to smooth the first electrical signal and the second electrical signal.

According to one embodiment, the signal processor 122 may include a high-pass filter 123, an amplifier 124, and a low-pass filter 125. The high-pass filter 123, the amplifier, and the low-pass filter 125 may be implemented with hardware or software.

As illustrated in FIG. 15, the high-pass filter 123 may only pass signals with frequencies within a certain range or higher to remove noise due to the disturbance light L9. In other words, the high-pass filter may separate a component having a direct current characteristic and caused by the disturbance light L9 of a low-frequency component and a component having a high frequency characteristic and output from the first sensor 111 in response to the reflected light L2 from each other to remove the noise due to the disturbance light L9 of the low-frequency component from the first electrical signal. Accordingly, only the first electrical signal corresponding to the reflected light L2 incident on the first sensor 111, i.e., the reflected light L2 based on specular reflection, may be output from the first sensor 111. Likewise, the high-pass filter 123 may filter a component due to the disturbance light L9 of the low-frequency component from the second electrical signal output from the second sensor 112 so that the second electrical signal including only a component corresponding to the reflected light L3 incident on the second sensor 112, i.e., the reflected light L3 based on diffused reflection, is output.

The first electrical signal and the second electrical signal filtered by the high-pass filter 123 may be transmitted to the amplifier 124. The amplifier 124 may amplify the first electrical signal and the second electrical signal filtered by the high-pass filter 123 by a certain ratio. The amplifier 124 may be omitted as necessary.

The low-pass filter 125 may smooth the first electrical signal and the second electrical signal filtered by the high-pass filter 123 or the first electrical signal and the second electrical signal which are filtered and then amplified. Accordingly, the first electrical signal and the second electrical signal acquired by applying the low-pass filter 125 are output in the form that may be easily processed by the signal processor 122.

Specifically, referring to FIG. 14, an electrical signal output from the first electrical signal and the second electrical signal may have a waveform with a predetermined frequency (F1). The low-pass filter 125 may only pass components in a low-frequency band, and remove noise with higher frequency than a designed PWM signal included in the first electrical signal and the second electrical signal to smooth the first electrical signal and the second electrical signal (F2). Accordingly, as illustrated in FIG. 16, the first electrical signal and the second electrical signal equal or close to the pulse signal input to the light source 110 are acquired. When the first electrical signal and the second electrical signal are amplified by the amplifier 124, smoothing by the low-pass filter 125 may be more effectively performed.

As described above, the signal processor 122 may perform signal processing on the first electrical signal output from the first sensor 111 and/or the second electrical signal output from the second sensor 112, and acquire a signal optimal for calculation processing. The first electrical signal and the second electrical signal processed by the signal processor 122 are transmitted to the floor condition determiner 126.

The above-described signal processor 122 may be implemented by one or more semiconductor chips and related components. The signal processor 122 may be omitted according to a designer's choice.

FIG. 17 is a block diagram of a floor condition determiner according to one embodiment.

The floor condition determiner 126 uses the electrical signals transmitted from the signal processor 122 to determine conditions of the floor surfaces 7 to 9 on which the moving object 100 is placed. According to one embodiment, the floor condition determiner 126 may include a surface condition determiner 127 and a recessed region determiner 128.

FIG. 18A is a view of an example of electrical signals output when a floor surface is sensed as a smooth wooden floor, and FIG. 18B is a view of an example of electrical signals output when a floor surface is a carpet surface.

The surface condition determiner 127 may determine a surface condition of a floor surface on the basis of characteristics of a first electrical signal E1 and a second electrical signal E2 according to a condition, i.e., a degree of smoothness or roughness, of the floor surface.

As illustrated in FIGS. 18A and 18B, the first electrical signal E1 and the second electrical signal E2 processed by the signal processor 122 may have a pulse form. In this case, pulses P11, P12, and P13 of the first electrical signal E1 respectively correspond to pulses P21, P22, and P23 of the second electrical signal E2. The pulses P11 and P21, P12, and P22, and P13 and P23 corresponding to each other are signals acquired from the rays of lights L2 and L3 reflected from the floor surfaces 7 to 9 at the same time point or within the same period.

When the floor surface 7 is a smooth wooden floor, as illustrated in FIG. 18A, the voltage Vp of each of the pulses P11, P12, and P13 of the first electrical signal E1 acquired by the first sensor 111 is relatively higher than the voltage Vs of each of the pulses P21, P22, and P23 of the second electrical signal E2 acquired by the second sensor 112 (Vp>>Vs). When the floor surface is a rough carpet, as illustrated in FIG. 18B, the voltage of each of the pulses P11, P12, and P13 of the first electrical signal E1 acquired by the first sensor 111 is slightly higher than or very close to the voltage of each of the pulses P21, P22, and P23 of the second electrical signal E2 acquired by the second sensor 112 (Vp>=Vs). In this case, the voltage of the first electrical signal E1 acquired by the first sensor 111 may also be lower than the voltage of the second electrical signal E2 acquired by the second sensor 112 (Vp<Vs). In this way, the surface condition determiner 127 may determine the surface condition using the voltage Vp of the first electrical signal E1 and the voltage Vs of the second electrical signal E2.

According to one embodiment, as illustrated in FIG. 17, the surface condition determiner 127 may include a ratio calculator 127a, a comparator 127b, a counter 127c, and a counting result comparator 127d.

The ratio calculator 127a may calculate a ratio of the voltage Vs of the second electrical signal E2 to the voltage Vp of the first electrical signal E1 (Vs/Vp). Specifically, the ratio calculator 127a may first calculate a ratio between signals of the voltage Vp of the first electrical signal E1 and the voltage Vs of the second electrical signal E2 (Vs/Vp or Vp/Vs) and transmit a calculated result to the counter 127c or the comparator 127b.

In addition, the ratio calculator 127a may acquire a predetermined value using a separately-provided function having the voltage Vp of the first electrical signal E1 and the voltage Vs of the second electrical signal E2 as independent variables and output the acquired predetermined value. Various functions may be given as the above function according to a designer's choice, and the function may be acquired on the basis of a theoretical calculation result or an experimental result.

The comparator 127b compares the ratio between signals (Vs/Vp or Vp/Vs) calculated by the ratio calculator 127a with at least one of a predefined first reference value and second reference value. Here, the first reference value refers to a reference value for determining the degree of smoothness of a surface, and the second reference value refers to a reference value for determining the degree of roughness of a surface. The first reference value may be a smaller value than the second reference value.

Specifically, the comparator 127b may compare the ratio between signals (Vs/Vp) with the first reference value. According to one embodiment, for example, the first reference value may include any one value between 0.1 and 1.2. In other words, the comparator 127b may determine whether the voltage Vs of second electrical signal E2 is relatively lower than or close to the voltage Vp of the first electrical signal E1.

The comparator 127b may also compare the ratio between signals (Vs/Vp) with the second reference value. Here, for example, the second reference value may include any one value between 1.5 and 4.0. In other words, the comparator 127b may determine whether the voltage Vs of the second electrical signal E2 is relatively higher than the voltage Vp of the first electrical signal E1.

According to one embodiment, the comparator 127b may determine that the floor surface is smooth when the ratio between signals (Vs/Vp) is smaller than the first reference value and transmit a determined result to the moving object operation determiner 129, or determine that the floor surface is rough when the ratio between signals (Vs/Vp) is larger than the second reference value, and transmit a determined result to the moving object operation determiner 129.

The comparator 127b may be designed to not perform further comparing of the ratio between signals (Vs/Vp) and the second reference value when the ratio between signals (Vs/Vp) is compared with the first reference value, and as a result of comparison, the ratio between signals (Vs/Vp) is smaller than the first reference value. Opposite from this, the comparator 127b may also be designed to not perform further comparing of the ratio between signals (Vs/Vp) and the first reference value when the ratio between signals (Vs/Vp) is compared with the second reference value, and as a result of comparison, the ratio between signals (Vs/Vp) is larger than the second reference value.

According to another embodiment, a result of comparison by the comparator 127b may be transmitted to the counter 127c.

FIG. 18C is a view of operation of the counter.

The counter 127c may count the number of times in which the ratio between signals (Vs/Vp) is larger than the first reference value or count the number of times in which the ratio between signals (Vs/Vp) is smaller than the second reference value, according to a result determined by the comparator 127b.

When pulses P11 to P27 are input through a plurality of times as illustrated in FIG. 18C, the ratio calculator 127a may calculate a ratio between each of the pairs of pulses P11 and P21, P12, and P22, P13 and P23, P14 and P24, P15 and P25, P16 and P26, and P17 and P27 corresponding to each other, and sequentially acquire a plurality of ratios. The plurality of calculated ratios may be transmitted to the comparator 127b, and the comparator 127b may compare the plurality of calculated ratios with at least one of the first reference value and the second reference value and acquire a plurality of results of comparison. Accordingly, the plurality of results of comparison may be sent to the counter 127c. In this case, the comparator 127b may separately transmit calculated ratios smaller than the first reference value and calculated ratios larger than the second reference value to the counter 127c.

The counter 127c may count the number of results of comparison of the calculated ratios. Specifically, the counter 127c may count the number of cases in which the calculated ratio is smaller than the first reference value or count the number of cases in which the calculated ratio is larger than the second reference value. The counter 127c may separately count the number of cases in which the calculated ratio is smaller than the first reference value and the number of cases in which the calculated ratio is larger than the second reference value. For example, the counter 127c may predefine at least one integer type count variable, and when an electrical signal is transmitted from the comparator 127b, the counter 127c may count at least one of the number of cases in which a ratio calculated by adding one to the at least one count variable corresponding to the transmitted electrical signal is smaller than the first reference value and the number of cases in which the calculated ratio is larger than the second reference value. A counting result may be transmitted to the counting result determiner 127d.

The counting result determiner 127d may receive the counting result and determine whether the counting result is larger than or equal to a predefined reference value. For example, the counting result determiner 127d may compare a counting result related to the case in which the calculated ratio is smaller than the first reference value with a predefined first count reference value, or compare a counting result related to the case in which the calculated ratio is larger than the second reference value with a predefined second count reference value. Here, the first count reference value and the second count reference value may be equal to or different from each other. The first count reference value and the second count reference value may have various values according to a choice of a designer or user and, for example, may be set as 100.

When the counting result related to the case in which the calculated ratio is smaller than the first reference value is larger than or equal to the predefined first count reference value, the counting result determiner 127d may determine that the floor surface is formed of a smooth surface, output the determined result, and transmit the determined result to the moving object operation determiner 129. In this case, the counting result determiner 127d may transmit a signal, requesting that counting be reset, to the counter 127c, and the counter 127c may reset and initialize the count variable according to the signal sent from the counting result determiner 127d. For example, the counter 127c may modify a value of a count variable to 0 according to the signal sent from the counting result determiner 127d.

Likewise, when the counting result related to the case in which the calculated ratio is larger than the second reference value is larger than or equal to the predefined second count reference value, the counting result determiner 127d may determine that the floor surface is formed of a rough surface, output the determined result, and transmit the determined result to the moving object operation determiner 129. The counting result determiner 127d may transmit a signal requesting that counting be reset, to the counter 127c, and the counter 127c may reset and initialize the count variable according to the signal sent from the counting result determiner 127d.

FIG. 19 is a view of an example of electrical signals output when a recessed region is present on the floor surface.

The recessed region determiner 128 may determine whether the recessed region 6 is present below the moving object 100 using the voltage Vp of the first electrical signal E1 and the voltage Vs of the second electrical signal E2.

When the recessed region 6 is present below the moving object 100, as illustrated in FIG. 19, the voltage Vp of the first electrical signal E1 and the voltage Vs of the second electrical signal E2 transmitted from the signal processor 122 may be relatively low compared to when the moving object 100 moves on the flat surfaces 7 to 9. In this way, the recessed region determiner 128 may determine whether the recessed region 6 is present using sizes of the voltage Vp of the first electrical signal E1 and the voltage Vs of the second electrical signal E2.

The recessed region determiner 128 may include a comparator 128a, a counter 128b, and a counting result comparator 128c.

The comparator 128a may receive the first electrical signal E1 and the second electrical signal E2, and compare the voltage Vp of the received first electrical signal E1 and the voltage Vs of the received second electrical signal E2 with a predefined reference value. For example, the comparator 128a may determine whether the voltage Vp of the first electrical signal E1 is smaller than a third reference value or the voltage of the second electrical signal E2 is smaller than a fourth reference value. Here, the third reference value and the fourth reference value may be defined according to a designer's choice and may be acquired theoretically or experimentally. When the voltage Vp of the first electrical signal E1 is smaller than the third reference value or the voltage of the second electrical signal E2 is smaller than the fourth reference value, the comparator 128a may further calculate a difference between the voltage Vp of the first electrical signal E1 output from the first sensor 111 and the voltage Vs of the second electrical signal E2 output from the second sensor 112 and compare the calculated difference with a fifth reference value.

In addition, the comparator 128a may acquire a predetermined value from a separately-provided function having the voltage Vp of the first electrical signal E1 and the voltage Vs of the second electrical signal E2 as variables, compare the acquired value with a separately-provided reference value, and output a result of comparison. Various functions may be given as the above function according to a designer's choice, and the function may be acquired on the basis of a theoretical calculation result or an experimental result.

When pulses P11 to P27 are input through a plurality of times as illustrated in FIG. 18C, the comparator 128a may compare the pairs of pulses P11 and P21, P12, and P22, P13 and P23, and P14 and P24 corresponding to each other with predefined reference values, and sequentially acquire a plurality of results of comparison. In this case, the comparator 128a may compare the sequentially-input pairs of pulses P11 and P21, P12, and P22, P13 and P23, and P14 and P24 with the predefined reference values every time the pairs of pulses P11 and P21, P12, and P22, P13 and P23, and P14 and P24 are input and acquire results of comparison.

According to one embodiment, when, as a result of comparison, the voltage Vp of the first electrical signal E1 is smaller than the third reference value or the voltage of the second electrical signal E2 is smaller than the fourth reference value, the comparator 128a may determine that the recessed region 6 is present below the moving object 100 and transmit the determined result to the moving object operation determiner 129. According to embodiments, when the voltage Vp of the first electrical signal E1 is smaller than the third reference value or the voltage of the second electrical signal E2 is smaller than the fourth reference value, the comparator 128a may further calculate a difference between the voltage Vp of the electrical signal E1 output from the first sensor 111 and the voltage Vs of the electrical signal E2 output from the second sensor 112, and when the calculated difference is smaller than the fifth reference value, the comparator 128a may determine that the recessed region 6 is present below the moving object 100 and transmit the determined result to the moving object operation determiner 129.

According to another embodiment, at least one result of comparison by the comparator 128a may also be transmitted to the counter 128b.

The counter 128b may count the number of results of comparison transmitted from the comparator 128a. Specifically, the counter 128b may count the number of cases in which the voltage Vp of the first electrical signal E1 is smaller than the third reference value or the voltage of the second electrical signal E2 is smaller than the fourth reference value. In this case, the counter 128b may also perform counting using at least one predefined integer type count variable. A count result may be transmitted to the counting result determiner 128c.

As described above, the counting result determiner 128c may receive a counting result, and determine whether the counting result is larger than or equal to a predefined third count reference value. The third count reference value may have various values according to a choice of a designer or user and, for example, may be set as 100.

When the counting result is larger than or equal to the predefined third count reference value, the counting result determiner 128c may determine that the recessed region 6 is present on the floor surface 7 and transmit the determined result to the moving object operation determiner 129. In this case, the counting result determiner 128c may transmit a signal, requesting that counting be reset, to the counter 128b, and the counter 128b may initialize the counting according to the signal requesting for reset.

The moving object operation determiner 129 may determine the operation of the moving object 100 on the basis of a result determined by the floor condition determiner 126 in relation to the floor condition. For example, when the floor condition determiner 126 determines that the floor surface has a rough surface, the moving object operation determiner 129 may determine that the moving object 100 move to another region or take a separate action. When the floor condition determiner 126 determines that the floor surface has a smooth surface, the moving object operation determiner 129 may determine that the moving object 100 maintain the current operation. When it is determined that the recessed region 6 is present on the floor surface, the moving object operation determiner 129 may determine that the moving object 100 move in another direction or stop to avoid the recessed region 6 so as to prevent the moving object 100 from falling into the recessed region 6.

The moving object operation determiner 129 browses separately-provided database and detects operations corresponding to floor conditions stored in the database to determine the operation of the moving object 100 according to a result determined by the floor condition determiner 126 in relation to the floor condition.

The driving controller 129a may generate a control signal according to an operation determined by the moving object operation determiner 129 and then transmit the generated control signal to a corresponding component, e.g., a driver 130, and allow the moving object 100 to take a predetermined action according to the floor condition. For example, when the moving object 100 is a cleaning robot that cleans a floor surface using a wet cleaning method, and the floor surface is rough, i.e., when the floor surface is determined as a carpet, the driving controller 129a may generate a control signal for a motor connected to a wheel of the cleaning robot, control the cleaning robot to be deviated from the carpet, and also generate a control signal for a component configured to perform cleaning and transmit the generated control signal to the component so that the component configured to perform cleaning does not perform the cleaning operation on the carpet.

The driver 130 may be driven according to control of the driving controller 129a and allow the moving object 100 to take a predetermined action or move. For example, the driver 130 may include a motor connected to a wheel for moving the moving object 100, and the motor may rotate in a predetermined direction or stop rotating according to a control signal from the driving controller 129*a*.

FIG. 20 is a view of the moving object according to another embodiment.

According to FIG. 20, the moving object 100 may include a plurality of floor condition sensor modules 140 and 150 and the controller 120. Although two floor condition sensor modules, i.e., a first floor condition sensor module 140 and a second floor condition sensor module 150, are illustrated in FIG. 20, the number of floor condition sensor modules is not limited thereto. For example, three floor condition sensor modules may be provided in the moving object 100, or more floor condition sensor modules may be provided therein.

The floor condition sensor modules 140 and 150 may be installed at different positions in the moving object. For example, the first floor condition sensor module 140 may be installed in a front direction of a bottom surface of the moving object while the second floor condition sensor module 150 is installed in a rear direction of the bottom surface of the moving object. In addition, the floor condition sensor modules 140 and 150 may be provided at various other positions according to a designer's choice.

The floor condition sensor modules 140 and 150 may respectively include light sources 141 and 151, and a plurality of sensors 142, 143 and 152, 153. The light sources 141 and 151 may irradiate light toward the floor surface independent or dependent of each other. In this case, the light sources 141 and 151 may irradiate light toward the floor surface, according to a predetermined pattern. Light irradiated from a first light source 141 and then reflected from the floor surface may be received by a first sensor 142 and a second sensor 143, and light irradiated from a second light source 151 and then reflected from the floor surface may be received by a second sensor 143 and a fourth sensor 153. In this case, the first sensor 142 and the third sensor 152 may be configured to receive light specularly reflected from the floor surface, and the second sensor 143 and the fourth sensor 153 may be configured to receive light diffusely reflected from the floor surface.

As described above, the first sensor 142, the second sensor 143, the third sensor 152, and the fourth sensor 153 may output a first electrical signal, a second electrical signal, a third electrical signal, and a fourth electrical signal, respectively. The first electrical signal, the second electrical signal, the third electrical signal, and the fourth electrical signal may be transmitted to the controller 120.

As described above, the controller 120 may determine the condition of the floor surface on the basis of the first electrical signal, the second electrical signal, the third electrical signal, and the fourth electrical signal. In this case, the controller 120 may calculate a first ratio between signals on the basis of the first electrical signal and the second electrical signal, calculate a second ratio between signals on the basis of the third electrical signal and the fourth electrical signal, and determine the condition of the floor surface using the first ratio between signals and the second ratio between signals. For example, the controller 120 may determine that the floor surface is smooth when both the first ratio between signals and the second ratio between signals are smaller than a first reference value, and determine that the floor surface is rough when both the first ratio between signals and the second ratio between signals are larger than a second reference value. When only one of the first ratio between signals and the second ratio between signals is smaller than the first reference value, or only one of the first ratio between signals and the second ratio between signals is larger than the second reference value, the controller 120 may ignore the first electrical signal and the second electrical signal transmitted thereto and wait until a new first electrical signal and a new second electrical signal are transmitted thereto. When any one of the first ratio between signals and the second ratio between signals is smaller than the first reference value and the other one is larger than the second reference value, the controller 120 may determine that the moving object is placed between floor surfaces formed of different materials. In addition, the controller 120 may also determine the condition of the floor surface using the plurality of floor condition sensor modules 140 and 150 using various methods that the designer may take into consideration.

Since various functions of the controller 120 have been described above, detailed descriptions thereof will be omitted.

FIG. 21 is a control block diagram of the controller according to another embodiment.

Referring to FIG. 21, according to one embodiment, the controller 120 may include the light emission controller 121, the signal processor 122, the floor condition determiner 126, the moving object operation determiner 129, and the driving controller 129*a*, and further include a comparator 123*a*.

The light emission controller 121 may generate a control signal and transmit the generated control signal to the light source 110 to control the operation of the light source 110. According to one embodiment, the light emission controller 121 may include a first pulse generator 121*b*, a second pulse generator 121*c*, and a selector 121*d*. The first pulse generator 121*b* and the second pulse generator 121*c* may be physically separated or logically separated.

As described above, the first pulse generator 121*b* and the second pulse generator 121*c* may generate a predetermined pulse signal and then transmit the generated pulse signal to the light source 110. The light source 110 emits rays of lights L21 and L22 by flickering the rays of lights L21 and L22 in a pattern corresponding to a received pulse signal.

FIG. 22A is a view of an example of an intensity of light emitted from the light source according to control of the first pulse generator and the second pulse generator. In FIG. 22A, I0 refers to the maximum value of an intensity of light that the light source 110 may emit, I1 refers to an intensity of light that the light source 110 emits according to control of the first pulse generator 121*b*, and I2 refers to an intensity of light that the light source 110 emits according to control of the second pulse generator 121*c*.

The first pulse generator 121*b* and the second pulse generator 121*c* may generate different pulse signals, transmit the generated different pulse signals to the light source 110, and control the light source 110 to emit the rays of lights L21 and L22 with different intensities I1 and I2 corresponding to the different pulse signals transmitted to the light source 110.

The first pulse generator 121*b* and the second pulse generator 121*c* may be disposed to be selectively operated. For example, the first pulse generator 121*b* and the second pulse generator 121*c* may be designed such that the second pulse generator 121*c* is not operated when the first pulse generator 121*b* is operated, and conversely, the first pulse generator 121*b* is not operated when the second pulse generator 121*c* is operated.

The first pulse generator 121*b* may generate a first pulse signal according to predefined settings. For example, when a predetermined amount of time is elapsed or a preset cycle comes after the moving object 100 starts being driven, the first pulse generator 121b may generate a first pulse signal. In another example, the first pulse generator 121b may also generate the first pulse signal according to a result of selection by the selector 121d on the basis of a result of comparison by the comparator 123a.

The first pulse signal generated from the first pulse generator 121b may be transmitted to the light source 110, and in response to receiving the first pulse signal, the light source 110 may emit the light L21 with the intensity I1 corresponding to the first pulse signal. The intensity I1 of the light L21 corresponding to the first pulse signal may be relatively higher than the intensity I2 of the light L22 corresponding to the second pulse signal generated from the second pulse generator 121c. Therefore, when the first pulse signal is transmitted to the light source 110, the light L21 with the relatively higher intensity I1 may be incident on the floor surface 7, and accordingly, specularly-reflected light L23 and diffusely-reflected light L24 with relatively high intensities are incident on the first sensor 111 and the second sensor 112, respectively. The intensity I1 of the light L21 corresponding to the first pulse signal may be the maximum value I0 of the intensity of light that the light source 110 may emit, or may be a value smaller than the maximum value I0.

The second pulse generator 121c may generate a second pulse signal according to predefined settings. For example, the second pulse generator 121c may generate the second pulse signal on the basis of a result of selection by the selector 121d. The maximum voltage of the second pulse signal generated by the second pulse signal generator 121c may be lower than the maximum voltage of the first pulse signal generated by the first pulse signal generator 121b. According to embodiments, the second pulse generator 121c may also generate a second pulse signal according to elapse of predetermined level of time or according to a predetermined cycle. The second pulse signal generator 121c may also alternately generate a pulse signal with the first pulse signal generator 121b.

The second pulse signal generated by the second pulse generator 121c may be transmitted to the light source 110, and the light source 110 may emit the light L22 with the intensity I2 corresponding to the second pulse signal toward the floor surface 7. In this case, the intensity I2 of the light L22 emitted from the light source 110 in response to the second pulse signal may be relatively lower than that intensity I1 of the light L21 emitted from the light source 110 according to the first pulse signal. Therefore, when the second pulse signal is transmitted to the light source 110, the light L22 with the relatively lower intensity I2 may be incident on the floor surface 7, and accordingly, the first sensor 111 and the second sensor 112 respectively receive the specularly-reflected light L23 and the diffusely-reflected light L24 with relatively low intensities.

In this way, the intensities I1 and I2 of the rays of lights L21 and L22 emitted from the light source 110 according to operation of at least one of the first pulse generator 121b and the second pulse generator 121c may be changed, and sizes of electrical signals respectively output from the first sensor 111 and the second sensor 112 that received the specularly-reflected light L23 and the diffusely-reflected light L24 may be changed corresponding to the changed intensities I1 and I2. In this way, the moving object 100 may control operations of the pulse generators 121b and 121c and improve discrimination between electrical signals output from the first sensor 111 and the second sensor 112.

The selector 121d may select the pulse generators 121b and 121c, which will generate a pulse signal, from the first pulse generator 121b and the second pulse generator 121c according to an electrical signal transmitted from the comparator 123a.

For example, the selector 121d may be implemented using at least one switch. By opening or closing a switch configured to connect the first pulse generator 121b to a power supply (not illustrated) and closing or opening a switch configured to connect the second pulse generator 121c to the power supply according to a control signal transmitted from the comparator 123a, power supplied from the power supply may be transmitted to only one of the first pulse generator 121b and the second pulse generator 121c. Accordingly, only one of the first pulse generator 121b or the second pulse generator 121c may output a pulse signal, and the light source 110 may emit the rays of lights L21 and L22 with various intensities to the floor surface 7.

When the rays of lights L21 and L22 are emitted from the light source 110 by a pulse signal output from at least one of the first pulse generator 121b and the second pulse generator 121c, the first sensor 111 and the second sensor 112 respectively receive the specularly-reflected light L23 and the diffusely-reflected light L24 and output the first electrical signal and the second electrical signal corresponding to the received rays of lights L23 and L24.

FIG. 22B is a view of an example of a signal output from the first sensor in response to light emitted by control of the first pulse generator, and FIG. 22C is a view of an example of a signal output from the second sensor in response to light emitted by control of the first pulse generator.

When the light source 110 outputs the light L21 with an intensity corresponding to an electrical signal output from the first pulse generator 121b, as illustrated in FIG. 22B, the first sensor 111 may output electrical signals with voltages V11 and V12 corresponding to the specularly-reflected light L23. In this case, the voltages V11 and V12 of the electrical signals output from the first sensor 111 may be different according to the material or condition of the floor surface 7.

For example, when the floor surface 7 is formed of a material with a low reflectance, the light L23 with relatively lower energy is specularly reflected from the floor surface 7, the level of light that the first sensor 111 receives is relatively decreased, and the first sensor 111 outputs an electrical signal with a first voltage V11, which is relatively low.

Conversely, when the floor surface 7 is formed of a material with a high reflectance, the light L23 with relatively higher energy is reflected from the floor surface 7, and the first sensor 111 outputs an electrical signal with a second voltage V12, which is relatively high. When the first sensor 111 is implemented with a sensor with a maximum output voltage R1, which is lower than the second voltage V12, the first sensor 111 outputs an electrical signal with the maximum output voltage R1 lower than the second voltage V12, even when the light L23 corresponding to the second voltage V12 is incident on the first sensor 111.

When the light source 110 outputs the light L21 with an intensity corresponding to the electrical signal output from the first pulse generator 121b, as illustrated in FIG. 22C, the second sensor 112 may output electrical signals with voltages V21 and V22 corresponding to the diffusely-reflected light L24. As described above, the voltages V21 and V22 of the electrical signals output from the second sensor 112 may be different according to material or condition of the floor surface 7.

For example, when the floor surface 7 is formed of a material with a low reflectance, the energy of the light L23 specularly reflected from the floor surface 7 and the light L24 diffusely reflected from the floor surface 7 is relatively low. Accordingly, the level of light that the second sensor 112 receives is relatively decreased, and the second sensor 112 outputs an electrical signal with a third voltage V21, which is relatively low.

Conversely, when the floor surface 7 is formed of a material with a high reflectance, the light L24 with higher energy is diffusely reflected from the floor surface 7, and the second sensor 112 outputs an electrical signal with a fourth voltage V22, which is relatively high. When the first sensor 111 is implemented using a sensor with a maximum output voltage R2, which is lower than the fourth voltage V22, the second sensor 112 outputs an electrical signal with the maximum output voltage R2 lower than the fourth voltage V22, even when the light L24 corresponding to the fourth voltage V22 is incident on the second sensor 112.

According to embodiments, the maximum output voltage R1 of the first sensor 111 may be equal to or different from the maximum output voltage R2 of the second sensor 112.

As illustrated in FIG. 21, the first electrical signal output from the first sensor 111 and the second electrical signal output from the second sensor 112 may be transmitted to the signal processor 122.

According to one embodiment, the signal processor 122 may include the high-pass filter 123, the comparator 123a, the amplifier 124, and the low-pass filter 125.

The high-pass filter 123 may only pass signals with frequencies within a certain range or higher to remove noise due to the disturbance light L9, and output an electrical signal from which the noise is removed. Because the high-pass filter 123 has been described above, detailed descriptions thereof will be omitted.

According to one embodiment, the electrical signal output by the high-pass filter 123 may be transmitted to the comparator 123a.

The comparator 123a may compare each of the first electrical signal output from the first sensor 111 and the second electrical signal output from the second sensor 112 with reference values, e.g., reference voltages R11 and R21.

For example, the comparator 123a compares the voltages V11 and V12 of the first electrical signal output by the first sensor 111 with a first reference voltage R1 and determines whether the voltages V11 and V12 of the first electrical signal are higher or lower than the first reference voltage R11. Here, the first reference voltage R11 may be the maximum output voltage R1 of the first sensor 111 or a voltage close to the maximum output voltage R1. For example, the first reference voltage R11 may include any voltage between 75% to 90% of the maximum output voltage R1.

The comparator 123a may compare the voltages V21 and V22 of the second electrical signal output by the second sensor 112 with a second reference voltage R21 and determine whether the voltages V21 and V22 of the second electrical signal output by the second sensor 112 are lower or higher than the second reference voltage R21. Here, the second reference voltage R21 may be the maximum output voltage R2 of the second sensor 112 or a voltage close to the maximum output voltage R2. For example, the second reference voltage R21 may include any voltage between 75% to 90% of the maximum output voltage R2.

The first reference voltage R11 and the second reference voltage R21 may be set to be equal to each other. In this case, the maximum output voltage R1 of the first sensor 111 may be equal or very close to the maximum output voltage R2 of the second sensor 112.

According to a comparison between the first electrical signal and the first reference voltage R11 and a comparison between the second electrical signal and a second reference voltage R21, the comparator 123a may transmit the first electrical signal and the second electrical signal to at least one of the amplifier 124, the low-pass filter 125, and the floor condition determiner 126 or generate a control signal according to a result of comparison and transmit the generated control signal to the selector 121d.

For example, when the voltage V11 of the first electrical signal is lower than the first reference voltage R11, and the voltage V21 of the second electrical signal is smaller than the second reference voltage R21, the comparator 123a may transmit the first electrical signal and the second electrical signal to at least one of the amplifier 124, the low-pass filter 125, and the floor condition determiner 126.

When the voltage V11 of the first electrical signal is higher than the first reference voltage R11, or the voltage V21 of the second electrical signal is higher than the second reference voltage R21, the comparator 123a may generate a predetermined control signal so that the quantities of light of the rays of lights L21 and L22 emitted from the light source 110 are decreased, and then transmit the generated control signal to the selector 121d.

Specifically, when the first pulse generator 121b transmits the first pulse signal to the light source 110, the light source 110 may emit the light L21 with the intensity corresponding to the first pulse signal, i.e., the light L21 with relatively higher energy. The first sensor 111 and the second sensor 112 output the first electrical signal and the second electrical signal corresponding to the specularly-reflected light L23 and the diffusely-reflected light L24.

When the voltage of the first electrical signal is higher than the reference voltage R11, or the voltage of the second electrical signal is higher than the reference voltage R21, the comparator 123a generates a control signal and transmits the generated control signal to the selector 121d.

The selector 121d selects a pulse generator with which the light source 110 may emit the light L22 with a relatively low intensity, i.e., the second pulse generator 121c, from the plurality of pulse generators 121b and 121c according to the received control signal, and the selected second pulse generator 121c generates the second pulse signal and transmits the generated second pulse signal to the light source 110. Accordingly, the light source 110 emits the light L22 with relatively lower energy than the previously-emitted light L21.

FIG. 22D is a view of an example of signals output from the first sensor in response to light emitted by control of the second pulse generator, and FIG. 22E is a view of an example of signals output from the second sensor in response to light emitted by control of the second pulse generator.

Because the intensity of the light L22 emitted from the light source 110 by the second pulse signal is relatively lower as described above, the first sensor 111 outputs an electrical signal with a fifth voltage V13, which is relatively lower, as illustrated in FIG. 22D, and the second sensor 112 outputs an electrical signal with a sixth voltage V23, which is relatively lower, as illustrated in FIG. 22E.

The fifth voltage V13 may be relatively lower than the first voltage V11 or the second voltage V12 and may be relatively lower than the maximum output voltage R1 of the first sensor 111 or the first reference voltage R11. The sixth voltage V23 may be relatively lower than the third voltage V21 or the fourth voltage V22 and may be lower than the maximum output voltage R2 of the second sensor 112 or the second reference voltage R21.

When the voltage V12 of the first electrical signal corresponding to the specularly-reflected light L23 is higher than or equal to the maximum output voltage R1, the voltage of the electrical signal output from the first sensor 111 is equal or very close to the maximum output voltage R1, and accordingly, the level of light sensed by the first sensor 111 is unable to be accurately measured. The same applies to the second sensor 112. In other words, when the intensities of the rays of lights L23 and L24 exceed the range of intensities that may be measured by the first sensor 111 and the second sensor 112, a voltage between output electrical signals is unable to be accurately or approximately measured, and accordingly, a result of calculating the voltage between the output electrical signals also becomes inaccurate.

In this case, when the relative intensity of the light L22 emitted from the light source 110 is decreased as described above, the intensities of the rays of lights L23 and L24 may be within the range of intensities that may be measured by the first sensor 111 and the second sensor 112, and the voltage V13 of the first electrical signal corresponding to the specularly-reflected light L23 and the voltage V23 of the second electrical signal corresponding to the diffusely-reflected light L24 may become lower than the maximum output voltages R1 and R2 of the first sensor 111 and the second sensor 112. Accordingly, the voltage V13 of the first electrical signal and the voltage V23 of the second electrical signal may be more accurately measured, and a ratio between the voltages V13 and V23 of the electrical signals may be more accurately calculated. Therefore, the controller 120 of the moving object 100 may more accurately determine a condition of the floor surface 7.

Although the example in which the light emission controller 121 includes the two pulse generators 121b and 121c is illustrated in FIGS. 21 to 22D, the number of pulse generators 121b and 121c is not limited thereto, and the light emission controller 121 may also include three or more pulse generators. In this case, the pulse generators may generate different pulse signals, and the light source 110 is configured to emit rays of lights with different intensities in response to the different pulse signals.

Since structures, operations, and functions of the amplifier 124 and the low-pass filter 125 of the signal processor 122, the floor condition determiner 126, the moving object operation determiner 129, and the driving controller 129a have been described above, detailed descriptions thereof will be omitted.

Hereinafter, a cleaning robot 1 will be described as one embodiment of the above-described moving object 100.

FIG. 23 is a perspective view of an exterior of a cleaning robot according to one embodiment, and FIG. 24 is a plan view of the cleaning robot according to one embodiment. FIG. 25 is a plan view of an internal structure of the cleaning robot according to one embodiment, and FIG. 26 is a bottom plan view of the cleaning robot according to one embodiment.

Referring to FIGS. 23 to 26, the cleaning robot 1 may include a main body 200 forming an exterior, and an exterior of the main body 200 may be formed by a single housing or a combination of a plurality of housings.

The main body 200 may include a first main body 300 formed at a front portion, and a second main body 400 formed behind the first main body 300. A connecting member 500 configured to connect the first main body 300 and the second main body 400 may be disposed between the first main body 300 and the second main body 400. The first main body 300 and the second main body 400 may be integrally or separately manufactured and then coupled to each other.

According to one embodiment, a means configured to collect various pieces of information related to traveling of the cleaning robot 1 or into which dust on a floor surface may be introduced may be provided in the first main body 300.

A front surface of the first main body 300 may be formed in a predetermined shape, e.g., a quadrilateral shape, to be adhered to a front surface and a side surface in a traveling direction and suction dust thereon. Thus, the cleaning robot 1 may maximally be adhered to a wall surface and suction dust thereon.

A bumper 310 configured to mitigate noise and impact generated due to the cleaning robot 1 colliding with a wall surface during the traveling of the cleaning robot 1 may be coupled to the front surface of the first main body 300. A separate impact-absorbing member 315 may be additionally coupled to the bumper 310.

An entry blocking sensor 335 may protrude from an upper surface of the first main body 300. The entry blocking sensor 335 may sense infrared rays and prevent the cleaning robot 1 from entering a predetermined section. According to one embodiment, the entry blocking sensor 335 may be provided at both sides of the first main body 300.

A brush unit 320 having a plurality of protrusions each formed with a predetermined length formed at an outer surface to collect dust on the floor surface may be provided at a bottom surface of the first main body 300. The brush unit 320 of the first main body 300 may move dust on the floor surface rearward while rotating to allow the dust on the floor surface to be suctioned into the first main body 300. One or more guide flow paths 340 configured to guide dust to the brush unit 320 to improve a suction force of dust may be formed in front of the brush unit 320 of the first main body 300.

A charger terminal 345 configured to charge the cleaning robot 1 may be provided between the flow paths 340. When the charger terminal 345 is coupled to a terminal formed in a docking station (not illustrated), the charger terminal 345 may be electrically connected to the docking station, and a commercial current supplied to the docking station may be transmitted to a power supply 455 of the cleaning robot 1 via the charger terminal 345.

Referring to FIG. 26, one or more openings 1109, 1209, and 1309 respectively corresponding to one or more floor condition sensor modules 1100, 1200, and 1300 so that light emitted from the one or more floor condition sensor modules 1100, 1200, and 1300 (see FIG. 27) may be irradiated toward the floor surface may be provided at the bottom surface of the first main body 300. Bottom surfaces of the one or more floor condition sensor modules 1100, 1200, and 1300 may be exposed toward the bottom surface through the openings 1109, 1209, and 1309. The one or more openings 1109, 1209, and 1309 may be formed on a bottom frame 1009 (see FIG. 27) of the first main body 300. The one or more openings 1109, 1209, and 1309 may be formed on one or more positions on the bottom frame 1009 corresponding to positions of floor condition sensor module seating portions 1160, 1260, and 1360. Specifically, when three floor condition sensor module seating portions 1160, 1260, and 1360 are provided at a front portion and both side portions of the bottom frame 1009 of the first main body 300, correspondingly, the three openings 1109, 1209, and 1309 may also be provided at a front portion and both side portions of the bottom surface of the first main body 300. The one or more openings 1109, 1209, and 1309 may be formed at ends of insertion paths 1162, 1262, and 1362 of the floor condition sensor module seating portions 1160, 1260, and 1360 formed at predetermined positions at the bottom frame 1009 of the first main body 300.

An obstacle sensor 330 configured to sense an external obstacle may be further disposed inside the first main body 300. The obstacle sensor 330 may sense an external obstacle using infrared light, visible light, various electromagnetic waves, ultrasonic waves, or the like.

According to one embodiment, the one or more floor condition sensor module seating portions 1160, 1260, and 1360 and the one or more floor sensing condition modules 1100, 1200, and 1300 may be installed inside the first main body 300. The one or more floor sensing condition modules 1100, 1200, and 1300 may be respectively seated on the one or more floor condition sensor module seating portions 1160, 1260, and 1360 and installed inside the first main body 300. The one or more floor condition sensor module seating portions 1160, 1260, and 1360 and the one or more floor sensing condition modules 1100, 1200, and 1300 will be described below.

According to one embodiment, a means configured to store collected dust or control various operations related to the cleaning robot 1 may be provided in the second main body 400.

A driving unit 440 configured to drive the main body may be provided in the second main body 400. The driving unit 440 may include a left driving wheel 441 and a right driving wheel 442 to allow traveling of the main body. According to one embodiment, the driving wheels 441 and 442 may be respectively coupled to both side surfaces of the second main body 400 to be rotatable.

The second main body 400 may include a roller 460 configured to be rotatable 360° to support movement of the main body 200. The roller 460 may be provided at a bottom surface of the second main body 400, e.g., installed at a rear portion of the bottom surface of the second main body 400. In terms of relationship with the driving wheels 441 and 442, the roller 460 may be coupled to a position at which the roller 460 is able to support the center of mass of the main body. That is, the roller 460 may be disposed such that a distance from the roller 460 to the left driving wheel 441 and a distance from the roller 460 to the right driving wheel 442 are equal to each other. By such arrangement, a traveling load generated during the traveling of the main body may be minimized.

At least one of an input unit 452 (see FIG. 35) such as a button or a knob configured to receive a predetermined command from a user and a display unit 453 (see FIG. 35) configured to display a state of the cleaning robot 1 or provide various pieces of necessary information to the user may be provided at an upper surface of the second main body 400. The input unit 452 or the display unit 453 may be omitted according to embodiments.

Referring to FIG. 25, a mainboard 450 for various electronic controls of the main body 200 may be installed inside the second main body 400, and various components, e.g., semiconductor chips or the like, configured to perform functions of a controller 500 (see FIG. 35) or a storage unit 454 (see FIG. 35) may be installed on the mainboard 450.

The power supply 455 (see FIG. 35) configured to supply power for driving a supporting main body as necessary may be provided inside the second main body 400. According to one embodiment, the power supply 455 may be disposed behind a dust collection unit 430. According to one embodiment, the power supply 455 may include a battery, and the battery may be a rechargeable secondary battery. When coupled to the docking station with a separate main body, the battery is charged by commercial power supplied from the docking station.

A dust collection unit configured to store dust may be provided inside the second main body 400, and the dust collection unit may include a suctioning motor 420 configured to provide power for suctioning dust and a dust collection bin 410 configured to store suctioned dust. A gripping portion 411 gripped by the user, so that the user may separate the dust collection bin 410 from the second main body 400, may be provided at the dust collection bin 410.

The dust collection bin 410 may be provided such that at least a portion thereof is exposed to the outside. In this case, a separate housing may not be coupled to an upper surface of the dust collection bin 410. Further, an exterior of the dust collection bin 410 may be implemented using a transparent material, e.g., glass or synthetic resin, and accordingly, the user may check the amount of dust inside the dust collection bin 410 with a naked eye.

A blower fan 411 configured to suction dust and move the suctioned dust to an inner portion of the dust collection bin 410 may be disposed at a lower end of the dust collection bin 410. Dust may be suctioned into the dust collection bin 410 according to rotation of the blower fan 411 and accumulated in the dust collection bin 410.

The suctioning motor 420 may be disposed inside a suctioning motor housing 402. The suctioning motor 420 may be coupled to a side surface of the dust collection bin 410. The left driving wheel 441 and the right driving wheel 442 may respectively be disposed at a side surface of the dust collection bin 410 and a side surface of the suctioning motor 420, and accordingly, the dust collection bin 410, the suctioning motor 420, and the driving wheels 441 and 442 may be disposed in parallel in a transverse direction of the main body.

Hereinafter, the floor sensing condition modules according to various embodiments will be described in more detail.

FIG. 27 is a view of an example in which floor condition sensor modules are installed in the cleaning robot, FIG. 28 is a view of the example in which the floor condition sensor modules are installed in the cleaning robot, and FIG. 29 is a view of the example in which the floor condition sensor modules are installed in the cleaning robot in more detail.

As illustrated in FIGS. 27 to 29, the first main body 300 is provided such that the bottom frame 1009 is separable from the bottom surface of the first main body 300. A brush unit installation frame 1008 at which the brush unit 320 is installed may be provided at the bottom frame 1009, and the brush unit installation frame 1008 may have a cylindrical shape or a shape similar thereto for the brush unit 320 to be easily rotated. The brush unit installation frame 1008 is provided to be open toward the bottom surface.

In one embodiment, the floor condition sensor module seating portions 1160, 1260, and 1360 may be formed at the bottom frame 1009. For example, the floor condition sensor module seating portions 1160, 1260, and 1360 may be formed in front of and behind the brush unit installation frame 1008. A single floor condition sensor module seating portion 1160 may be formed in front of the brush unit installation frame 1008, and two floor condition sensor module seating portions 1260 and 1360 may be formed behind the brush unit installation frame 1008. The single floor condition sensor module seating portion 1160 in front of the brush unit installation frame 1008 may be installed at a central portion, and the two floor condition sensor module seating portions 1260 and 1360 behind the brush unit installation frame 1008 may respectively be formed at both ends of the bottom frame 1009 to be adjacent to the left driving wheel 441 and the right driving wheel 442, respectively. However, the above-described positions of the floor condition sensor module seating portions 1160, 1260, and 1360 are merely one embodiment, and the positions of the floor condition sensor module seating portions 1160, 1260, and 1360 are not limited thereto. The floor condition sensor module seating portions 1160, 1260, and 1360 may be disposed at various positions that may be considered by a designer.

The floor condition sensor module seating portions 1160, 1260, and 1360 respectively include bodies 1161, 1261, and 1361 protruding upward, and the insertion paths 1162, 1262, and 1362 formed to penetrate from top to bottom. An opening may be provided at both ends of the insertion paths 1162, 1262, and 1362, and the openings 1109, 1209, and 1309 open toward the floor surface may be formed at the bottom surface of the first main body 300 and allow light to be irradiated toward the floor surface or allow light reflected from the floor surface to be incident on the floor condition sensor modules 1100, 1200, and 1300. According to one embodiment, sizes of the openings formed above the insertion paths 1162, 1262, and 1362 and those of the openings 1109, 1209, and 1309 formed below the insertion paths 1162, 1262, and 1362, i.e., formed to be open toward the floor surface, may be different from each other. For example, the sizes of the openings formed above the insertion paths 1162, 1262, and 1362 may be larger than those of the openings 1109, 1209, and 1309 formed below the insertion paths 1162, 1262, and 1362, i.e., formed to be open toward the floor surface. In this case, the insertion paths 1162, 1262, and 1362 may be formed to have widths narrowing from the openings thereabove toward the openings 1109, 1209, and 1309 formed to be open toward the floor surface. The insertion paths 1162, 1262, and 1362 may be formed with sizes and lengths sufficient for light to be irradiated from the floor condition sensor modules 1100, 1200, and 1300 or light reflected from the floor surface to be suitably incident on the floor condition sensor modules 1100, 1200, and 1300.

The floor condition sensor modules 1100, 1200, and 1300 may respectively be installed by being inserted into and seated on the floor condition sensor module seating portions 1160, 1260 and 1360. For example, the floor condition sensor modules 1100, 1200, and 1300 may be fixed by respectively being inserted into the insertion paths 1162, 1262, and 1362 of the floor condition sensor module seating portions 1160, 1260, and 1360. When the insertion paths 1162, 1262, and 1362 have widths narrowing from the openings there above toward the openings 1109, 1209, and 1309 formed to be open toward the floor surface, the floor condition sensor module seating portions 1160, 1260, and 1360 may respectively be seated on the insertion paths 1162, 1262, and 1362, and inserted into and seated on the floor condition sensor module seating portions 1160, 1260, and 1360. The floor condition sensor modules 1100, 1200, and 1300 may respectively be fixed to and seated on the floor condition sensor module seating portions 1160, 1260, and 1360 by external couplers 1159a and 1159b provided to protrude. In this case, the external couplers 1159a and 1159b may be coupled and fixed to portions of the floor condition sensor module seating portions 1160, 1260, and 1360 using fastening materials such as screws, nuts, pins, or nails.

When the floor condition sensor modules 1100, 1200, and 1300 are respectively installed at the floor condition sensor module seating portions 1160, 1260, and 1360, portions of the floor condition sensor modules 1100, 1200, and 1300 may be exposed through the upper surface of the bottom frame 1009, and the other portions thereof may be respectively concealed by the floor condition sensor module seating portions 1160, 1260, and 1360.

Hereinafter, the floor condition sensor modules 1100, 1200, and 1300 according to a first embodiment will be described with reference to FIGS. 30A to 35.

FIG. 30A is a first perspective view of the floor condition sensor module according to one embodiment, and FIG. 30B is a second perspective view of the floor condition sensor module according to one embodiment. FIG. 31A is a first exploded perspective view of the floor condition sensor module according to one embodiment, and FIG. 31B is a second exploded perspective view of the floor condition sensor module according to one embodiment. FIG. 32 is a front cross-sectional view of the floor condition sensor module according to one embodiment.

Referring to FIGS. 30A to 32, in one embodiment, the floor condition sensor module 1100 may include a main body housing 1110, a main body portion 1120, and a seating portion 1150.

The main body housing 1110 may include a front plate 1110a, a rear plate 1110b, and both side plates 1110c and 1110d configured to connect the front plate 1110a and the rear plate 1110b to each other, and these plates 1110a to 1110d may be formed in a hexahedral shape. A path 1111 may be formed from top to bottom between the front plate 1110a, the rear plate 1110b, and the both side plates 1110c and 1110d, and various components of the main body portion 1120 may be disposed inside the path 1111. At a lower end of the rear plate 1110b, first couplers 1112a and 1112b respectively corresponding to second couplers 1153a and 1153b provided at the seating portion 1150 are formed, the first couplers 1112a and 1112b protrude toward the bottom surface, and insertion grooves 1113a and 1113b into which the second couplers 1153a and 1153b, formed as protrusions are respectively inserted and coupled, are provided.

A substrate 1121 and a connecting terminal 1122 configured to be electrically connected to external components are provided in the main body portion 1120, and a light source 1130, a first sensor 1141, and a second sensor 1142 are formed at the substrate 1121. Further, lead wires 1131, 1141b, and 1142b configured to electrically connect the light source 1130, the first sensor 1141, and the second sensor 1142 may be installed at the substrate 1121. The light source 1130 may receive an electrical signal or power supply transmitted from the outside via the lead wire 1131, and the first sensor 1141 and the second sensor 1142 may transmit electrical signals output via the lead wires 1141b and 1142b to the controller 500.

The light source 1130, the first sensor 1141, and the second sensor 1142 may be provided toward the seating portion 1150 and respectively be inclined at different angles $\theta10$, $\theta11$, and $\theta12$. Seating protrusions 1132, 1141a, and 1142a may respectively protrude from the light source 1130, the first sensor 1141, and the second sensor 1142 so that the light source 1130, the first sensor 1141, and the second sensor 1142 may respectively be easily seated on seating surfaces 1154a2, 1154b2, and 1154c2 of the seating portion 1150. In this case, the seating protrusions 1132, 1141a, and 1142a may be formed to have disk shapes along outer circumferential surfaces of the light source 1130, the first sensor 1141, and the second sensor 1142, respectively.

The light source 1130 is configured to emit light such as visible light or infrared light. For example, the light source 1130 is implemented using various types of lighting devices such as an incandescent light bulb, a halogen lamp, a fluorescent lamp, a sodium lamp, a mercury lamp, a fluorescent mercury lamp, a xenon lamp, an arc-light lamp, a neon tube lamp, an EL lamp, a LED lamp, a CCFL, and an EEFL.

According to one embodiment, the light source 1130 may be disposed between the first sensor 1141 and the second sensor 1142.

The first sensor 1141 and the second sensor 1142 are provided to sense light irradiated from the light source 1130 and then reflected from the floor surface. In this case, the first sensor 1141 is provided to sense specularly-reflected light, and the second sensor 1142 is provided to sense diffusely-reflected light. The first sensor 1141 and the second sensor 1142 may output a predetermined electrical signal according to sensed light. For example, the first sensor 1141 and the second sensor 1142 may be implemented using various types of photosensitive sensors such as a photoconductive cell, a photodiode, a phototransistor, a photo-thyristor, a CCD, a CMOS, an intensifier, a photo-coupler, and a photo-interrupter.

The seating portion 1150 may include one or more insertion paths 1154*a*1, 1154*b*1, and 1154*c*1 into which the light source 1130, the first sensor 1141, and the second sensor 1142 are respectively inserted. The one or more insertion paths 1154*a*1, 1154*b*1, and 1154*c*1 are formed to respectively be tilted at the predetermined angles θ10, θ11, and θ12 from a first inclined surface 1151, a second inclined surface 1152*b*, and a third inclined surface 1152*c* of the seating portion 1150 and be penetrated. The first inclined surface 1151, the second inclined surface 1152*b*, and the third inclined surface 1152*c* may be formed to be inclined upward at different angles. The light source 1130, the first sensor 1141, and the second sensor 1142 may respectively be inserted into one ends of the corresponding insertion paths 1154*a*1, 1154*b*1, and 1154*c*1, and may be coupled to the seating portion 1150 by the seating protrusions 1132, 1141*a*, and 1142*a* being respectively seated on the seating surfaces 1154*a*2, 1154*b*2, and 1154*c*2, which are provided to be respectively adjacent to the insertion paths 1154*a*1, 1154*b*1, and 1154*c*1.

As illustrated in FIG. 32, respective widths r10, r11, and r12 of the insertion paths 1154*a*1, 1154*b*1, and 1154*c*1 may be decreased in the vicinity of bottom surfaces thereof. In this case, the respective widths r10, r11, and r12 in the vicinity of the bottom surfaces of the insertion paths 1154*a*1, 1154*b*1, and 1154*c*1 may have different sizes. For example, the width r11 in the vicinity of the bottom surface of the insertion path 1154*a*1 into which the first sensor 1141 is inserted may be smaller than the width r10 in the vicinity of the bottom surface of the insertion path 1154*b*1 into which the light source 1130 is inserted, and the width r10 of the insertion path 1154*b*1 into which the light source 1130 is inserted may be smaller than the width r12 in the vicinity of the bottom surface into which the second sensor 1142 is inserted. Rays of lights in different ranges travel along the insertion paths 1154*a*1, 1154*b*1, and 1154*c*1 according to differences between the widths r10, r11, and r12.

Slits 1154*a*3, 1154*b*3, and 1154*c*3 (see FIG. 31B) are respectively provided at the other ends of the insertion paths 1154*a*1, 1154*b*1, and 1154*c*1. Light irradiated from the light source 1130 may pass through a second slit 1154*b*3 and be irradiated to the floor surface, and light reflected from the floor surface may pass through a first slit 1154*a*3 and a third slit 1154*c*3 and be transmitted to the first sensor 1141 and the second sensor 1142. In this case, each of the slits 1154*a*3, 1154*b*3, and 1154*c*3 may be implemented in a circular shape.

According to one embodiment, the slits 1154*a*3, 1154*b*3, and 1154*c*3 may respectively have different sizes r0, r1, and r2. Specifically, the size r1 of the first slit 1154*a*3 corresponding to the first sensor 1141 may be smaller than the size r2 of the second slit 1154*b*3 corresponding to the light source 1130, and the size r2 of the second slit 1154*b*3 may be smaller than the size r3 of the third slit 1154*c*3 corresponding to the second sensor 1142. When the first sensor 1141 receives specularly-reflected light, and the second sensor 1142 receives diffusely-reflected light, the first sensor 1141 may only sense light which is accurately specularly reflected because the size r1 of the first slit 1154*a*3 is small, and the second sensor 1142 may sense light diffusely reflected in a wide range because the size r3 of the third slit 1154*c*3 is relatively large.

The second couplers 1153*a* and 1153*b* may be formed at an outer surface of the seating portion 1150, and the second couplers 1153*a* and 1153*b* may have a protruding shape. The second couplers 1153*a* and 1153*b* may be respectively inserted into the insertion grooves 1113*a* and 1113*b* of the first couplers 1112*a* and 1112*b* to couple the main body housing 1110 to the seating portion 1150.

The external couplers 1159*a* and 1159*b* may protrude from side surfaces of the seating portion 1150, and the external couplers 1159*a* and 1159*b* may be coupled and fixed to other external components, e.g., the floor condition sensor module seating portions 1160, 1260, and 1360 to allow the floor condition sensor modules 1100, 1200, and 1300 to be stably fixed inside the cleaning robot 1.

A protective plate 1160 through which light is transmitted may be formed at a bottom surface of the seating portion 1150. The protective plate 1160 may seal the slits 1154*a*3, 1154*b*3, and 1154*c*3 to prevent each of the components of the floor condition sensor modules 1100, 1200, and 1300 from being contaminated due to foreign substances being inserted from the outside via the slits 1154*a*3, 1154*b*3, and 1154*c*3.

Hereinafter, the floor condition sensor module according to other embodiments (1400 to 1600) will be described with reference to FIGS. 33A to 34B. Hereinafter, to avoid complexity of description, descriptions of structures, components, and/or functions in the embodiments (1400 to 1600) overlapping those of the floor condition sensor module according to the first embodiment (1100) will be omitted. However, it is self-evident that parts omitted according to a designer's choice may be further added when the embodiments (1400 to 1600) are actually implemented.

FIG. 33A is a front cross-sectional view of a floor condition sensor module according to a second embodiment.

Referring to FIG. 33A, a floor condition sensor module 1400 may include a main body portion 1420 and a seating portion 1450 and may further include a main body housing (not illustrated) as illustrated in FIGS. 30A to 32.

The main body portion 1420 may include a substrate 1421 and a connecting terminal 1422. A light source 1430, a first sensor 1441, and a second sensor 1442 are formed at the substrate 1421, and the second sensor 1442 is provided between the light source 1430 and the first sensor 1441. Accordingly, the first sensor 1441, the second sensor 1442, and the light source 1430 are sequentially disposed at the substrate 1421. The light source 1430, the first sensor 1441, and the second sensor 1442 may be fixed and installed at the substrate 1421. The light source 1430, the first sensor 1441, and the second sensor 1442 are electrically connected directly or indirectly to semiconductor chips or the like configured to perform the function of the controller 500 (see FIG. 35) via the substrate 1421, and are configured to receive an electrical signal from the controller 500 or transmit an electrical signal to the controller 500.

The light source 1430, the first sensor 1441, and the second sensor 1442 may be provided toward the seating portion 1150, and may be provided to be inclined at different angles θ21, θ22, and θ23 on the basis of a normal line of the floor surface 7.

The inclined angle θ21 of the light source 1430 and the inclined angle θ22 of the first sensor 1441 may be equal or very close to each other so that the first sensor 1441 suitably receives light emitted from the light source 1430 and then specularly reflected from the ground.

The second sensor 1442 is disposed between the light source 1430 and the first sensor 1441 to receive light diffusely reflected from the ground. In this case, the inclined angle θ23 of the second sensor 1442 may be relatively smaller than the inclined angle θ21 of the light source 1430 and the inclined angle θ22 of the first sensor 1441. The inclined angle θ23 of the second sensor 1442 may be inclined toward the light source 1430 as illustrated in FIG. 33A, tilted toward the first sensor 1441, or horizontal to the normal line of the ground 7.

When the second sensor 1442 is disposed between the light source 1430 and the first sensor 1441 as above, the size of the substrate 1421 may be implemented to be relatively smaller in comparison to the first embodiment, and accordingly, the overall size of the floor condition sensor module 1400 may also be reduced. Therefore, an advantage in that sizes of components may be reduced may be obtained.

According to one embodiment, the second sensor 1442 may be tilted by the suitable inclined angle θ23 such that the second sensor 1442 is in a direction in which the second sensor 1442 may receive light diffusely reflected from the point 7*f*, which is the same as the point 7*f* at which the specularly-reflected light incident on the first sensor 1441 is reflected.

The first sensor 1441, the second sensor 1442, and the light source 1430 are installed at the seating portion 1450, and the seating portion 1450 provides an optical path so that light emitted from the light source 1430 may be irradiated to the ground 7, or light specularly or diffusely reflected from the ground 7 may suitably reach the first sensor 1441 or the second sensor 1442. As illustrated in FIG. 33A, the seating portion 1450 may include insertion paths 1454*a*1, 1454*b*1, and 1454*c*1 and seating surfaces 1452*a*2, 1454*b*2, and 1454*c*2 respectively formed in the vicinity of the insertion paths 1454*a*1, 1454*b*1, and 1454*c*1.

The first sensor 1441, the second sensor 1442, and the light source 1430 are respectively inserted into the insertion paths 1454*a*1, 1454*b*1, and 1454*c*1 of the seating portion 1450. Seating protrusions 1441*a*, 1442*a*, and 1433 are respectively provided at the first sensor 1441, the second sensor 1442, and the light source 1430, and the seating protrusions 1441*a*, 1442*a*, and 1433 may be respectively seated on the seating surfaces 1452*a*2, 1454*b*2, and 1454*c*2 of the seating portion 1450 so that the first sensor 1441, the second sensor 1442, and the light source 1430 are seated on the seating portion 1450.

FIG. 33B is a front cross-sectional view of a floor condition sensor module according to a third embodiment.

Referring to FIG. 33B, a floor condition sensor module 1500 according to third embodiment may include a main body portion 1510 and a seating portion 1550 and may further include a main body housing (not illustrated) as described above.

The main body portion 1510 may include a substrate 1521 and a connecting terminal 1522. A light source 1530, a first sensor 1541, and a second sensor 1542 are formed at the substrate 1521, and as in the second embodiment, the second sensor 1542 may be installed between the light source 1530 and the first sensor 1541. Accordingly, the first sensor 1541, the second sensor 1542, and the light source 1530 are sequentially fixed and disposed at the substrate 1521.

The light source 1530, the first sensor 1541, and the second sensor 1542 are electrically connected directly or indirectly to semiconductor chips or the like configured to perform the function of the controller 500 via the substrate 1521, and are configured to receive an electrical signal from the controller 500 or transmit an electrical signal to the controller 500.

The light source 1530, the first sensor 1541, and the second sensor 1542 may be provided toward the seating portion 1550, and may be provided to be inclined at different angles θ31, θ32, and θ33 on the basis of a normal line of the floor surface 7.

The inclined angle θ31 of the light source 1530 and the inclined angle θ32 of the first sensor 1541 may be, for example, equal or very close to each other so that the first sensor 1541 suitably receives light emitted from the light source 1530 and then specularly reflected from the ground.

The second sensor 1542 is configured to receive light diffusely reflected from the ground.

According to one embodiment, the second sensor 1542 is configured to receive light diffusely reflected from the point 7*g*, which is different from the point 7*f*, at which light transmitted to the first sensor 1541 is specularly reflected. Specifically, light emitted from the light source 1530 is diffused and incident on a predetermined area on the ground 7, and specular reflection and diffused reflection occur at respective points of the predetermined area. The first sensor 1541 is configured to receive light specularly reflected from any one point 7*f* of the predetermined area, and the second sensor 1542 is configured to receive light diffusely reflected from the point 7*g*, which is different from the point 7*f*.

The inclined angle θ33 of the second sensor 1542 may be arbitrarily determined according to a designer's selection. In this case, the inclined angle θ33 of the second sensor 1542 may be larger or smaller than the inclined angle θ31 of the light source 1530 and the inclined angle θ32 of the first sensor 1541. As illustrated in FIG. 33B, the second sensor 1542 may be configured to receive light diffusely reflected from the point 7*g*, which is more adjacent to the first sensor 1541 than the point 7*f* at which specular reflection occurs, or may be installed to receive light diffusely reflected from a point more adjacent to the light source 1530 than the point 7*f* at which specular reflection occurs.

The first sensor 1541, the second sensor 1542, and the light source 1530 are installed at the seating portion 1550, and as illustrated in FIG. 33B, the seating portion 1550 may include insertion paths 1544*a*1, 1544*b*1, and 1544*c*1 into which the first sensor 1541, the second sensor 1542, and the light source 1530 are respectively inserted and seating surfaces 1544*a*2, 1544*b*2, and 1544*c*2 respectively formed in the vicinity of the insertion paths 1544*a*1, 1544*b*1, and 1544*c*1. Seating protrusions 1541*a*, 1542*a*, and 1543 respectively formed at the first sensor 1541, the second sensor 1542, and the light source 1530 may be respectively seated on the seating surfaces 1544*a*2, 1544*b*2, and 1544*c*2.

According to the floor condition sensor module 1500 of the second embodiment, because the second sensor 1542 may receive light diffusely reflected from the point 7g, which is different from the point 7f at which light is specularly reflected, the second sensor 1542 may be installed at the substrate 1521 of the main body portion 1510 using various methods, convenience of design is improved, and the seating portion 1550 may be implemented in a wider variety of shapes.

FIG. 34A is an exploded perspective view of a floor condition sensor module according to a fourth embodiment, and FIG. 34B is a front cross-sectional view of the floor condition sensor module according to the fourth embodiment.

According to FIGS. 34A and 34B, a floor condition sensor module 1600 of the fourth embodiment may include a main body portion 1620 in which various components such as a light source 1630 are installed, a seating portion 1650 on which the various components installed in the main body portion 1620 are seated, and a main body housing 1610 that may be coupled to the seating portion 1650.

The main body portion 1620 may include a substrate 1621 and a connecting terminal 1622. The light source 1630 configured to emit light, and a first sensor 1641 configured to receive light emitted from the light source 1630 and specularly reflected from the floor surface may be installed at the substrate 1621. Light emitted from the light source 1630 is diffused and incident on a region 7e on the ground 7.

A second sensor rotator 1643 that may be rotated about a predetermined rotation axis R20 may be further installed at the substrate 1621, and a second sensor 1642 configured to receive light emitted from the light source 1630 and diffusely reflected from the floor surface may be installed at the second sensor rotator 1643.

The second sensor rotator 1643 may be rotated within a preset angle range. In this case, the preset angle range may be arbitrarily determined by selection of a designer. For example, the second sensor rotator 1643 may be rotatable within the range of 360°, rotatable within the range of 180°, or rotatable within any range equal to or smaller than 90°.

The second sensor rotator 1643 may be electrically connected directly or indirectly to semiconductor chips or the like configured to perform the function of the controller 500 via the substrate 1621, and may be rotated on the basis of a control signal transmitted from the controller 500.

The second sensor rotator 1643 may be installed at one position on the substrate 1621. Here, the position on the substrate 1621 may be disposed between the light source 1630 and the first sensor 1641. Therefore, the second sensor 1642 may also be provided between the light source 1630 and the first sensor 1641. Accordingly, the first sensor 1641, the second sensor 1642, and the light source 1630 are sequentially disposed on the substrate 1621.

The second sensor 1642 fixed to the second sensor rotator 1643 may also be rotated about the rotation axis r20 according to the rotation of the second sensor rotator 1643.

The second sensor rotator 1643 may be implemented using flat plates having various shapes such as a circular shape, an elliptical shape, and a quadrilateral shape. According to embodiments, the flat plate may be superimposed on the substrate 1621 and mounted on the substrate 1621, or installed by being inserted into a hole passing through the substrate 1621 or a recessed region formed on the substrate 1621.

The second sensor rotator 1643 may further include an axial member passing through the second sensor rotator 1643 at the rotation axis R20, and the second sensor rotator 1643 may be rotated about the axial member. A motor may be disposed at one end of the axial member, and the second sensor rotator 1643 may automatically be rotated by driving of the motor. The motor may be omitted, and in this case, the second sensor rotator 1643 may manually be rotated by a designer or user.

The light source 1630, the first sensor 1641, and the second sensor 1642 may be connected directly or indirectly to semiconductor chips or the like configured to perform the function of the controller 500 via the substrate 1621, and may receive an electrical signal from the controller 500 or transmit an electrical signal to the controller 500.

The light source 1630 and the first sensor 1641 are disposed toward the seating portion 1650. In this case, as in the floor condition sensor modules 1100, 1400, and 1500 according to the first to third embodiments, the light source 1630 and the first sensor 1641 are provided so that the first sensor 1641 may suitably receive light emitted from the light source 1630 and then specularly reflected from the ground. For example, the inclined angle $\theta 31$ of the light source 1630 and the inclined angle $\theta 32$ of the first sensor 1641 may be equal or very close to each other.

The second sensor 1642 is configured to receive light diffusely reflected from the ground.

According to one embodiment, the second sensor 1642 may be disposed in various directions while being rotated by the second sensor rotator 1643. In other words, the inclined angle of the second sensor 1642 may be set as various values according to rotation of the second sensor rotator 1643. Accordingly, the second sensor 1642 may selectively receive rays of lights diffusely reflected from various points within the region 7e on which rays of lights are incident.

For example, the second sensor 1642 may be rotated to be in a direction in which the second sensor 1642 may suitably receive light diffusely reflected from the point 7f, which is the same as the point 7f at which light transmitted to the first sensor 1541 is specularly reflected. In another example, the second sensor 1642 may be rotated to be in a direction at which the second sensor 1642 may suitably receive light diffusely reflected from the point 7g, which is different from the point 7f at which light transmitted to the first sensor 1541 is specularly reflected. Therefore, the second sensor 1642 may selectively implement the second sensor 1442 of the floor condition sensor module 1400 of the above-described second embodiment and the second sensor 1542 of the floor condition sensor module 1500 of the third embodiment by rotation.

The first sensor 1641, the second sensor 1642, and the light source 1630 may be inserted into and installed at the seating portion 1650, and as illustrated in FIG. 34B, the seating portion 1650 may include insertion paths 1654a1, 1654b1, and 1654c1 into which the first sensor 1641, the second sensor 1642, and the light source 1630 are respectively inserted, and seating surfaces 1654a2, 1654b2, and 1654c2 respectively formed in the vicinity of the insertion paths 1654a1, 1654b1, and 1654c1. Seating protrusions 1641a, 1642b, and 1643 respectively formed at the first sensor 1641, the second sensor 1642, and the light source 1630 may be respectively seated on the seating surfaces 1654a2, 1654b2, and 1654c2.

In this case, for rotation of the second sensor 1642, the insertion path 1654b2 into which the second sensor 1642 is inserted may be formed to be relatively wider than the insertion paths 1154b3, 1454b2, and 1554b2 of the floor condition sensor modules 1100, 1400, and 1500 of the first to third embodiments. For example, the insertion path 1654*b*2 may be provided to have a relatively larger diameter. The seating surface 1654*b*2 may also have a shape that allows the second sensor 1642 to rotate. For example, as illustrated in FIG. 34B, the seating surface 1654*b*2 may be formed at the seating portion 1650 by being inclined by a predetermined angle and cut.

Hereinafter, a control flow of the cleaning robot 1 will be described.

FIG. 35 is a control block diagram of the cleaning robot according to one embodiment.

According to FIG. 35, the cleaning robot 1 may include the floor condition sensor modules 1100, 1200, and 1300, the controller 500, the wheels 441 and 442, drivers 441*a* and 442*a*, the suctioning motor 420, and the power supply 455, and may further include the input unit 452, the display unit 453, and the storage unit 454 as necessary.

According to embodiments, the cleaning robot 1 may include a single floor condition sensor module, e.g., only the first floor condition sensor module 1100, or include the plurality of floor condition sensor modules 1100, 1200, and 1300. Although the cleaner 1 including the three floor condition sensor modules 1100, 1200, and 1300 is illustrated in FIG. 35, the number of the floor condition sensor modules 1100, 1200, and 1300 are not limited thereto. The cleaning robot 1 may also include two floor condition sensor modules 1100, 1200, and 1300 or include four or more floor condition sensor modules 1100, 1200, and 1300.

According to one embodiment, the first floor condition sensor module 1100 may include the light source 1130, a first sensor 1140*a*, and a second sensor 1140*b*, the second floor condition sensor module 1200 may include a second light source 1250, a third sensor 1250*a*, and a fourth sensor 1250*b*, and the third floor condition sensor module 1300 may include a third light source 1350, a fifth sensor 1350*a*, and a sixth sensor 1350*b*.

The respective light sources 1130, 1250, and 1350 of the floor condition sensor modules 1100, 1200, and 1300 may emit light according to control of the controller 500, and the respective sensors 1140*a*, 1140*b*, 1250*a*, 1250*b*, 1350*a*, and 1350*b* may receive light reflected from the floor surface, output an electrical signal according to the received light, and transmit the output electrical signal to the controller 500. In this case, the first sensor 1140*a*, the third sensor 1250*a*, and the fifth sensor 1350*a* may receive specularly-reflected light and output an electrical signal, and the second sensor 1140*b*, the fourth sensor 1250*b*, and the sixth sensor 1350*b* may receive diffusely-reflected light and output an electrical signal.

In the cleaning robot 1 according to one embodiment, the light sources 1130, 1250, and 1350 may respectively be disposed between the sensors 1140*a* and 1140*b* of the floor condition sensor module 1100, the sensors 1250*a* and 1250*b* of the floor condition sensor module 1200, and the sensors 1350*a* and 1350*b* of the floor condition sensor module 1300.

In the cleaning robot 1 according to another embodiment, the sensors 1140*b*, 1250*b*, and 1350*b* configured to receive diffusely-reflected light may respectively be disposed between the light source 1130 and the sensor 1140*a* configured to receive specularly-reflected light of the floor condition sensor module 1100, the light source 1250 and the sensor 1250*a* configured to receive specularly-reflected light of the floor condition sensor module 1200, and the light source 1350 and the sensor 1350*a* configured to receive specularly-reflected light of the floor condition sensor module 1300.

The controller 500 is configured to perform various determinations related to the operation of the cleaning robot 1 and control the overall operation of each of the components of the cleaning robot 1.

The controller 500 may be implemented using processors such as a CPU or a MCU including one or more semiconductor chips and related components.

According to one embodiment, the controller 500 may include a light emission controller 510, a received signal processor 520, a floor condition determiner 530, and a driving controller 540.

The light emission controller 510 may transmit a control signal to each of the light sources 1130, 1250, and 1350 and allow each of the light sources 1130, 1250, and 1350 to emit light. In this case, the light emission controller 510 may output a pulse signal and allow each of the light sources 1130, 1250, and 1350 to emit light according to a predetermined pattern. For example, the light emission controller 510 may generate a pulse signal using a PWM method.

The light emission controller 510 may output a first pulse signal and a second pulse signal, which are different from each other, as necessary. The light emission controller 510 may generate any one of the first pulse signal and the second pulse signal on the basis of a result of comparison by the received signal processor 520 and transmit the generated pulse signal to each of the light sources 1130, 1250, and 1350. Each of the light sources 1130, 1250, and 1350 may emit light with an intensity corresponding to a received pulse signal. For example, each of the light sources 1130, 1250, and 1350 may emit light with relatively higher energy when the first pulse signal is received and may emit light with relatively lower energy when the second pulse signal is received.

The received signal processor 520 may perform predetermined signal processing on signals transmitted from each of the sensors 1140*a*, 1140*b*, 1250*a*, 1250*b*, 1350*a*, and 1350*b*. For example, the received signal processor 520 may sequentially apply a high-pass filter and a low-pass filter to electrical signals transmitted from the sensors 1140*a*, 1140*b*, 1250*a*, 1250*b*, 1350*a*, and 1350*b* and acquire smoothed electrical signals from which noise is removed.

According to one embodiment, the received signal processor 520 may compare a transmitted electrical signal with a reference voltage, and the light emission controller 510 may control at least one of the first light source 1130, the second light source 1250, and the third light source 1350 to emit light with a predetermined intensity according to control of the received signal processor 520.

For example, the received signal processor 520 may compare electrical signals respectively transmitted from the respective sensors 1140*a* and 1140*b*, 1250*a* and 1250*b*, and 1350*a* and 1350*b* of the floor condition sensor modules 1100, 1200, and 1300 with a reference voltage, and the light emission controller 510 may control at least one of the first light source 1130, the second light source 1250, and the third light source 1350 to irradiate light with a relatively lower intensity according to a result of comparison by the received signal processor 520.

According to one embodiment, the received signal processor 520 may independently acquire results of comparison for each of the floor condition sensor modules 1100, 1200, and 1300. In this case, the light emission controller 510 may independently control the floor condition sensor modules 1100, 1200, and 1300 on the basis of the results of comparison respectively corresponding to the floor condition sensor modules 1100, 1200, and 1300. For example, according to the results of comparison, the light emission controller 510 may control at least one of the floor condition sensor modules 1100, 1200, and 1300, e.g., the first floor condition sensor module 1100, to irradiate light with an intensity relatively lower than that of previously-emitted light, and control the other floor condition sensor modules, e.g., the floor condition sensor module 1200 and the third floor condition sensor module 1300, to maintain the intensity of previously-emitted light.

The floor condition determiner 530 may determine a floor condition on the basis of an electrical signal processed by the received signal processor 520. As described above, the floor condition determiner 530 may determine a condition of a floor surface placed below the cleaning robot 1 on the basis of electrical signals output from the first sensor 1140a, the third sensor 1250a, and the fifth sensor 1350a and electrical signals output from the second sensor 1140b, the fourth sensor 1250b, and the sixth sensor 1350b.

In this case, in one embodiment, the floor condition determiner 530 may calculate ratios between voltages of the electrical signals output from the first sensor 1140a, the third sensor 1250a, and the fifth sensor 1350a and the electrical signals output from the second sensor 1140b, the fourth sensor 1250b, and the sixth sensor 1350b, compare the calculated ratios with a first reference value and/or compare the calculated ratios with a second reference value, and determine whether the material of the floor surface is a smooth material or a rough material.

In another embodiment, the floor condition determiner 530 may compare electrical signals output from the first sensor 1140a, the third sensor 1250a, and the fifth sensor 1350a with a third reference value and compare electrical signals output from the second sensor 1140b, the fourth sensor 1250b, and the sixth sensor 1350b with a fourth reference value to determine whether a recessed region is present on the floor surface.

The floor condition determiner 530 may put together a result of comparing electrical signals acquired by the first floor condition sensor module 1100, a result of comparing electrical signals acquired by the second floor condition sensor module 1200, and a result of comparing electrical signals acquired by the third floor condition sensor module 1300, and determine a floor condition. For example, according to a result of determination using the electrical signals acquired by the first floor condition sensor module 1100, when a result of determination using the electrical signals acquired by the second floor condition sensor module 1200 and a result of determination using the electrical signals acquired by the third floor condition sensor module 1300 are different from each other, the floor condition determiner 530 may also determine a floor condition on the basis of a relatively more common result of determination among all of the results of determination.

The driving controller 540 may transmit a control signal to a first driver 441a and rotate the left driving wheel 441 and/or transmit a control signal to a second driver 442a and rotate the right driving wheel 442 according to a result of determination by the floor condition determiner 530. Here, the first driver 441a and the second driver 442a may respectively include a motor connected to the left driving wheel 441 and a motor connected to the right driving wheel 442.

The driving controller 540 may also control the suctioning motor 420 according to a result of determination by the floor condition determiner 530, or control the display unit 453.

Hereinafter, a specific operation of the cleaning robot 1 by the driving controller 540 will be described with reference to FIGS. 36A to 36J. Hereinafter, for convenience of description, a specific operation of the cleaning robot 1 by the driving controller 540 will be described on the basis of an example in which the light source 1130 is installed between the first sensor 1141 and the second sensor 1142 in the floor condition sensor module 1100. However, the specific operation of the cleaning robot 1 is not limited to the case in which the floor condition sensor module 1100 is implemented as above. The specific operation of the cleaning robot 1 may also be applied, identically or through some modifications, to the case in which the second sensor is installed between the first sensor and the light source as illustrated in FIGS. 33A to 34B.

FIG. 36A is a first view of an example of the cleaning robot traveling on a wooden floor with a smooth floor surface, and FIG. 36B is a second view of the example of the cleaning robot traveling on a wooden floor with a smooth floor surface.

As illustrated in FIGS. 36A and 36B, while the cleaning robot 1 is traveling on a region whose surface is not rough and/or hard, e.g., on a wooden floor surface 11, the light source 1130 of at least one of the plurality of floor condition sensor modules, e.g., the first floor condition sensor module 1100, may continuously or periodically emit light L11 according to control of the above-described light emission controller 510.

Since the wooden floor surface 11 is relatively flat and hard, the light L11 incident on a point 11a of the wooden floor surface 11 is mostly specularly reflected, a relatively high level of specularly-reflected light L12 is incident on the first sensor 1141, and a relatively low level of diffusely-reflected light L13 is incident on the second sensor 1142.

In this case, because a ratio between voltages of electrical signals output from the first sensor 1141 and the second sensor 1142 is relatively large, the floor condition determiner 530 of the controller 500 determines, by using the above-described method, that the surface on which the cleaning robot 1 is traveling is not hard and/or rough as a wooden floor. That is, the controller 500 determines that the floor surface on which the cleaning robot 1 is currently traveling is a hard floor (H/F).

When the floor surface on which the cleaning robot 1 is traveling is hard and/or not rough as a wooden floor according to a result of determination by the floor condition determiner 530, the driving controller 540 of the controller 500 controls the cleaning robot 1 to be operated in a general suctioning mode. Here, the general suctioning mode refers to a state or an operation predefined so that the cleaning robot 1 may suction dust with a general suction force. In the general suctioning mode, the suctioning motor 420 is operated with a general output predefined by a user or designer according to control of the driving controller 540.

FIG. 36C is a first view of an example of the cleaning robot traveling on a carpet, and FIG. 36D is a second view of the example of the cleaning robot traveling on the carpet.

As described above, while the cleaning robot 1 continues to travel, the light source 1130 of at least one floor condition sensor module, e.g., the first floor condition sensor module 1100, of the cleaning robot 1 may continuously or periodically emit the light L11 according to control of the above-described light emission controller 510.

When, as illustrated in FIGS. 36C and 36D, the cleaning robot 1 moves from the wooden floor surface 11 to a region whose surface is rough and/or soft, e.g., a carpet surface 12, because the carpet surface 12 is relatively rough and soft, light incident on a point 12a of the carpet surface 12 is mostly specularly reflected, a relatively high level of specularly-reflected light is incident on the first sensor 1141, and a relatively low level of diffusely-reflected light is incident on the second sensor 1142.

In this case, because a ratio between voltages of electrical signals output from the first sensor 1141 and the second sensor 1142 is calculated as a relatively small ratio, the floor condition determiner 530 determines that the surface 12 on which the cleaning robot 1 is traveling is soft and/or rough as a carpet. In other words, the controller 500 may determine that the floor surface on which the cleaning robot 1 is currently traveling is a soft floor (S/F).

According to such a result of determination, the driving controller 540 generates a control signal so that the cleaning robot 1 is operated in a high-output suctioning mode, and transmits the generated control signal to the suctioning motor 420. The high-output suctioning mode is a mode set so that the cleaning robot 1 may suction dust with a suction force stronger than the general suction force. In the high-output suctioning mode, the suctioning motor 420 is operated with an output relatively higher than the general output. Accordingly, the cleaning robot 1 cleans the surface 12 of a carpet or the like by suctioning dust or the like with a relatively stronger suction force. The size of output of the suctioning motor 420 in the high-output suctioning mode may be predefined by a user or designer.

FIGS. 36E and 36F are views of an example of the cleaning robot that reached a recessed region, and FIGS. 36G to 36J are views of an example of a first to a fifth operation of the cleaning robot when the cleaning robot reached the recessed region.

As illustrated in FIGS. 36E and 36F, while traveling on a floor surface 13, the cleaning robot 1 may reach a region lower than the floor surface 13, such as a threshold or step, i.e., a recessed region 14.

The light source 1130 of the cleaning robot 1 emits the light L11, and the emitted light L11 is reflected from a point 14a on the recessed region 14. The light L12 reflected from the point 14a of the recessed region 14 travels along a path different from a path L12a predicted on the basis of a height difference between the recessed region 14 and the floor surface 13. Therefore, the light L12 specularly reflected from the point 14a on the recessed region 14 is not suitably incident on the first sensor 1141.

The light L13 diffusely reflected from the point 14a may be incident on at least one of the first sensor 1141 and the second sensor 1142. In this case, the intensity of the diffusely-reflected light L13 may be relatively lower than the intensity of light reflected from the floor surface 13 on which the cleaning robot 1 was traveling.

Therefore, when the recessed region 14 is present, at least one of the first sensor 1141 and the second sensor 1142 outputs a voltage lower than a reference value as illustrated in FIGS. 6A and 6B. Because the voltage output from at least one of the first sensor 1141 and the second sensor 1142 is lower than a reference value, the floor condition determiner 530 of the controller 500 determines that the recessed region 14 is present.

When it is determined as above that the recessed region 14 is present, the cleaning robot 1 may perform a predetermined operation to avoid the recessed region 14 according to control of the controller 500.

For example, when it is determined that the recessed region 14 is present, the driving controller 540 of the controller 500 transmits a control signal to each of the first driver 441a and the second driver 441b of the cleaning robot 1 and stops driving of the first driver 441a and the second driver 441b. Accordingly, rotations of the left wheel 441 and the right wheel 442 are also stopped, and the cleaning robot 1 stops moving as illustrated in FIG. 36G.

When the cleaning robot 1 stops moving, in response to the stoppage of movement of the cleaning robot 1, the suctioning motor 420 of the cleaning robot 1 may also stop driving. Accordingly, the cleaning operation of the cleaning robot 1 may also be stopped.

Then, the driving controller 540 transmits a control signal to the first driver 441a and the second driver 441b of the cleaning robot 1 and control the cleaning robot 1 to move in a direction m31 opposite from a previous direction, so that the cleaning robot 1 may be further spaced apart from the recessed region 14. That is, the driving controller 540 controls the left wheel 441 and the right wheel 442 to be rotated in a direction opposite from a direction in which the left wheel 441 and the right wheel 442 were previously rotating.

In this case, the cleaning robot 1 may move by a predetermined distance d from a previous position k1 to a predetermined target point k2, which is relatively more distant from the recessed point 14. The predetermined target point k2 refers to a point at which the cleaning robot 1 may suitably be rotated as illustrated in FIG. 36I, and may be any one point of various points on the region 13 on which the cleaning robot 1 was previously traveling. Whether the cleaning robot 1 moved by the predetermined distance d or reached the target point k2 may be acquired using the number of rotations of the left wheel 441 and the right wheel 442 acquired by encoders respectively disposed at the left wheel 441 and the right wheel 442, or may be determined and acquired using a separately-provided global positioning system (GPS) or various types of communication modules. The moving distance d or the target point k2 of the cleaning robot 1 may be predefined by a designer or user.

When the cleaning robot 1 reaches the target point k2, the driving controller 540 may control the left wheel 441 and the right wheel 442 to be rotated in opposite directions to control the cleaning robot 1 to be rotated at a predetermined angle θ in a predetermined direction R100 as shown in FIG. 36I. The predetermined angle θ and the predetermined direction R11 may be defined by a designer or user. For example, the predetermined angle θ may be 180°. Also, for example, the predetermined direction R100 may be clockwise or counterclockwise direction.

According to embodiments, the driving controller 540 may control only one of the left wheel 441 or the right wheel 442 to be rotated to control the cleaning robot 1 to be rotated at the predetermined angle θ in the predetermined direction R100 as shown in FIG. 36I.

When rotation of the cleaning robot 1 ends, the driving controller 540 may control at least one of the left wheel 441 or the right wheel 442 to be rotated so that the cleaning robot 1 moves in a predetermined direction m32 according to predefined settings.

According to one embodiment, the predetermined direction m32 may be set to be equal to the moving direction m31 of the cleaning robot when the cleaning robot is being spaced apart from the recessed region 14. In this case, the driving controller 540 controls the left wheel 441 and the right wheel 442 so that the cleaning robot 1 moves in the moving direction m31 of the cleaning robot when the cleaning robot is being spaced apart from the recessed region 14. The left wheel 441 and the right wheel 442 are controlled by the driving controller 540 to be rotated in the same direction as a rotating direction thereof when the cleaning robot 1 moves in the direction m31, which is opposite from the direction in which the cleaning robot 1 was previously moving.

When the cleaning robot 1 starts moving in the predetermined direction m32, the suctioning motor 420 of the cleaning robot 1 may start driving in response to the start of movement, and accordingly, the cleaning robot 1 may resume the cleaning operation.

The cleaning robot 1 may clean the floor surface 13 while avoiding the recessed region 14 present on the floor surface 13 through the above-described process. Therefore, safety of the cleaning robot 1 may be more improved.

The input unit 452 is configured to receive a user command, and the display unit 453 is configured to display a result of determination by the floor condition determiner 530 to the user. The storage unit 454 may temporarily or non-temporarily store the result of determination by the floor condition determiner 530 as necessary. The storage unit 454 may be implemented using a semiconductor storage device, a magnetic disk storage device, an optical disk storage device, or the like.

The light emission controller 121, the signal processor 122, the floor condition determiner 126, and the driving controller 129a of the moving object 100 may be respectively applied as the light emission controller 510, the received signal processor 520, the floor condition determiner 530, and the driving controller 540 of the cleaning robot 1 identically or through some modifications. Therefore, detailed description of the light emission controller 510, the received signal processor 520, the floor condition determiner 530, and the driving controller 540 will be omitted below.

Hereinafter, a method of controlling a moving object will be described with reference to FIGS. 37A to 39.

FIG. 37A is a first flowchart illustrating a method of controlling a moving object according to one embodiment.

In the method of controlling the moving object according to one embodiment illustrated in FIG. 37A, first, light is irradiated from the moving object toward the floor surface (S2000). In this case, light may be irradiated toward the floor surface by flickering according to a predetermined pattern. Light may be irradiated through a plurality of times in a pattern corresponding to a pulse signal input to the light source configured to emit light. According to one embodiment, the pulse signal may be generated by the PWM method.

Light irradiated toward the floor surface may be reflected from the floor surface, and the light reflected from the floor surface may include specularly-reflected light and diffusely-reflected light. The moving object may receive all or a portion of specularly-reflected light and all or a portion of diffusely-reflected light (S2001), and acquire a first electrical signal corresponding to the received specularly-reflected light and a second electrical signal corresponding to the received diffusely-reflected light (S2002). When light is irradiated through a plurality of times, all or a portion of specularly-reflected light and all or a portion of diffusely-reflected light may be received through a plurality of times, and accordingly, the first electrical signal and the second electrical signal may be output through a plurality of times. In this case, the first electrical signal and the second electrical signal may be output in a pattern corresponding to a pattern in which light is irradiated.

The first electrical signal and the second electrical signal may be output with voltages of different sizes according to a condition of the floor surface. For example, when the floor surface is smooth, the first electrical signal may be output with a high voltage, and the second electrical signal may be output with a relatively low voltage because a portion of specularly-reflected light is increased in reflected light. In another example, when the floor surface is rough, the first electrical signal may be output with a relatively low voltage, and the second electrical signal may be output with a relatively high voltage because a portion of diffusely-reflected light is increased in the reflected light.

Using the above principle, the moving object may determine a floor condition using the first electrical signal and the second electrical signal (S2003).

Hereinafter, a method of controlling a moving object according to various embodiments will be described in more detail.

FIG. 37B is a second flowchart of a method of controlling a moving object according to one embodiment.

According to FIG. 37B, the moving object may first irradiate light toward a floor surface (S2010), receive light irradiated toward the floor surface and then specularly reflected and diffusely reflected, and output a plurality of electrical signals, e.g., the first electrical signal and the second electrical signal (S2011).

When the first electrical signal and the second electrical signal are output, a high-pass filter may be applied to each of the electrical signals to remove a noise component generated due to a disturbance light from each of the electrical signals (S2012).

The first electrical signal and the second electrical signal, from which the noise component is removed, may be amplified as necessary (S2013).

The amplified first electrical signal and second electrical signal may be smoothed by applying a low-pass filter thereto (S2014). Accordingly, electrical signals that may be easily processed by the moving object may be acquired.

The moving object may determine a material of the floor surface using a predetermined function having the voltage of the first electrical signal and the voltage of the second electrical signal acquired through the above-described Steps S2010 to S2014 as independent variables (S2015). For example, the predetermined function may be a function for calculating a ratio of a voltage of the second electrical signal with respect to a voltage of the first electrical signal.

When the ratio of the voltage of the second electrical signal with respect to the voltage of the first electrical signal is calculated, the moving object may compare the calculated ratio with a first reference value and determine whether the calculated ratio is smaller than the first reference value and, furthermore, compare the calculated ratio with a second reference value and determine whether the calculated ratio is larger than the second reference value.

The moving object may determine material of the floor surface by determining that the floor surface is smooth when the calculated ratio is smaller than the first reference value and determining that the floor surface is rough when the calculated ratio is larger than the second reference value (S2017).

When the material of the floor surface is determined, the moving object may be operated according to the determined material of the floor surface (S2018). According to one embodiment, the moving object may also browse a separately-stored database or the like, acquire data related to operation methods corresponding to materials of the floor surface, and then use the acquired data to perform a predetermined operation.

FIG. 38 is a third flowchart of a method of controlling the moving object according to one embodiment.

According to FIG. 38, the moving object first irradiates light toward the floor surface (S2020), receives light irradiated toward the floor surface and then specularly reflected and diffusely reflected, and may output the first electrical signal and the second electrical (S2021).

Then, as described above, the high-pass filter, the amplifier, and the low-pass filter may be applied to the first electrical signal and the second electrical signal, and accordingly, the first electrical signal and the second electrical signal, which are smoothed by removing noise therefrom, may be acquired (S2022 to S2024).

When the first electrical signal and the second electrical signal are acquired, the moving object may determine whether a recessed region is present on the floor surface using a predetermined function having the acquired voltage of the first electrical signal and voltage of the second electrical signal as independent variables, and further, determine risk of the moving object falling (S2025 and S2026). Here, the predetermined function may be a function for determining whether the voltage of the first electrical signal is smaller than a third reference value and whether the second electrical signal is smaller than a fourth reference value.

For example, the moving object may determine whether the voltage of the first electrical signal is smaller than the third reference value and determine whether the second electrical signal is smaller than the fourth reference value (S2025), and when the voltage of the first electrical signal and the second electrical signal are smaller than the third reference value and the fourth reference value, respectively, the moving object may determine that the recessed region is present on the floor surface (S2026).

The moving object may be operated according to a result of determination (S2027). For example, the moving object may perform an operation of avoiding the recessed region when it is determined that the recessed region is present on the floor surface, and may maintain the previous operation when it is determined that the recessed region is not present. For example, the operation of avoiding the recessed region may be performed through a series of processes in which, as described above, the moving object which was traveling in a previous traveling direction is stopped, moves by a predetermined distance in an opposite direction, is rotated within a predetermined angle range, and performs cleaning while traveling according to predefined settings. In this case, as described above, the moving object may also be designed to browse a separately-stored database or the like, acquire data related to operation methods corresponding to materials of the floor surface, and then use the acquired data to perform a predetermined operation.

FIG. 39 is a fourth flowchart of a method of controlling the moving object according to one embodiment. FIG. 39 is a view of an example of a method of controlling the moving object when light is irradiated toward the floor surface through a plurality of times in a predetermined pattern.

According to FIG. 39, the moving object may irradiate light toward the floor surface, receive light specularly reflected from the floor surface and light diffusely reflected from the floor surface, and acquire and output a first electrical signal corresponding to the specularly-reflected light and a second electrical signal corresponding to the diffusely-reflected light (S2030).

Then, when attempting to acquire material of the floor surface, the moving object may calculate a ratio between the first electrical signal and the second electrical signal corresponding to each other (S2031).

Then, the moving object compares the calculated ratio with a first reference value (S2032). Here, the first reference value may be arbitrarily determined according to a designer's choice. For example, the first reference value may be any one value between 0.1 and 1.2.

When the calculated ratio is smaller than the first reference value (YES in S2032), the moving object adds one to a variable set for counting the number of cases in which the ratio is smaller than the first reference value, i.e., a first count variable CNT1 (S2033).

The moving object determines whether the first count variable CNT1 is equal to a preset first count reference value, e.g., 100 (S2034), and when the first count variable CNT1 is equal to the preset first count reference value (YES in S2034), the moving object determines that the floor surface is smooth (S2035). When it is determined that the floor surface is smooth, the moving object may initialize the first count variable CNT1. In this case, the moving object may also initialize a second count variable CNT2 simultaneously or at a different time from that of the initialization of the first count variable CNT1.

When the first count variable CNT1 is not equal to the preset first count reference value, in other words, when the first count variable CNT1 is smaller than the preset first count reference value (NO in S2034), the moving object may maintain the current operation, irradiate light again toward the floor surface, and receive specularly-reflected light and diffusely-reflected light (S2030).

When it is determined that the floor surface is smooth, the moving object may perform a predefined operation, such as the general suctioning mode, according to a result of determination (S2036).

When the calculated ratio is not smaller than the first reference value (NO in S2032), it may be possible to determine whether the ratio is larger than a second reference value (S2040). The second reference value may be arbitrarily set by a designer. For example, the second reference value may be any one value between 1.5 and 4.0.

When the ratio is larger than the second reference value (YES in S2040), the moving object adds 1 to a variable set for counting the number of cases in which the ratio is larger than the second reference value, i.e., the second count variable CNT2 (S2041). Conversely, when the ratio is smaller than the second reference value (NO in S2040), the moving object may maintain the current operation, and a control device provided in the moving object to compare the ratio with the first reference value and/or the second reference value may ignore electrical signals input thereto and wait until a new first electrical signal and/or a new second electrical signal is/are received.

Then, the moving object may determine whether the second count variable CNT2 is equal to a preset second count reference value, e.g., 100 (S2042), and when the second count variable CNT2 is equal to the preset second count reference value (YES in S2042), the moving object determines that the floor surface is rough (S2042). When it is determined that the floor surface is rough, the moving object may initialize the second count variable CNT2. In this case, the moving object may also initialize the first count variable CNT1.

When the second count variable CNT2 is not equal to the present second count reference value, in other words, the second count variable CNT2 is smaller than the second count reference value (NO in S2042), the moving object may maintain the current operation, irradiate light again toward the floor surface and receive specularly-reflected light and diffusely-reflected light (S2030).

When it is determined that the floor surface is rough, the moving object may perform a predefined operation, such as the high-speed suctioning mode, according to a result of determination (S2036).

When light is irradiated through a plurality of times according to a predetermined pattern, and the moving object sequentially acquires a plurality of first electrical signals and sequentially acquires a plurality of second electrical signals, the above-described Steps S2030 to S2050 may be continuously repeated, and accordingly, the first count variable CNT1 and the second count variable CNT2 may be increased, unchanged, or initialized.

Unlike the above, when attempting to find out whether a recessed region is present, the moving object may compare the first electrical signal and the second electrical signal corresponding to each other with a predefined third reference value and a predetermined fourth reference value, respectively, without calculating a ratio between the signals, perform counting according to a result of comparison, and then use the counting result to determine whether the recessed region is present on the floor surface.

FIG. 40 is a flowchart of a method of controlling the moving object according to another embodiment.

Referring to FIG. 40, when the moving object starts the operation, the moving object generates a first pulse signal and transmits the first pulse signal to the light source installed at the moving object (S2070, S2071).

In response to the transmission of the first pulse signal, the light source irradiates light with an intensity corresponding to the first pulse signal toward the floor surface (S2072).

Light irradiated to the floor surface may be reflected from the floor surface, and light reflected from the floor surface may include specularly-reflected light and diffusely-reflected light. The first sensor of the moving object receives all or a portion of the specularly-reflected light, and the second sensor of the moving object receives all or a portion of the diffusely-reflected light (S2073). Here, the second sensor may be disposed on the first sensor and the light source, or the light source may be disposed between the first sensor and the second sensor. The first sensor outputs a first electrical signal corresponding to the received specularly-reflected light, and the second sensor outputs a second electrical signal corresponding to the received diffusely-reflected light.

Then, the moving object may compare each of a voltage of the first electrical signal and a voltage of the second electrical signal with a reference voltage. The comparison between the voltage of the first electrical signal and a reference voltage and the comparison between the voltage of the second electrical signal and a reference voltage may be sequentially performed or simultaneously performed.

For example, the moving object may first compare the voltage of the first electrical signal with a first reference voltage (S2074). The first reference voltage may be equal to a maximum output voltage that the first sensor may output or may be somewhat lower than the maximum output voltage.

When it is determined as a result of comparison that the voltage of the first electrical signal is lower than the first reference voltage (YES in S2074), the moving object subsequently compares the voltage of the second electrical signal with a second reference voltage (S2075). The second reference voltage may be equal to a maximum output voltage that the second sensor may output or may be somewhat lower than the maximum output voltage. The second reference voltage may be equal to or different from the first reference voltage. According to embodiments, the moving object may be designed to subsequently compare the voltage of the second electrical signal with the second reference voltage (S2075) even when the voltage of the first electrical signal is equal to the first reference voltage.

When the voltage of the second electrical signal is lower than the second reference voltage as a result of comparison (NO in S2074), the moving object may perform various types of calculation processing on the basis of the first electrical signal and the second electrical signal. According to embodiments, the moving object may be designed to perform various types of calculation processing on the basis of the first electrical signal and the second electrical signal even when the voltage of the second electrical signal is equal to the second reference voltage.

According to embodiments, the moving object may first compare the voltage of the second electrical signal with the second reference voltage, and when the voltage of the second electrical signal is lower than the second reference voltage, may perform comparison between the voltage of the first electrical signal and the first reference voltage.

For example, the moving object may calculate a ratio between the voltage of the first electrical signal and the voltage of the second electrical signal (S2076), and perform various determinations necessary for operation of the moving object according to the calculated ratio. For example, the moving object may determine the material of the floor surface or determine whether the recessed region is present (S2077). In this case, the moving object may determine material of the floor surface or determine whether a recessed region is present, according to the embodiments shown in FIGS. 37B to 39.

The moving object performs various operations such as advancing, retreating, rotating, avoiding, or the like according to a result of determination (S2078).

When the voltage of the first electrical signal exceeds the first reference voltage (NO in S2074), and/or the voltage of the second electrical signal exceeds the second reference voltage (NO in S2075), the moving object may generate a second pulse signal (S2079 and S2071) and apply the second pulse signal to the light source provided in the moving object to allow the light source to emit light with an intensity corresponding to the second pulse signal (S2072). In this case, the intensity of light corresponding to the second pulse signal may be lower than the intensity of light corresponding to the first pulse signal.

As described above, the first sensor and the second sensor may respectively output the first electrical signal corresponding to the received specularly-reflected light and the second electrical signal corresponding to the received diffusely-reflected light (S2073), and the moving object may compare a voltage of a new first electrical signal and a voltage of a new second electrical signal with corresponding reference voltages simultaneously or sequentially (S2074 and S2075), calculate a ratio between the plurality of electrical signals according to a result of comparison, and be operated on the basis of a result of calculation (S2076 to S2078) or generate a third pulse signal (S2079 and S2071).

The moving object in the above-described method of controlling the moving object may be a cleaning robot, and the above-described method of controlling the moving object may be applied as a method of controlling a cleaning robot, identically or through some modifications. In the method of controlling a cleaning robot, Steps S2018, S2027, and S2036 performed according to a floor condition, e.g., a material of the floor or whether a recessed region is present on the floor, determined using signals output through the above-described Steps S2000 to S2003, S2010 to S2017, S2020 to S2026, and S2030 to S2043 may be substituted with a step of performing a predetermined operation unique to the cleaning robot. For example, the step of performing a predetermined operation unique to the cleaning robot may include a step of suctioning dust on the floor surface with a general output when the floor surface is formed of a smooth material, a step of suctioning dust with an output higher than the general output when the material of the floor is rough as a carpet, and a step of performing an operation of avoiding a recessed region when the recessed region is present on the floor surface. When the cleaning robot uses a wet cleaning method, the step of performing a predetermined operation unique to the cleaning robot may include a step of stopping the cleaning operation when the material of the floor is rough as a carpet and moving to another region, which is not a carpet. The method of controlling the moving object according to the above-described embodiment may be applied, identically or through some modifications, as a method of controlling the cleaning robot, which is implemented by employing at least one of the floor condition sensor modules of the above-described first embodiment to fourth embodiment.

The method of controlling the moving object according to the above-described embodiment and/or the method of controlling the cleaning robot may be implemented in the form of a program that may be driven by various computer devices. Here, the program may include a program command, a data file, a data structure and the like solely or in combination. For example, the program may be designed and produced using a computer-executable high-level language code using an interpreter or the like as well as a machine language code formed by a compiler. The program may be particularly designed for implementing the above-described method and a method of controlling an image display device, or may be implemented using various functions or definitions that are known and used by those generally skilled in the computer software field.

The program for implementing the above-described method of controlling the moving object and/or the method of controlling the cleaning robot may be recorded in a computer-readable recording medium. For example, the computer-readable recording medium may include various types of hardware devices capable of storing specific programs executed according to call from a computer or the like, such as magnetic disk storage media including a hard disk and a floppy disk, magnetic tape, optical media including a compact disc (CD) and a digital versatile disk (DVD), magneto-optical media such as floptical Disk™, and semiconductor storage devices including a read-only memory (ROM), a random access memory (RAM), and a flash memory.

Although the moving object, the cleaning robot, the floor condition determining device, the method of controlling the moving object, and the method of controlling the cleaning robot according to various embodiments have been described above, the moving object, the cleaning robot, the floor condition determining device, the method of controlling the moving object, and the method of controlling the cleaning robot are not limited to the above-described embodiments. Various embodiments that may be implemented by one of ordinary skill in the art by modifying or changing the above-described embodiments may also be embodiments of the moving object, the cleaning robot, the floor condition determining device, the method of controlling the moving object, and the method of controlling the cleaning robot. For example, a result identical or similar to that of the above-described moving object, cleaning robot, floor condition determining device, method of controlling the moving object, and method of controlling the cleaning robot may be acquired even when the above-described techniques are performed in a different order from the above-described method, and/or when the above-described elements such as a system, a structure, a device, and a circuit are coupled or combined in a different form from the above-described method, or replaced or substituted with other elements or their equivalents.

The invention claimed is:

1. A cleaning robot comprising:
a light source configured to irradiate a first light to a floor surface;
a first sensor configured to sense a light specularly reflected from the floor surface;
a second sensor configured to sense a light diffusely reflected from the floor surface, at a position different from a position of the first sensor, wherein the first sensor and the second sensor are respectively configured to output a first electrical signal and a second electrical signal; and
a controller configured to:
calculate a ratio between a voltage of the first electrical signal and a voltage of the second electrical signal,
compare a result of calculating the ratio between the voltage of the first electrical signal and the voltage of the second electrical signal with a reference value,
increase a count variable according to a result of comparison,
determine a condition of the floor surface based on a result sensed by the first sensor and the second sensor and whether the count variable is equal to a present count reference value, and
determine whether a recessed region is present on the floor surface by comparing at least one of the voltage of the first electrical signal or the voltage of the second electrical signal with a corresponding reference voltage.

2. The cleaning robot of claim 1, wherein the controller is further configured to:
compare the voltage of the first electrical signal output from the first sensor with a first reference voltage, and
compare the voltage of the second electrical signal output from the second sensor with a second reference voltage.

3. The cleaning robot of claim 2, wherein, when the voltage of the first electrical signal is lower than the first reference voltage and the voltage of the second electrical signal is lower than the second reference voltage, the controller is further configured to:
determine the condition of the floor surface using a ratio of the voltage of an electrical signal output from the second sensor with respect to the voltage of an electrical signal output from the first sensor, or
determine that the recessed region is present on the floor surface using at least one of the electrical signal output from the first sensor and the electrical signal output from the second sensor.

4. The cleaning robot of claim 2, wherein, when the voltage of the first electrical signal is higher than the first reference voltage or the voltage of the second electrical signal is higher than a second reference signal, the controller is further configured to control the light source to irradiate a second light having a relatively lower intensity than the first light.

5. The cleaning robot of claim 1, wherein:
the light source is further configured to irradiate a light toward the floor surface at at least one incident angle, and
the first sensor is disposed on a traveling path of a light reflected at an angle of reflection, which is the same as the incident angle.

6. The cleaning robot of claim 1, wherein the second sensor is disposed between the first sensor and the light source or disposed opposite the first sensor with respect to the light source.

7. The cleaning robot of claim 1, wherein:
the light source is further configured to irradiate the first light a plurality of times;
the first sensor and the second sensor are respectively configured to output the first electrical signal and the second electrical signal a plurality of times; and
the controller is further configured to calculate the ratio between the voltage of the first electrical signal and the voltage of the second electrical signal every time the electrical signals are output.

8. The cleaning robot of claim 1, wherein the controller is further configured to apply a high-pass filter to an electrical signal output from at least one of the first sensor and the second sensor to remove noise due to a disturbance light from the electrical signal.

9. The cleaning robot of claim 8, wherein the controller is further configured to apply a low-pass filter to the electrical signal to which the high-pass filter is applied.

10. A method of controlling a cleaning robot, the method comprising:
irradiating a first light toward a floor surface;
sensing a light reflected from the floor surface by each of a first sensor and a second sensor disposed at different positions, wherein the first sensor receives a light specularly reflected from the floor surface, and the second sensor receives a light diffusely reflected from the floor surface;
outputting, respectively using the first sensor and the second sensor, a first electrical signal and a second electrical signal;
comparing a result of calculating a ratio between a voltage of the first electrical signal and a voltage of the second electrical signal with a reference value;
increasing a count variable according to a result of comparison;
determining a condition of the floor surface based on results of sensing by the first sensor and the second sensor and whether the count variable is equal to a preset count reference value; and
determining whether a recessed region is present on the floor surface by comparing at least one of the voltage of the first electrical signal or the voltage of the second electrical signal with a corresponding reference voltage.

11. The method of claim 10, further comprising:
irradiating a plurality of times using a light source,
outputting, respectively using the first sensor and the second sensor, the first electrical signal and the second electrical signal a plurality of times, and
calculating the ratio between the voltage of the first electrical signal and the voltage of the second electrical signal every time the electrical signals are output.

12. The method of claim 10, further comprising:
applying a high-pass filter to an electrical signal output from at least one of the first sensor and the second sensor to remove noise due to a disturbance light from the electrical signal.

13. The method of claim 12, further comprising:
applying a low-pass filter to the electrical signal to which the high-pass filter is applied.

* * * * *